(12) United States Patent
Ota et al.

(10) Patent No.: US 7,429,973 B2
(45) Date of Patent: Sep. 30, 2008

(54) CONTENT DISPLAY SYSTEM AND METHOD

(75) Inventors: Shinji Ota, Kamifukuoka (JP);
Masayoshi Ohashi, Kamifukuoka (JP);
Daisuke Morikawa, Kamifukuoka (JP);
Shoichi Yamazaki, Kamifukuoka (JP);
Takayuki Warabino, Kamifukuoka (JP);
Hajime Nakamura, Tokyo (JP);
Hideaki Iwashita, Tokyo (JP)

(73) Assignee: KDDI R&D Laboratories Inc.,
Kamifukuoka-Shi (JP)

( * ) Notice: Subject to any disclaimer, the term of this patent is extended or adjusted under 35 U.S.C. 154(b) by 1283 days.

(21) Appl. No.: 10/161,998

(22) Filed: May 31, 2002

(65) Prior Publication Data
US 2003/0043112 A1 Mar. 6, 2003

(30) Foreign Application Priority Data
May 31, 2001 (JP) .............................. 2001-165265

(51) Int. Cl.
*G09G 5/00* (2006.01)
*G06Q 40/00* (2006.01)
*G06F 17/30* (2006.01)
*G07F 7/00* (2006.01)

(52) U.S. Cl. ........................... 345/156; 705/39; 705/41; 705/27; 707/E17.121

(58) Field of Classification Search ................. 345/156; 705/39, 41, 27; 707/17
See application file for complete search history.

(56) References Cited

U.S. PATENT DOCUMENTS

| | | | |
|---|---|---|---|
| 6,211,870 B1* | 4/2001 | Foster | 715/744 |
| 6,556,586 B1* | 4/2003 | Sipila | 370/469 |
| 6,560,443 B1* | 5/2003 | Vaisanen et al. | 455/73 |
| 6,779,042 B1* | 8/2004 | Kloba et al. | 709/248 |
| 6,848,008 B1* | 1/2005 | Sevanto et al. | 709/249 |
| 2003/0181201 A1* | 9/2003 | Bomze et al. | 455/414.3 |

FOREIGN PATENT DOCUMENTS

| | | |
|---|---|---|
| JP | 9128335 | 5/1997 |
| JP | 2000/115253 | 4/2000 |
| JP | 2001/067202 | 3/2001 |

\* cited by examiner

Primary Examiner—James P. Trammell
Assistant Examiner—Scott Trotter
(74) Attorney, Agent, or Firm—Lackenbach Siegel, LLP; Myron Greenspan

(57) ABSTRACT

A content display system is disclosed for offering, excellent multimedia content browsing/viewing environments to handheld device users, from a server of a communication network, by the use of a handheld device and a cooperating computer device cooperated to the handheld device. According to an aspect of the present invention, the content display system and method are adapted so that:
(1) a handheld device user selects a target content, which the user wants to display on a cooperating computer device, from contents displayed on the handheld device via a user interface of the handheld device;
(2) identification information about the target content is transferred from the handheld device to the cooperating computer device;
(3) the cooperating computer device acquires the target content based on the identification information from the server; and
(4) the acquisition of the contents by the handheld device, the transfer of the identification information from the handheld device to the cooperating computer device and the acquisition of the target content by the cooperating computer device from the handheld device are performed via different communications networks.

26 Claims, 49 Drawing Sheets

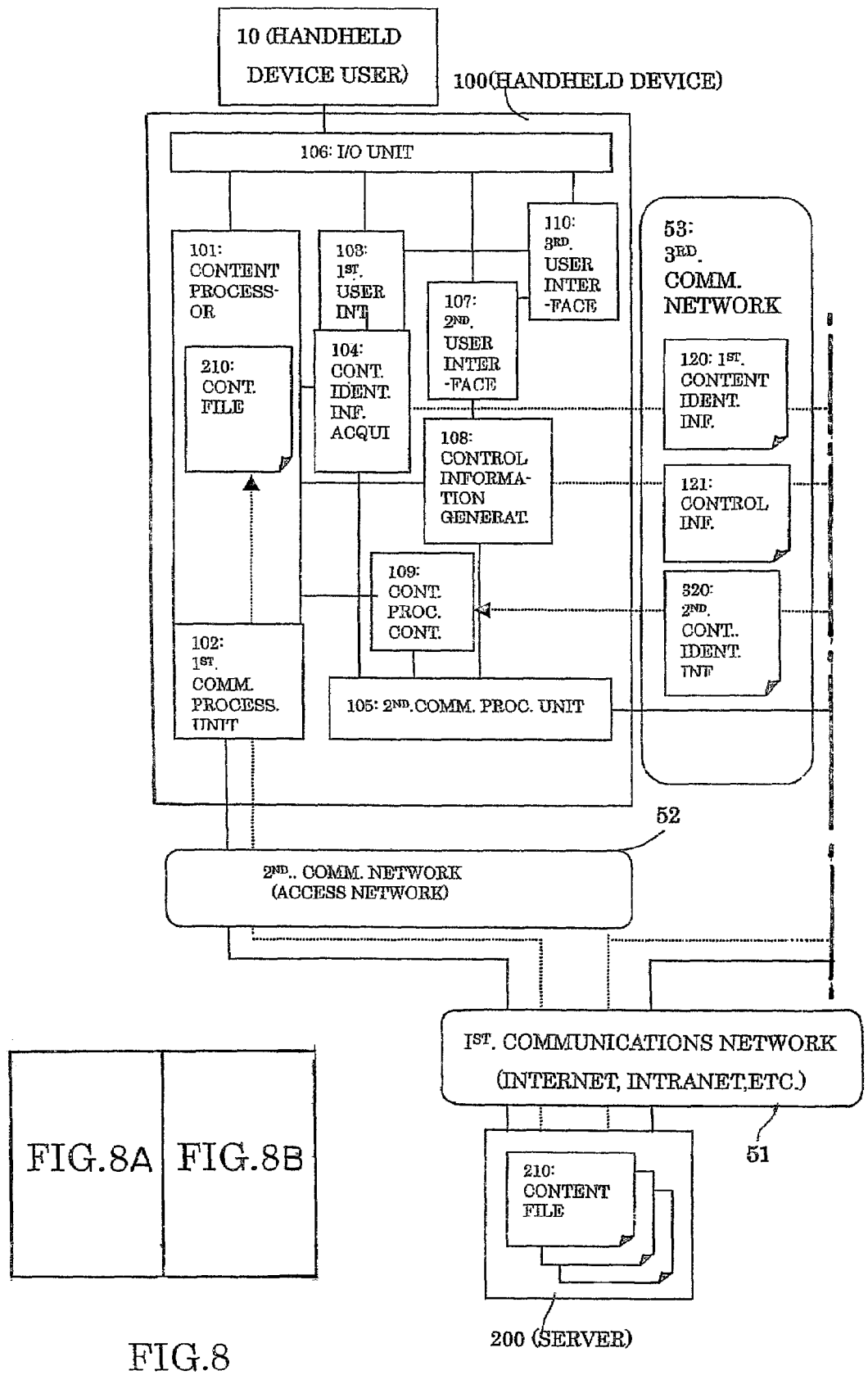

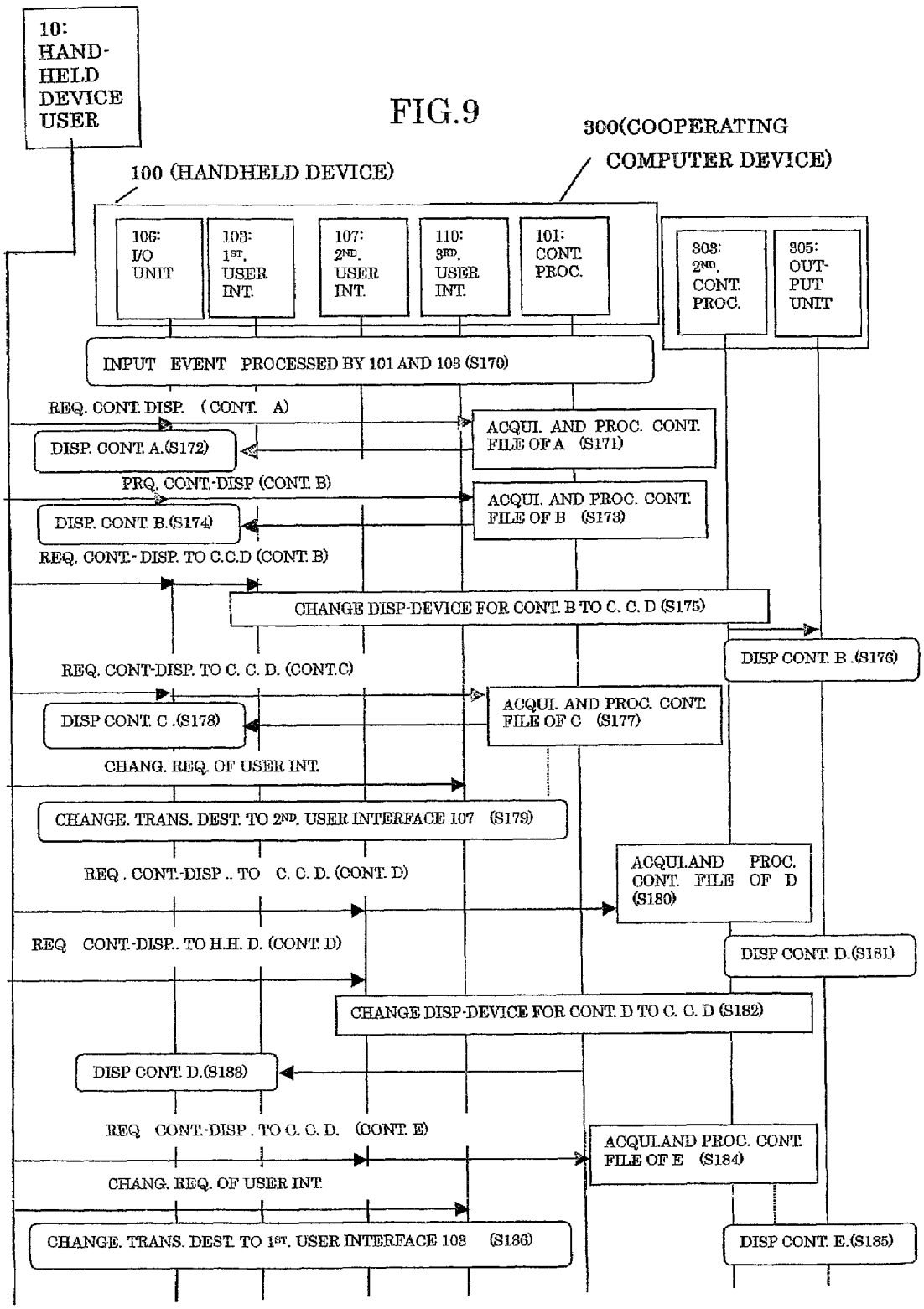

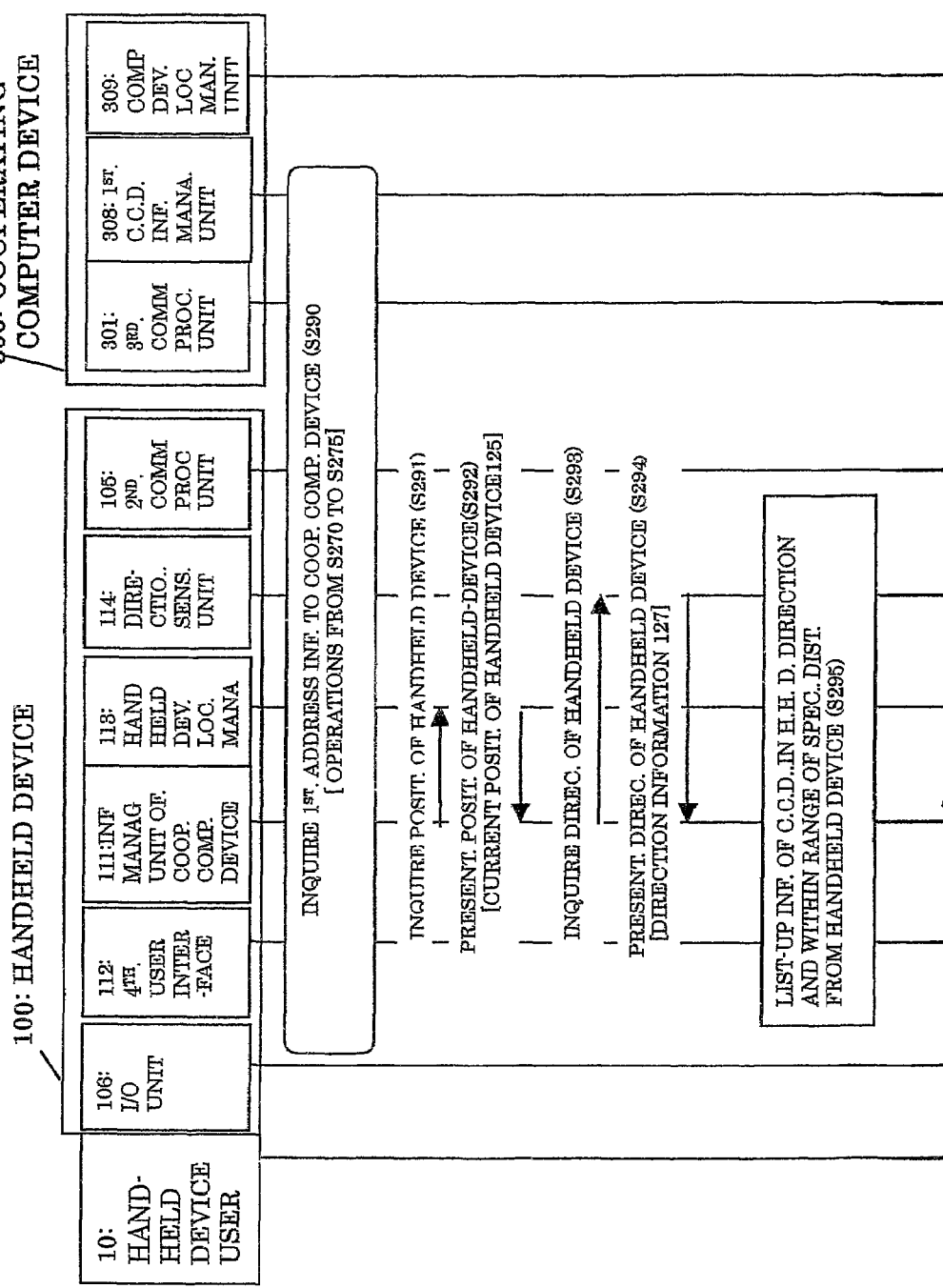

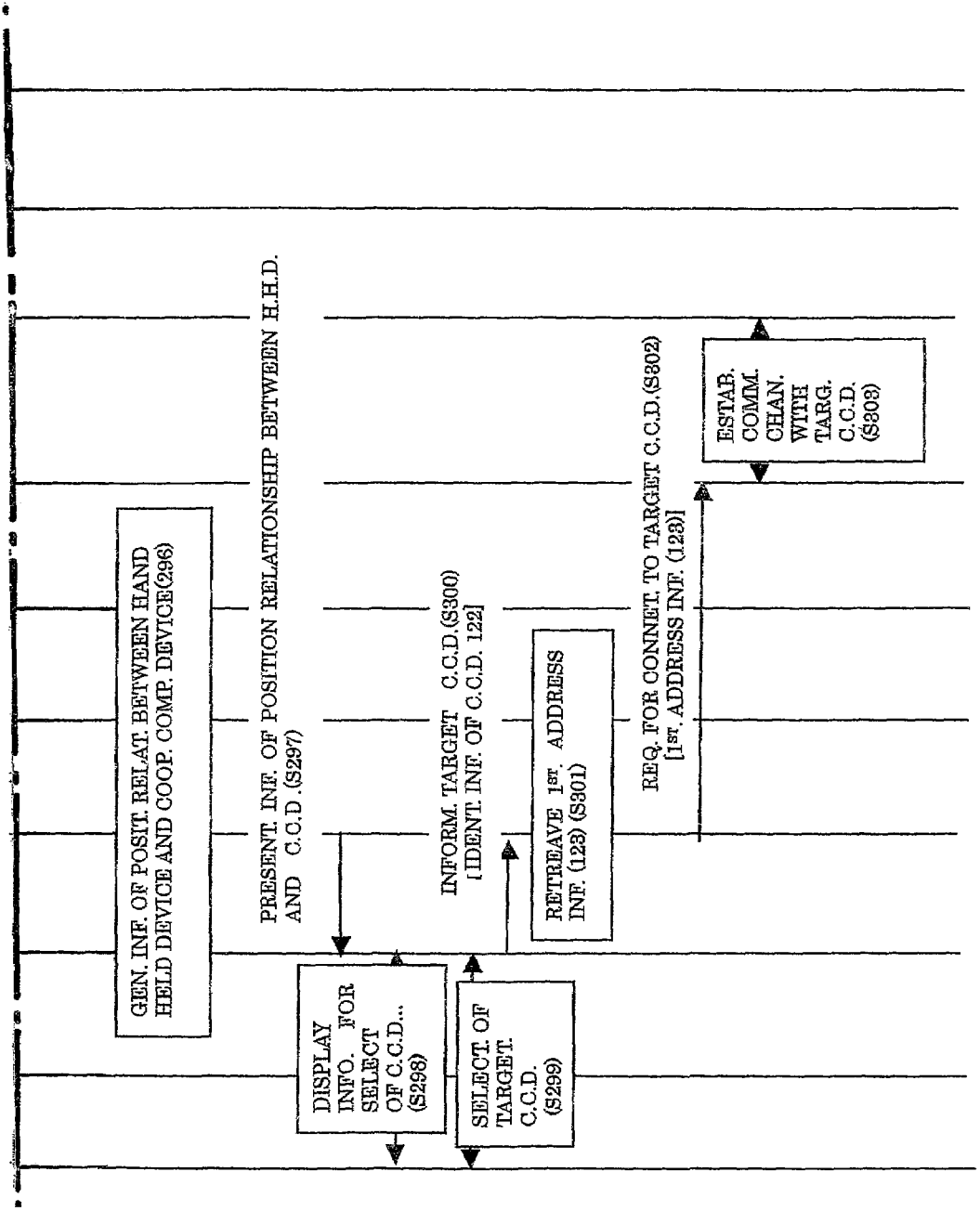

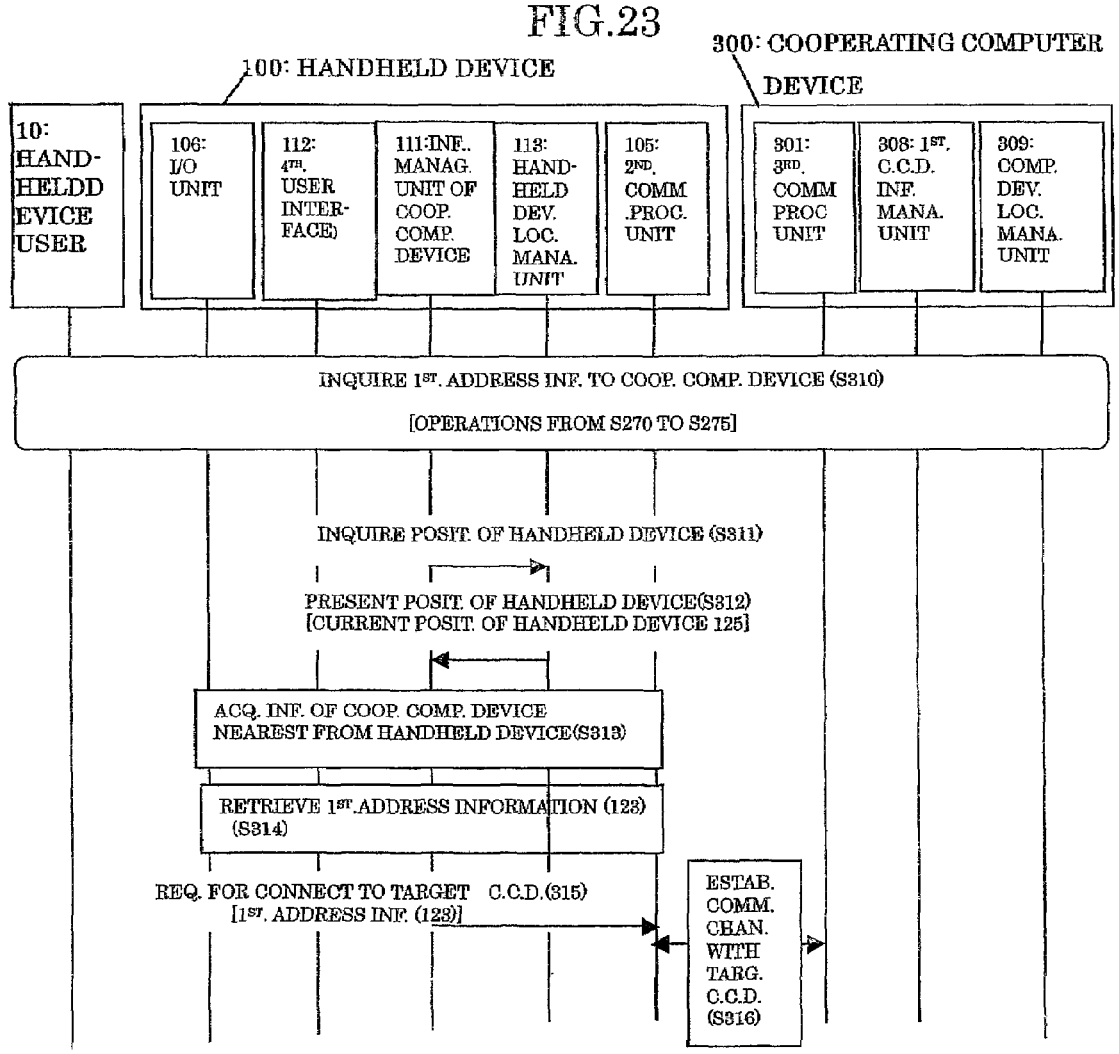

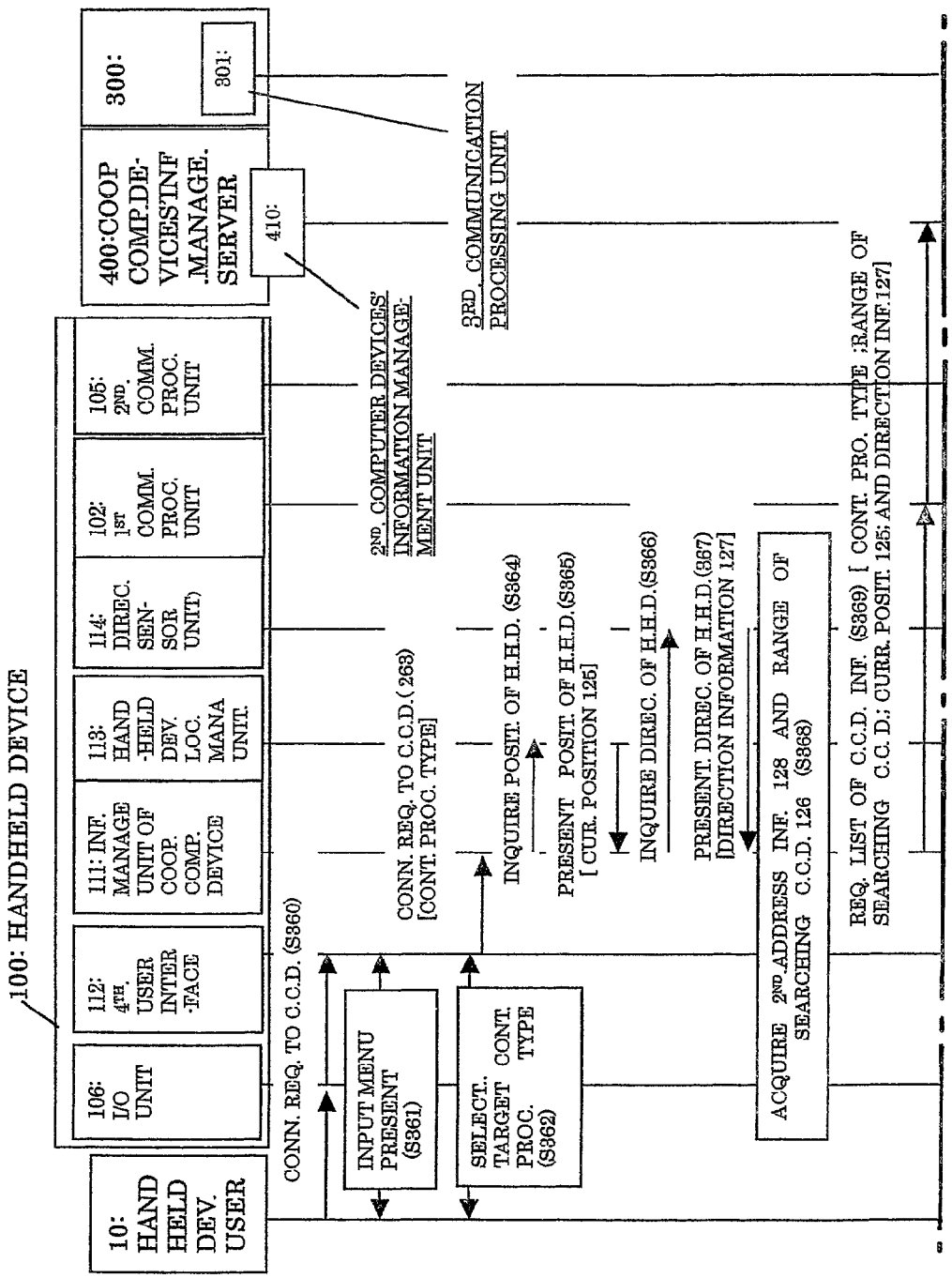

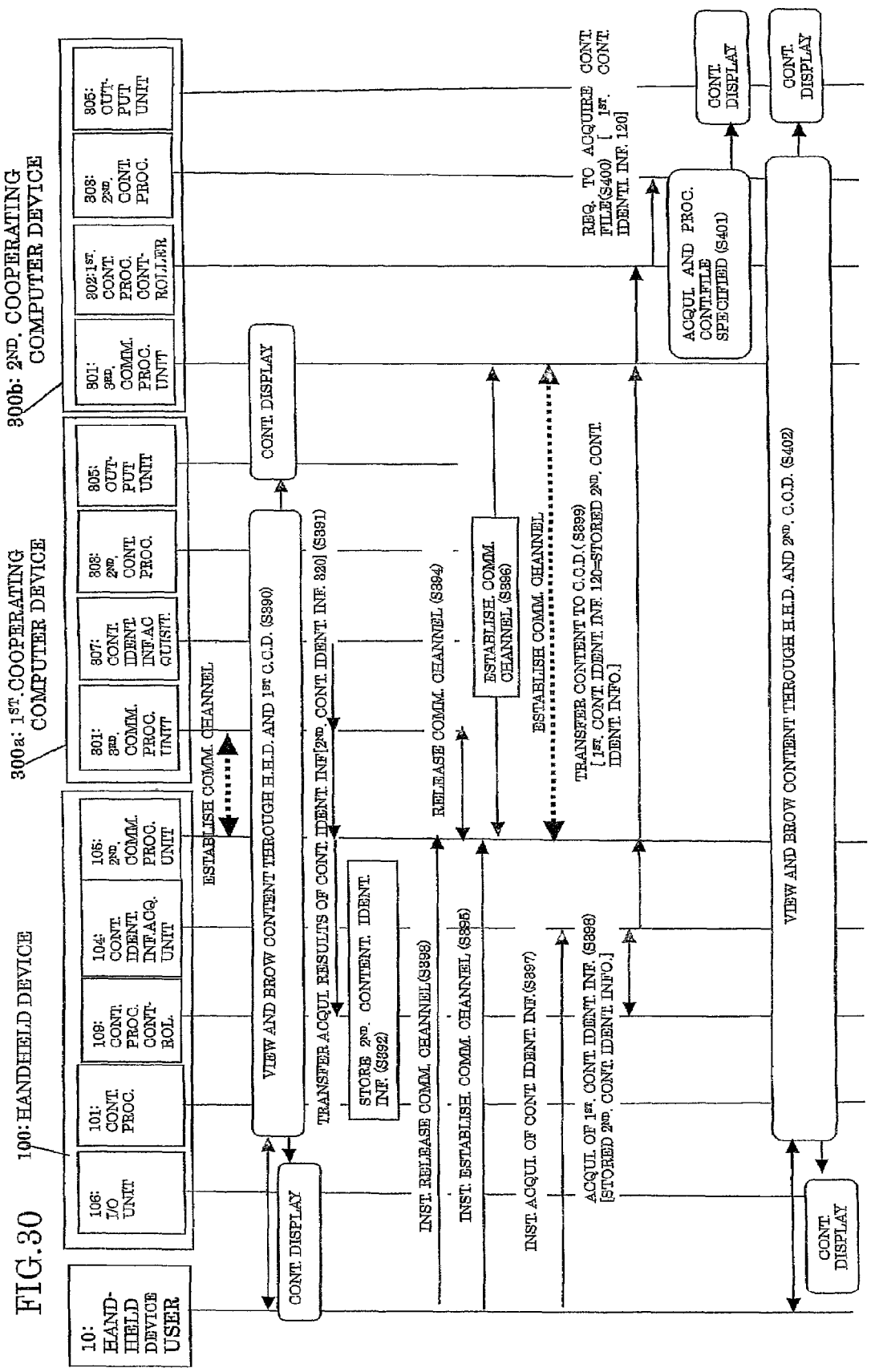

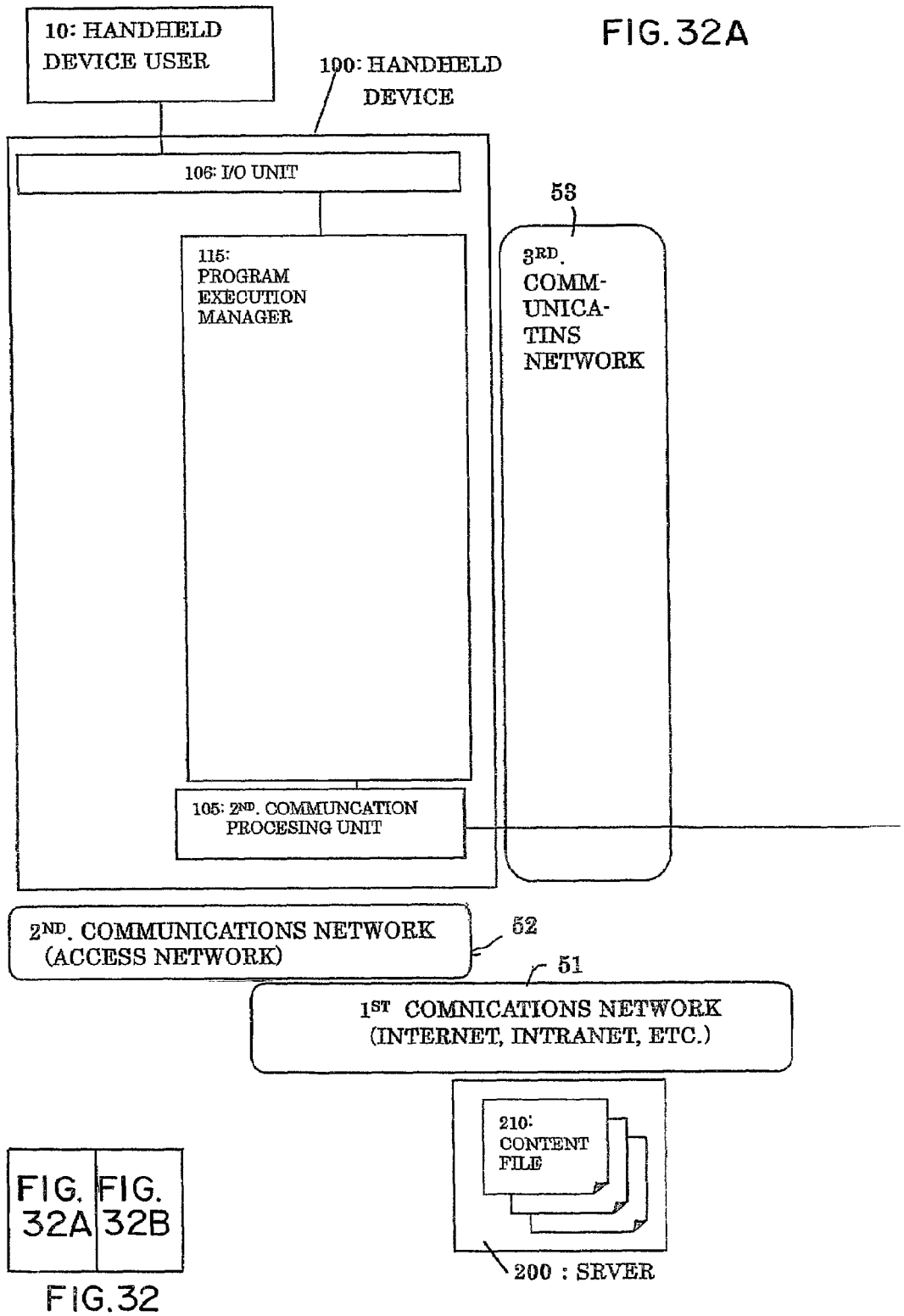

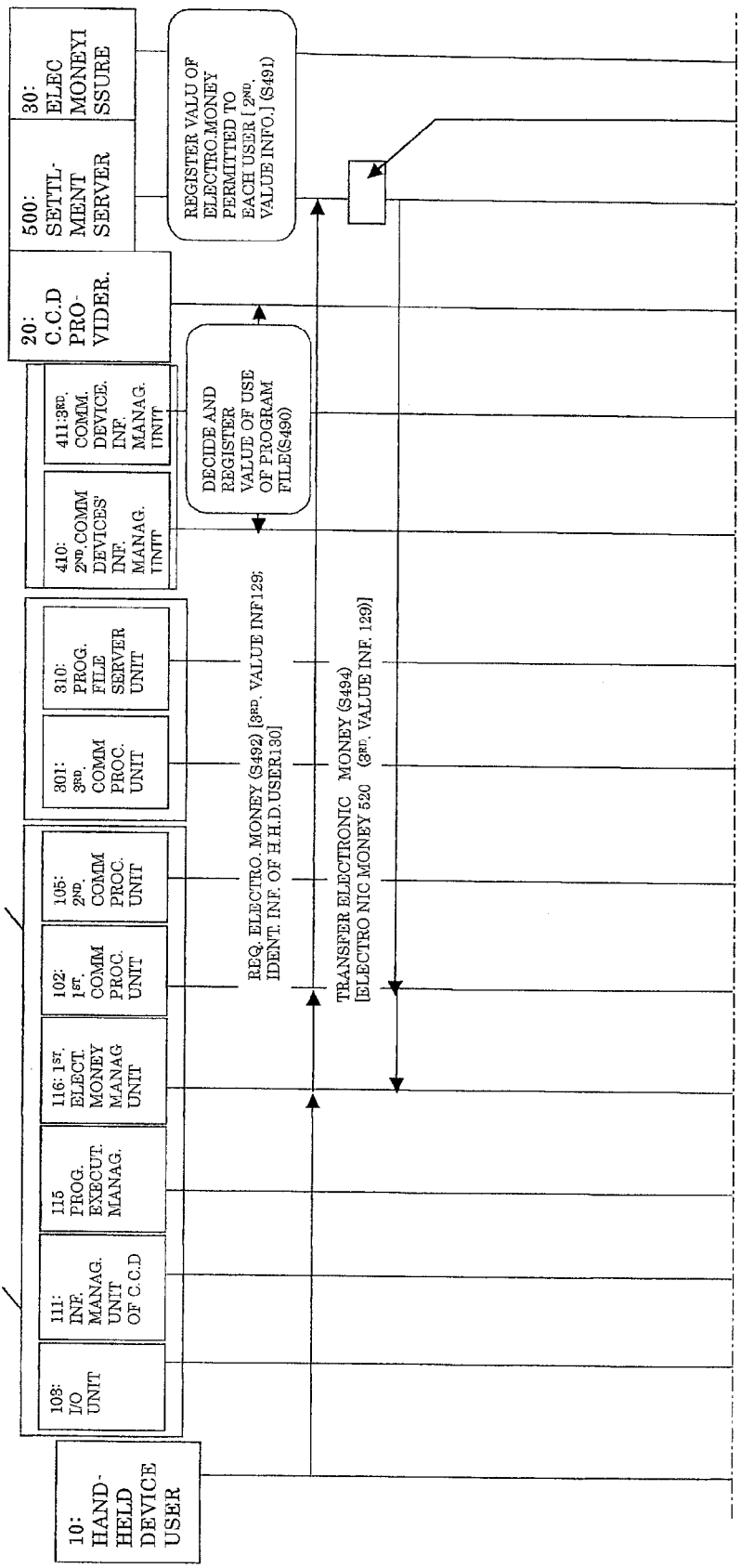

CONTENT DISPLAY SYSTEM AND METHOD

BACKGROUND OF THE INVENTION

The present invention relates to a content display system and method by which multimedia contents delivered on a communication network, such as the Internet or Intranet, can be displayed effectively or efficiently by the use of plural terminals each having an inherent channel.

At present, because of limitations of handheld device capability, such as processing power, storage size, display size, or communication capability, the user do browsing/view multimedia contents delivered across the Internet or Intranet for personal computers with sufficient quality.

To solve the above problem, there has been proposed and put to practical use an approach in which the layout or quality of the multimedia contents are managed in accordance with the capability of the handheld device, or variations of communications quality.

With this approach, however, it may sometimes be impossible to obtain and view the whole information intended by the contents' provider because of content layout rearrangements or deterioration of the content quality.

Further, to overcome the limitations in the capabilities of the handheld device, there has also been proposed and put to practical use an approach in which a handheld device and other devices which provides additional functions, such as a display or household electrical equipment.

With the approach, too, the transfer of the contents to the equipment via the handheld device is not completely free from the influence of the limitations of processing capabilities of the handheld device and its communication capability, or variations of communications quality, and consequently, comfortable content browsing/viewing environments cannot always be achieved.

Besides, no proposal has been made so far for a content display system intended to ensure continuity of handheld device user's browsing/viewing operation by working the handheld device and other computer devices installed at various places (cooperating computer devices) together to overcome the above-mentioned limitations.

SUMMARY OF THE INVENTION

It is therefore an object of the present invention to provide a content display system and method which always offer excellent multimedia content browsing/viewing environments to handheld device users.

Another object of the present invention is to provide content browsing/viewing environments which enable the handheld device user to continue his content browsing/viewing operation over different place the user moves.

According to a first aspect of the present invention, the content display system and method are adapted so that:

(1) a handheld device user selects a target content, which the user wants to display on a cooperating computer device, from contents displayed on the handheld device via a user interface of the handheld device;

(2) identification information about the target content is transferred from the handheld device to the cooperating computer device;

(3) the cooperating computer device acquires the target content based on the identification information from the server; and (4) the acquisition of the contents by the handheld device, the transfer of the identification information from the handheld device to the cooperating computer device and the acquisition of the target content by the cooperating computer device from the handheld device are performed via different communications networks.

With the above feature, the handheld device user can transfer contents displayed on the handheld device to the cooperating computer device as required, and hence, the handheld device user can enjoy comfortable content browsing/viewing environments without being affected by the limitations of capabilities of the handheld device.

According to a second aspect of the present invention, (1) the handheld device user selects a target content, which the user wants to display on the handheld device, from contents displayed on a cooperating computer device via user interface of the handheld device;

(2) identification information about the target content is transferred from the cooperating computer device to the handheld device;

(3) the handheld device acquire the target content based on the identification information from the server; and (4) the acquisition of contents by the cooperating computer device, transmissions of control information about target content selections and transmissions of identification information between the handheld device and the cooperating computer device, and the acquisition of the target content by the handheld device are performed via different communications network.

With the above feature, the handheld device user can continue the content browsing/viewing operation with the handheld device when the user leaves from a place where the cooperating computer device is installed, because the handheld device user can display the whole or part of the content displayed on the cooperating computer device.

According to a third aspect of the present invention, (1) the handheld device user selects a target content, which the user wants to display on the handheld device, from contents displayed on a cooperating computer device via a user interface of the handheld device;

(2) identification information about the target content is transferred from the cooperating computer device to the handheld device; and (3) the handheld device records identification information therein.

With the above feature, the handheld device user can resume the content browsing/viewing operation with the handheld device any time and any where, because the handheld device user can acquire and display the content with the recorded identification information.

According to a fourth aspect of the present invention: the handheld device user can freely change a content display on the handheld device to the cooperating computer device or vice versa; and the acquisition of contents by the handheld device, transmissions of control information about target content selections and transmission of the content identification information between the handheld device and the cooperating computer device, and the acquisition of contents by the cooperating computer device are performed via different communications network.

With the above feature, the handheld device user can continue and resume the content browsing/viewing operation over places the user moves by using the handheld device and the cooperating computer devices appropriately.

Further, with the above feature, the user enjoy comfortable content browsing/viewing environments without being affected by the limitations inherent to the handheld device, because the handheld device user can use a cooperating computer device with the appropriately timing and content browsing/viewing operation on the cooperating computer device is performed with its own processor, display and communication network.

According to a fifth aspect of the present invention, the cooperating computer device to be used by the handheld device user can be selected from among cooperating computer devices at which identification information are pre-registered at the handheld device.

With the above feature, in a case where the cooperating computer device used in combination with the handheld device is limited, the handheld device user does not need to input identification information of cooperating computer device or address information each time when it is necessary to establish a channel between the handheld device and the cooperating computer device; hence, it is possible to minimize interruption of the handheld device user's content browsing/viewing operation.

According to a sixth aspect of the present invention, even if no cooperating computer device information is pre-registered at the handheld device, the cooperating computer device to be used by the handheld device user can be selected from among cooperating computer devices communicable with the handheld device.

With the above feature, further, even if the handheld device user has no knowledge of the identification information or address information about the cooperating computer device to be used, the handheld device user can connect the handheld device to the cooperating computer device without troubles of input the identification information of cooperating computer device or address information each time when it is necessary.; hence, it is possible to minimize interruption of the handheld device user's content browsing/viewing operation.

According to a seventh aspect of the present invention, in the process of giving a list of the cooperating computer devices usable with the handheld device thereon to the handheld device user, only the cooperating computer device equipped with the content processing function, such as a browser and viewer, desired to use by the handheld device user are affected.

According to an eighth aspect of the present invention, in the process of giving a list of the cooperating computer devices usable with the handheld device thereon to the handheld device user, only the cooperating computer devices belonging to the owner or operator specified by the handheld device user are offered.

According to a ninth aspect of the present invention, in the process of retrieving cooperating computer devices usable with the handheld device, a channel is established automatically between the handheld device and the cooperating computer device having answered first to the signal from the handheld device.

According to a tenth aspect of the present invention, in the process of giving a list of the cooperating computer devices usable with the handheld device thereon to the handheld device user, only cooperating computer devices being close to the current position of the handheld device user are offered.

According to an eleventh aspect of the present invention, in the process of giving a list of the cooperating computer devices usable with the handheld device thereon to the handheld device user, only cooperating computer devices being in a particular direction relative to the handheld device user and close to the handheld device are offered.

According to a twelfth aspect of the present invention, in the process of retrieving the cooperating computer devices usable with the handheld device, a channel is established automatically between the handheld device and the cooperating computer device closest to the current position of the handheld device user.

With the above seventh to twelfth features, since a number of usable cooperating computer devices offered to the handheld device user for choice is appropriately controlled, or since the handheld device user does not need to select the cooperating computer device to be used, it is possible to lighten the workload for the handheld device user and keep interruption of his content browsing/viewing operation to a minimum.

According to a thirteenth aspect of the present invention, the retrieval of the cooperating computer devices offered to the handheld device user is performed on a server installed in a communication network like Internet or Intranet.

With the above feature, since the queries to plural cooperating computer devices and waits of answers from them are not needed in the retrieval process of the usable cooperating computer devices, it is possible to reduce the time to offer the usable cooperating computer devices to the handheld device user. This permits minimization of interruption of the handheld device user's content browsing/viewing operation.

According to a fourteenth aspect of the present invention, in the retrieval of the cooperating computer devices on a server installed in a communication network like Internet or Intranet, cooperating computer devices, which are located within a distance from the current position of the handheld device user and in a particular direction relative to the position are retrieved.

According to a fifteenth aspect of the present invention, in the retrieval of the cooperating computer devices on a server installed in a communication network like Internet or Intranet, a cooperating computer device, which is; located in a particular direction relative to the current position of the handheld device user and closest to the position is retrieved.

With the above fourteenth and fifteenth features, since a number of usable cooperating computer devices offered to the handheld device user for choice is appropriately controlled, it is possible to lighten the workload for the handheld device user and keep interruption of his content browsing/viewing operation to a minimum.

According to a sixteenth aspect of the present invention, even when a channel established between the handheld device and the cooperating computer device for the cooperation therebetween is released, the content display on the handheld device can be kept, and a channel can be established between the handheld device and a new cooperating computer device without interruption of the content display on the handheld device in order to continue the content viewing operation by the use of the new cooperating computer device.

According to a seventeenth aspect of the present invention, even when a channel established between the handheld device and the cooperating computer device for the cooperation therebetween is released, the handheld device records the content identification information acquired from the cooperating computer device and when a channel is established between the handheld device and a new cooperating computer device, the content viewing operation using the cooperating computer device can be resumed by the use of the recorded content identification information.

According to an eighteenth aspect of the present invention, even when a channel established between the handheld device and the cooperating computer device for the cooperation therebetween is released, the handheld device records the content identification information acquired from the cooperating computer device and limits the content display corresponding to the recorded content identification information on the handheld device, permitting resumption of the content viewing operation only when using the cooperating computer device.

With the above sixteenth to eighteenth features, even if the handheld device user moves to various places where usable cooperating computer devices are installed, the handheld device user can continue/resume his content browsing/viewing operation over places. Further, according to the eighteenth aspect, since the contents are displayed only on the cooperating computer devices and no content is recorded in the handheld device, it is possible to exclude possibilities of the illegal leak of contents to other computer devices.

According to a nineteenth aspect of the present invention, various information processing capabilities necessary for the cooperation between the handheld device and the cooperating computer device can be built up dynamically in the latter simultaneously with the establishment of a channel between the both terminals.

With the above feature, since the handheld device user is not required to pre-acquisition user interfaces and a control information generating function necessary for controlling the cooperating computer device in the handheld device, it is possible to lighten the workload for the handheld device user and efficiently utilize a memory of a limited capacity in the handheld device.

According to a twentieth aspect of the present invention:

the handheld device uses an electronic money circulating over the network to pay the fee for the use of the program files acquired from the cooperating computer device;

the handheld device user acquires a required electronic money from a server under the management of a electronic money issuer;

prior to acquire program files from the cooperating computer device, the handheld device pays thereto a electronic money equivalent to the fee for the use of the program files;

upon receiving the electronic money, the cooperating computer device generates electronic receipt data of electronic money having described therein information as the receipt for the received electronic money and sends the receipt data of electronic money to the handheld device;

the cooperating computer device controls, in accordance with the value of its received electronic money, the acquisition of the program files by the handheld device; and the cooperating computer device settles an account with the handheld device user by presenting the received electronic money to the server under the management of the electronic money issuer.

With the above feature, since the owner or operator of the cooperating computer devices can get value for the use of the cooperating computer devices, it is possible to open the cooperating computer device to a large number of users without inflicting a loss on the owner or operator by the use of the cooperating computer devices. Accordingly, the handheld device user can use cooperating computer devices at more places and opportunities by paying prices to the owner or operator. This ensures the continuity of the handheld device user's content browsing/viewing operation.

According to a twenty-first aspect of the present invention:

the handheld device utilizes an electronic money circulating over the network to pay the fee for the use of program files acquired from the cooperating computer device;

the handheld device user acquires a required electronic money from a server under the management of an electronic money issuer;

the handheld device user accesses to a server which manages information of cooperating computer devices via the handheld device and pays an electronic money equivalent to the fee for the use of program files, by which the program files to be used are registered at the server;

the cooperating computer device, which has been requested by the handheld device to acquire the program files, inquires the server, which manages the information of cooperating computer devices, whether or not the program files are to be presented to the handheld device;

the server, which manages the information of the cooperating computer devices, decides whether or not the program files are to be presented to the handheld device on the base of the balance of the value of the electronic money presented from the handheld device user to the server;

the server, which manages the information of the cooperating computer devices, subtracts the value corresponding to the fee for the use of the program files from the value of the electronic money presented from the handheld device, then generates electronic receipt data of electronic money having recorded therein information as the receipt for the presented electronic money, then sends the receipt data of electronic money to the handheld device;

the cooperating computer device controls the presentation of the program files to the handheld device in accordance with the decision by the server which manages the information of the cooperating computer devices; and the server which manages the information of the cooperating computer devices presents the electronic money acquired from the handheld device to the server under the management of the electronic money issuer, thereby settling an account with the handheld device user.

With the above feature, since the owner or operator of the cooperating computer devices can get value for the use of the cooperating computer devices, it is possible to open the cooperating computer devices to a large number of users without inflicting a loss on the owner or operator. Accordingly, the handheld device user can use cooperating computer devices at more places and opportunities by paying the price for the use of the cooperating computer devices to the owner or operator. This ensures the continuity of the handheld device user's content browsing/viewing operation. Moreover, since the individual cooperating computer devices need not be equipped with a price-for-use-of-cooperating computer device input/output management facility, and since the owner or operator can efficiently install and manage a plurality of cooperating computer devices, it is possible to enrich the content browsing/viewing environments for the handheld device user.

Besides, since the handheld device user need not to pay the price for the use of the cooperating computer device at each time when a channel to the cooperating computer device is established, it is possible to reduce time loss for presenting usable cooperating computer devices to the handheld device user. This permits minimization of interruption of the handheld device user's content browsing/viewing operation.

According to a twenty-second aspect of the present invention, the state of the handheld device user's selection and execution in order to control the cooperating computer device functions are managed and displayed on the cooperating computer device.

With the above feature, the handheld device need not be equipped with a facility for managing the selection of the operation to be executed on the cooperating computer device and its execution. This permits reduction of the scale of software to be incorporated in the handheld device. Further, by displaying the selection of the operation and the state of its execution on the cooperating computer device, the contents display on the handheld device is not interrupted visually during manipulation of the cooperating computer device;

hence, it is possible to keep the interruption of the handheld device user's content browsing/viewing operation to a minimum.

BRIEF DESCRIPTION OF THE DRAWINGS

Other objects, features and advantages of the present invention will become more apparent from the following description taken in conjunction with the accompanying drawings, in which:

FIG. 9 is a flowchart explanatory of switching between a control operation for transferring contents displayed on the handheld device to the cooperating computer device for display thereon and a control operation for transferring contents displayed on the cooperating computer device to the handheld device for display thereon the embodiment illustrated in FIG. 8;

FIG. 22 is a flowchart explanatory of an example of the channel establishing operation in the embodiment illustrated in FIG. 21;

FIG. 23 is flowchart explanatory of operations of the embodiment of FIGS. 19 and 21 when each incorporates therein the functional configuration for establishing a channel between the handheld device and the cooperating computer device nearest it;

FIG. 30 is a flowchart is a flowchart explanatory of an operation for recording second content identification information acquired to the handheld device from the cooperating computer device when the channel established so far between the handheld device and the cooperating computer device is cut off for cooperating operation in the embodiments of FIG. 8;

DETAILED DESCRIPTION OF THE PREFERRED EMBODIMENTS

The following description will be given mainly of this invention system since this invention method can be understood from the configuration and operation of the system described below.

Figure 1:
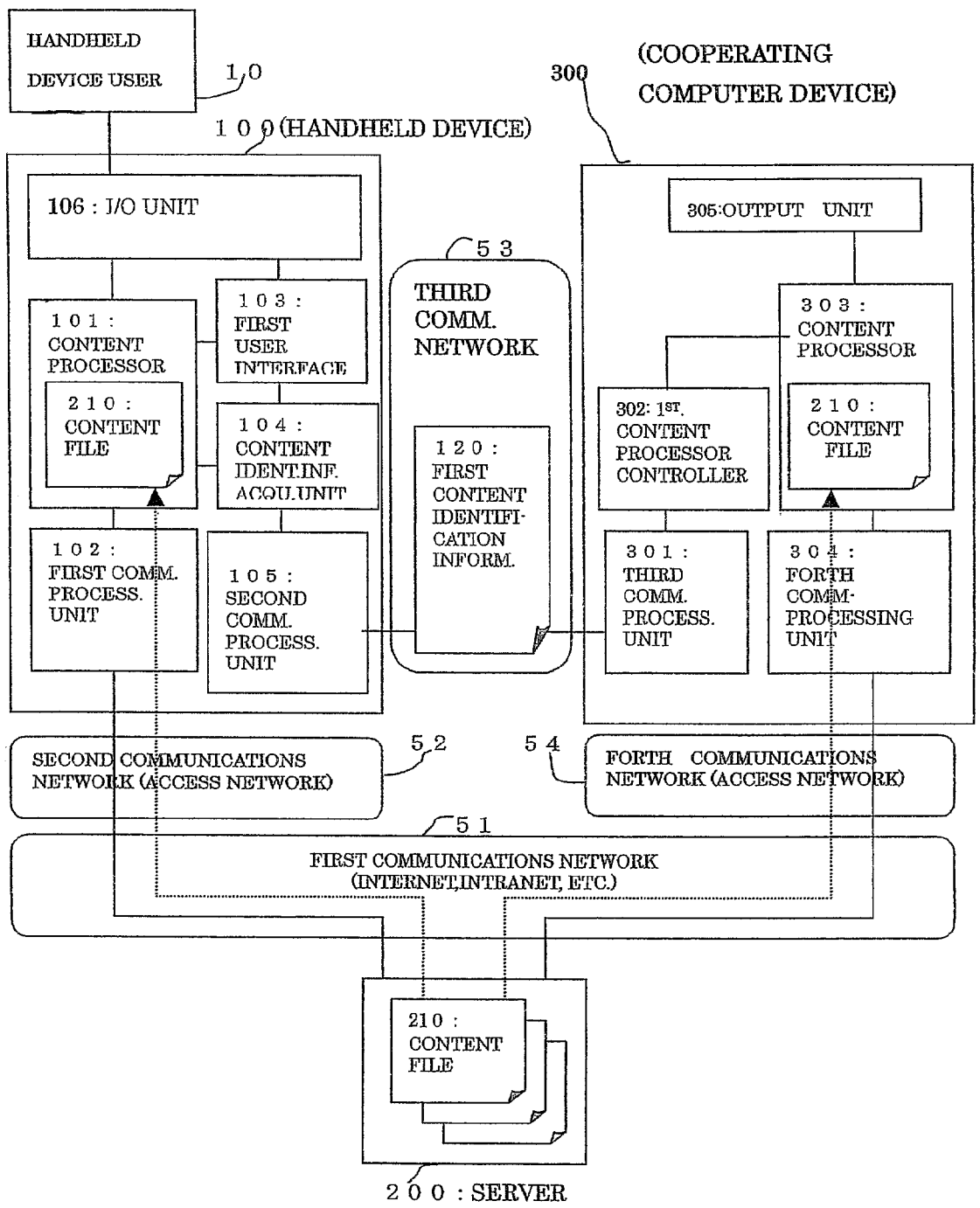
FIG. 1 is a block diagram illustrating an embodiment of the content viewing system according to the present invention that performs a control operation by which contents displayed on a handheld device are transferred to and displayed on a cooperating computer device.

FIG. 1 illustrates in block form an embodiment of the content display system according to the present invention in which contents displayed on a handheld device (H. H. D.) 100 are transferred to a cooperating computer device (C. C. D.) 300 for display thereon.

The handheld device 100 comprises:

an I/O unit 106 through which required information is transmitted to or received from a handheld device user 10;

a content processor 101 which acquires a content file 210 specified by the handheld device user 10 from a server 200 on the Internet, Intranet, or subscriber's LAN and processes the content file 210 for presentation to the handheld device user 10;

a first communication processing unit 102 for acquiring the content file 210 required by the content processor 101 from the server 200;

a first user interface 103 through which the handheld device user 10 specifies one of the presented contents which is desired to be processed by the cooperating computer device 300 cooperated to the handheld device 100;

a content identification information acquisition unit 104 which acquires, as information identifying the content specified via the first user interface unit 103, the first content identification information 120 from the content file 210; and a second communication processing unit 105 for transferring the first content identification information 120 acquired in response to an instruction of the handheld device user 10 to the cooperating computer device 300.

Each cooperating computer device 300 comprises:

a third communication processing unit 301 for acquiring the first content identification information 120 transferred from the handheld device 100;

a first content processor 302 for controlling content processing by the contents of the first content identification information 120;

a content processor controller 303 for acquiring and processing the content file 210 specified by the first content processor controller 302 to present to the handheld device user 10;

a fourth communication processing unit 304 for acquiring the content file 210 required by the content processor controller 303 from the server 200 on the Internet, Intranet, or subscriber's LAN; and an output unit 305 for displaying the contents of the content file 210.

The server 200 has connected thereto a first communications network 51 through the Internet, Intranet, or subscriber's LAN so as to communicate with the handheld device 100 and the cooperating computer device 300. Interposed between the handheld device 100 and the first communication network 51 is a second communication network 52 as an access network. Interposed between the handheld device 100 and the cooperating computer device 300 is a third communication network 53 as an inter-terminal communication network. Interposed between the cooperating computer device 300 and the first communication network 51 is a fourth communication network 54 as an access network.

Figure 2:
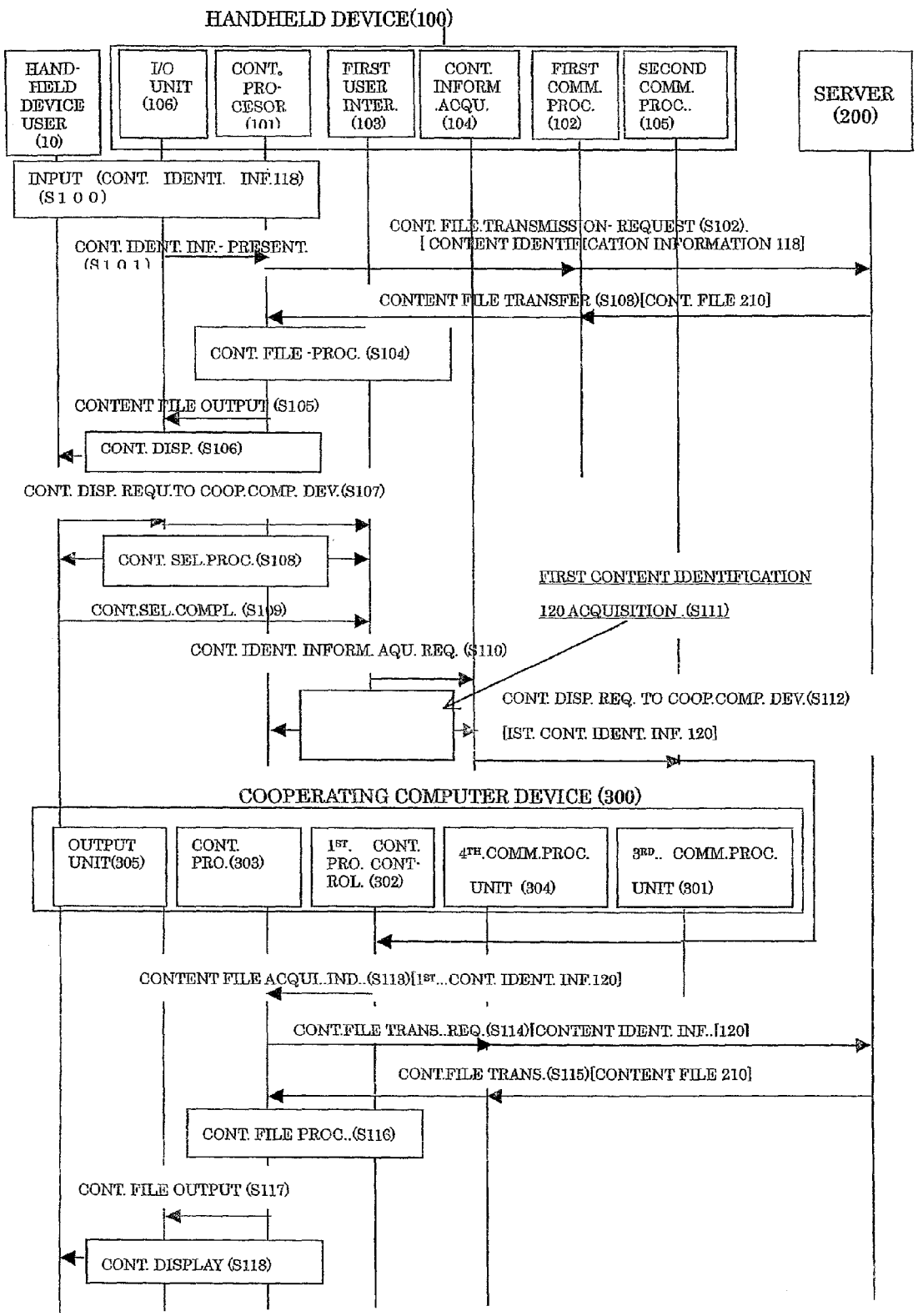
FIG. 2 is a flowchart explanatory of the control operation of the embodiment illustrated in FIG. 1.

FIG. 2 is a flowchart explanatory of a control operation by which contents displayed on the handheld device 100 are transferred to the cooperating computer device 300 to display thereon.

The handheld device user 10 inputs the identification information about the contents to be acquired (content identification information 118) to the handheld device 100 via its I/O unit 106 (S100). In practice, Uniform Resource Locators (URL) or Uniform Resource Identifiers (URI) can be used as the content identification information 118. The input content identification information 118 is presented to the content processor 101 (S101).

The content processor 101 requests the server 200 via the first communication processing unit 102 to transfer thereto the content file 210 corresponding to the content identification information 118 (S102).

The content processor 101 receives the content file 210 from the server 200 (S103), and processes the content file 210 (S104). More specifically, when the received content file 210 contains a text and image data, the content processor 101 decodes them. When the content file 210 contains voice data or image data, it is decoded and played-back.

The result of processing of the content file 210 by the content processor 101 is output to the I/O unit 106 (S105), from which it is presented to the handheld device user 10 (S106).

The handheld device user 10 requests the first user interface 103 to display a content on the cooperating computer device 300 (S107).

Upon receiving the request, the first user interface 103 urges the handheld device user 10 to select that a part of the contents displayed on the handheld device 100 which the handheld device user 10 wants to display on the cooperating computer device 300. The handheld device user 10 can select on the first user interface 103 the whole or partial area of the displayed contents to display on the cooperating computer device 300(S108).

In this instance, the first user interface 103 may allow the handheld device user 10 to decide whether the contents to be displayed on the cooperating computer device 300 are the whole area of the contents being displayed on the handheld device 100 (for instance, a Web page in its entirety) or a partial area of the contents (such as an image on the Web page or separate contents linked with the Web page). Further, when the handheld device user 10 decides to display the partial area of the contents on the cooperating computer device 300, the first user interface 103 may provide an interface through which the partial area of the contents being displayed can be selected. Besides, when the handheld device user 10 selects the partial area of the contents being displayed, the first user interface 103 may request the content processor 101 to indicate by highlight the selected area and display its state of selection.

When informed completion of the content selection from the handheld device user 10 (S109), the first user interface 103 instructs the content identification information acquisition unit 104 to get the first content identification information 120 (S110).

In a case where the handheld device user 10 selects all the displayed contents, the content identification information acquisition unit 104 obtains, as the first content identification information 120, identification information for identifying the content file 210 in its entirety. On the other hand, when the handheld device user 10 specifies a part of the display contents, the content identification information acquisition unit 104 obtains, as the first content identification information 120, identification information for identifying the content file 1210 that forms the currently highlighted (focused) area (S111).

The first content identification information 120 thus obtained is transferred to the first content processing controller 302 via the second communication processing unit 105 and the third communication processing unit 301 of the cooperating computer device 300 (S112).

The first content processing controller 302 presents the first content identification information 120 to a content processor 303 to urge it to acquire the content file 210 (S113).

The content processor 303 requests the server 200 via the fourth communication processing unit 304 to transfer the content file 210 concerning the specified contents (S114).

The content processor 303 acquires the content file 210 (S115) and processes it (S116). More specifically, when the content file 210 contains a text and image data, their data are decoded. When the content file 210 contains voice data or image data, it is decoded and played-back.

The result of processing of the content file 210 by the content processor 303 is output to the output unit 305 (S117), from which it is presented to the handheld device user 10 (S118).

Figure 3:
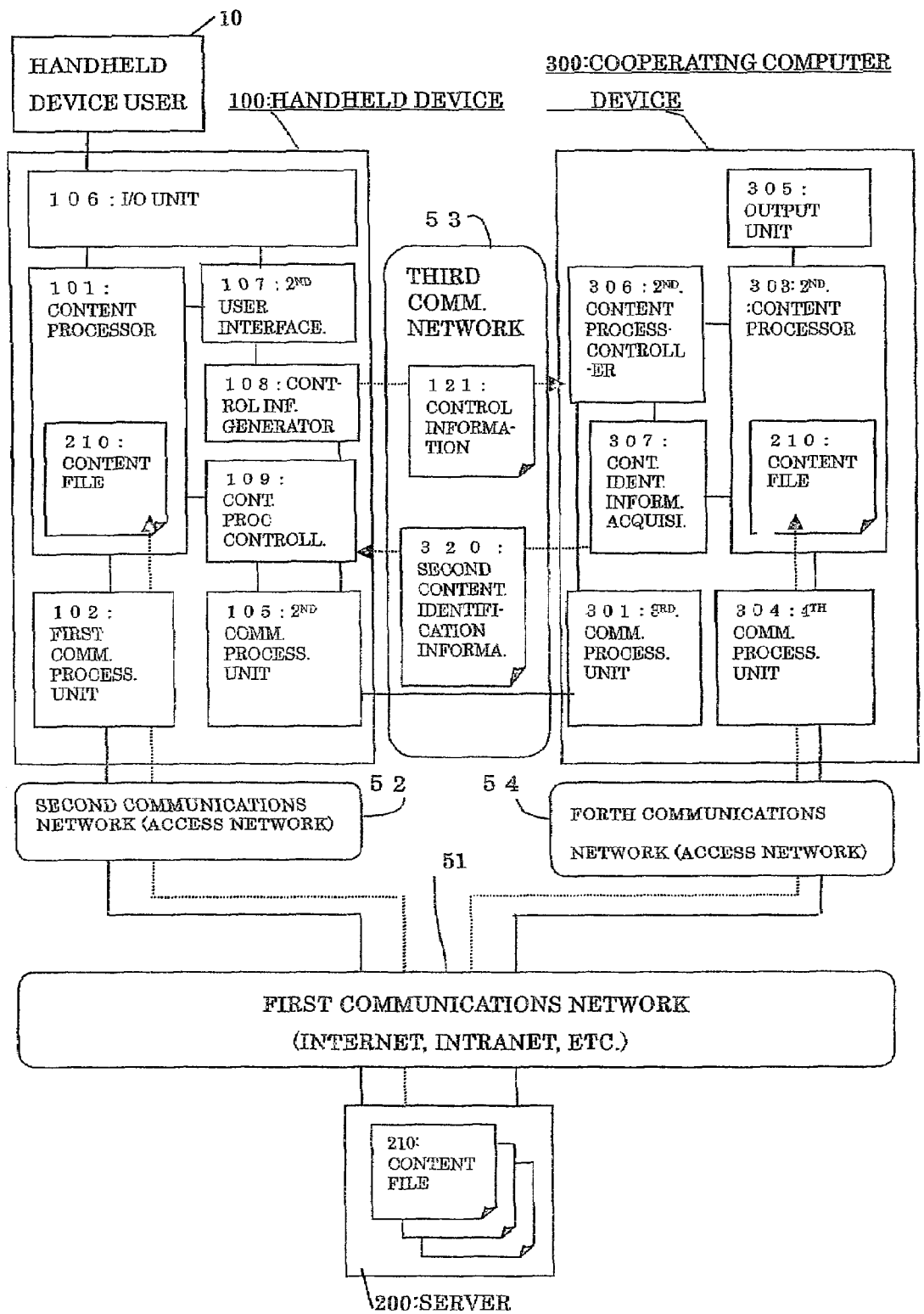
FIG. 3 is a block diagram illustrating another embodiment of the content viewing system according to the present invention that performs a control operation for transferring contents displayed on a cooperating computer device to a handheld device for display thereon.

FIG. 3 illustrates in block form another embodiment of the content display system in which contents displayed on the cooperating computer device 300 are transferred to the handheld device 100 for display thereon.

The handheld device 100 of this system comprises:

a content processor 101 which acquires a content file 210 specified by the handheld device user 10 from a server 200 on the Internet, Intranet, or subscriber's LAN and processes the content file 210 for presentation to the handheld device user 10;

a first communication processing unit 102 through which the content file 210 requested by the content processor 101 is acquired from the server 200;

an I/O unit 106 through which instructions and other necessary information are transmitted to and received from the handheld device user 10;

a second user interface 107 through which the handheld device user 10 controls the operation of a content processor 303 on the cooperating computer device 300 associated with the handheld device 100 and specifies those of the contents presented on the cooperating computer device 300 which are desired to be processed by the handheld device 100;

a control information generator 108 which generates, from the contents of an instruction of the handheld device user 10, control information 121 for controlling the content processor 303 on the cooperating computer device 300;

a second communication processing unit 105 through which the second content identification information 320 about the contents specified by the handheld device user 10 is acquired from the cooperating computer device 300 so that the control information 121 is transmitted to the cooperating computer device 300 and a content processing controller 109 which controls the operation of the content processor 101 from the contents of the content identification information 320.

The cooperating computer device 300 comprises:

an output unit 305 for displaying the contents of the content file 210;

a third communication processing unit 301 employed for acquiring control information 121 transferred from the handheld device 100 and for transferring content identification information 320 for identifying contents specified by the handheld device user 10 to the handheld device 100;

a second content processor controller 306 which controls the operation of the content processor 303 on the base of the contents of the control information 121;

a content identification information acquisition unit 307 which acquires the content identification information 320 specified by the second content processor controller 306 from the content file 210;

a fourth communication processing unit 304 through which the requested content file 210 is acquired from the server 200 on the Internet, Intranet, or subscriber's LAN; and a content processor 303 which acquires, processes and presents the content file 210.

FIGS. 4 through 7 are flowcharts explanatory of the control operation in which contents displayed on the cooperating computer device 300 are transferred to and displayed on the handheld device 100 in the FIG. 3 embodiment.

Figure 4:
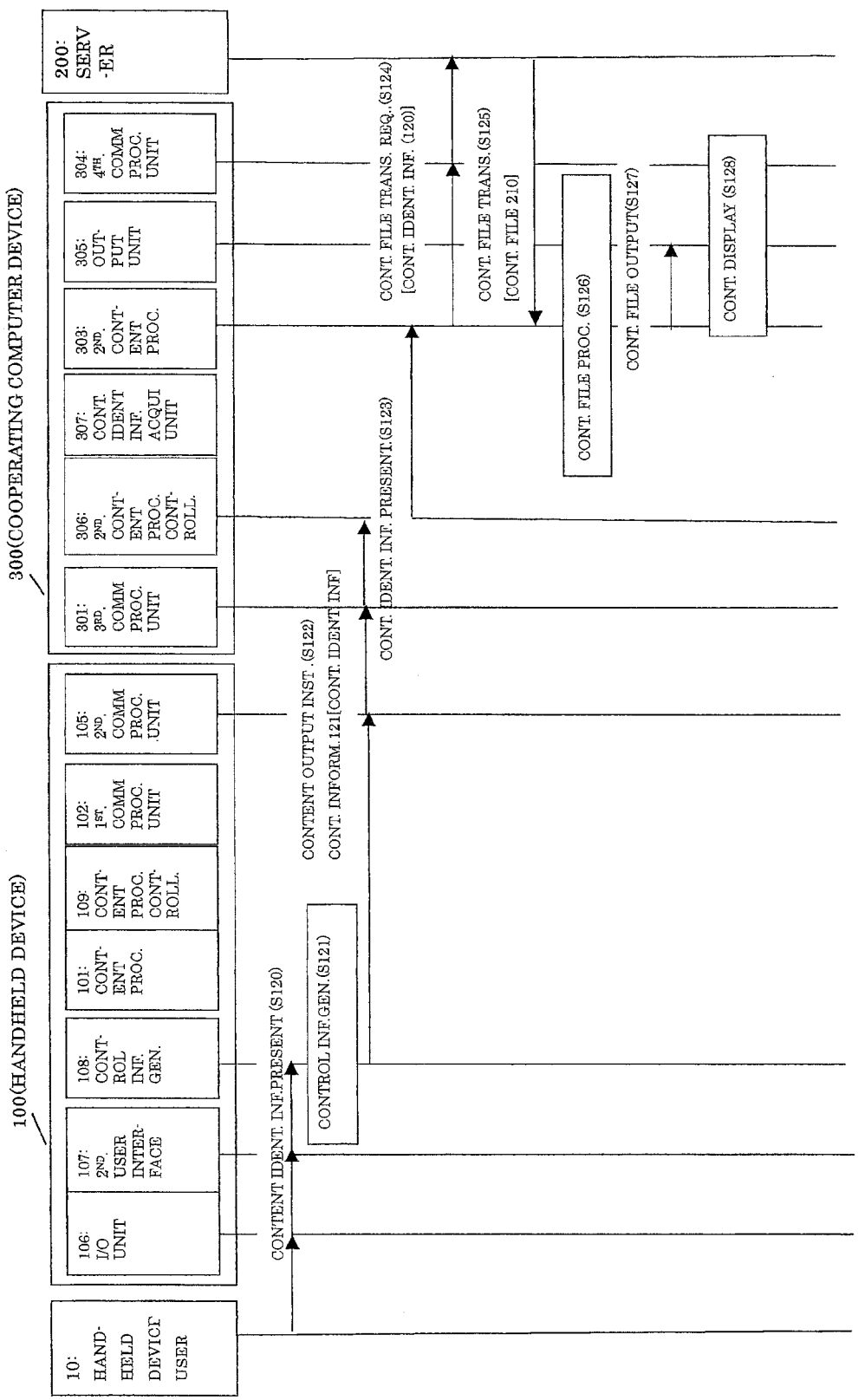
FIG. 4 is a flowchart explanatory of processing that the cooperating computer device responds to an instruction from a handheld device user to acquire content files from a server to the cooperating computer device in the embodiment illustrated in FIG. 3.
Figure 5:
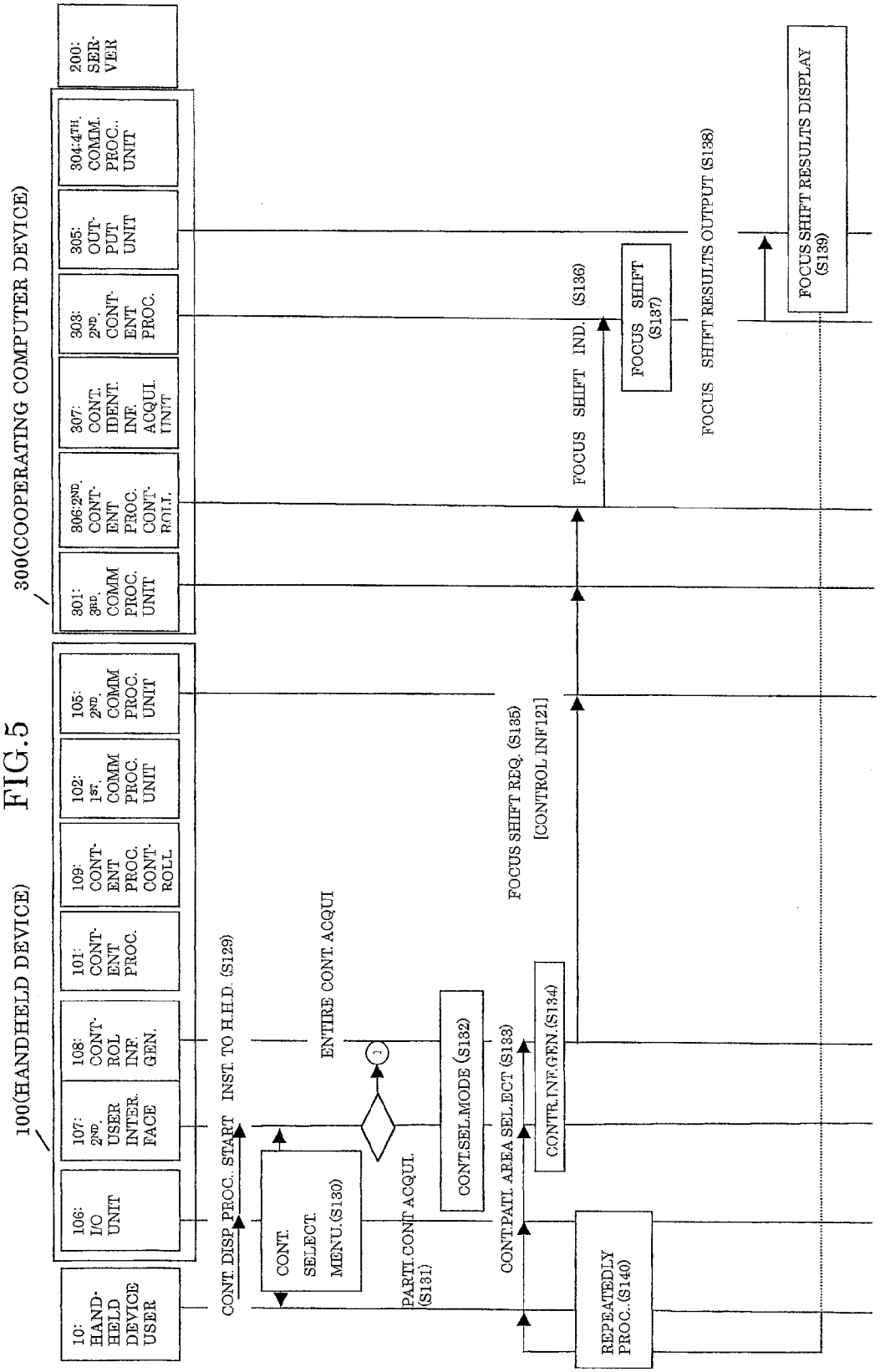
FIG. 5 is a flowchart explanatory of processing that the handheld device user monitors the contents displayed on the cooperating computer device and selects one of the contents which is to be displayed on the handheld device in the embodiment illustrated in FIG. 3.
Figure 6:
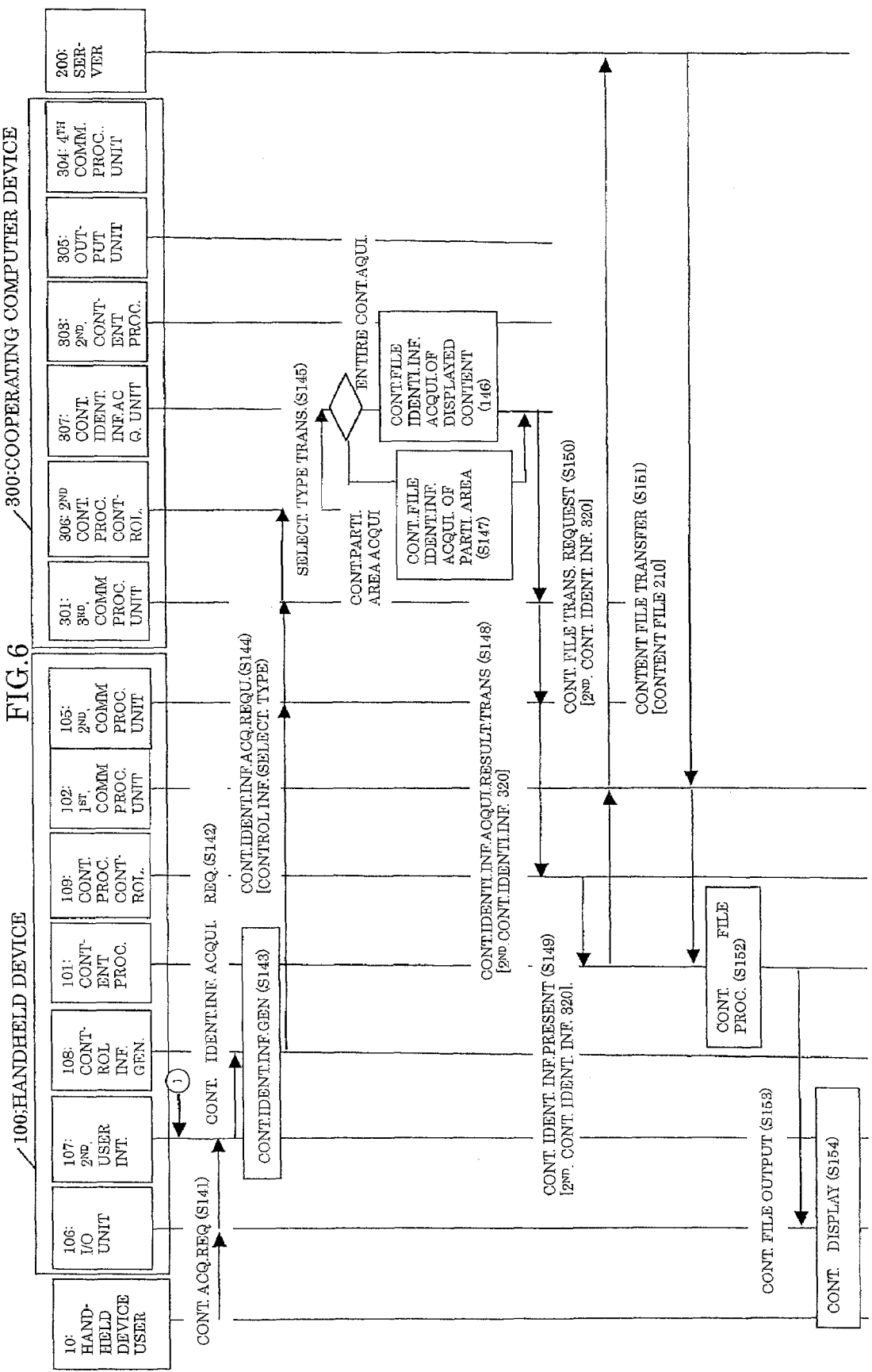
FIG. 6 is a flowchart explanatory of processing that the handheld device acquires thereto the content file for the contents selected on the cooperating computer device in the embodiment illustrated in FIG. 3.

FIGS. 4 to 6 are explanatory of such a sequence of operations as listed below.

(1) The cooperating computer device 300 responds to an instruction of the handheld device user 10 to acquire the content file 210 from the server 200 and output it onto the cooperating computer device 300.

(2) The handheld device user 10 monitors contents on the cooperating computer device 300 and selects contents to be displayed on the handheld device 100.

(3) The handheld device 100 acquires and displays the content file 210 concerning the contents selected on the cooperating computer device 300.

Figure 7:
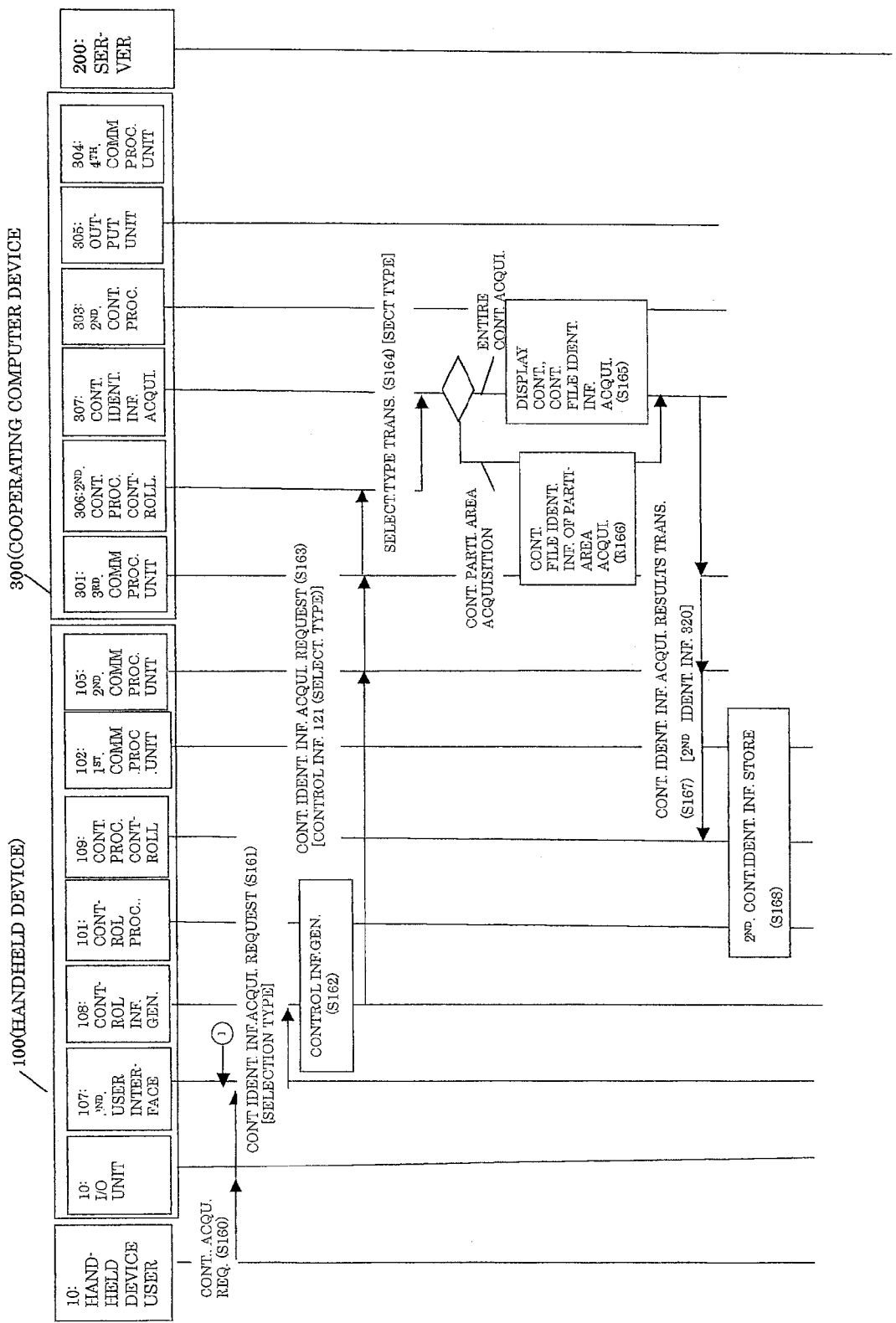
FIG. 7 is a flowchart explanatory of processing that the handheld device acquires thereto and stores therein content identification information about the contents selected on the cooperating computer device in the embodiment illustrated in FIG. 3.

FIG. 7 is explanatory of the following operation subsequent to those (1) and (2) mentioned above.

(4) The handheld device 100 acquires and holds therein content identification information concerning the contents selected on the cooperating computer device 300.

FIG. 4 is a flowchart illustrating an example of the operation that the cooperating computer device 300 responds to an instruction of the handheld device user 10 to acquire the content file 210 from the server 200 for display.

The handheld device user 10 presents the identification information concerning the contents to be acquired to the control information generator 108 via the I/O unit 106 and the second user interface 107 of the handheld device 100 (S120). In practice, Uniform Resource Locators (URL) or Uniform Resource Identifiers (URI) can be used as the content identification information.

Based on the input content identification information, the control information generator 108 generates the control information 121 which instructs the display of the contents on the cooperating computer device 300 (S121).

The control information 121 is transferred to the second content processor controller 306 via the second communication processing unit 105 of the handheld device and the third communication processing unit 301 of the cooperating computer device 300 (S122).

The second content processor controller 306 presents the content identification information contained in the received control information 121 to the content processor 303 (S123).

The content processor 303 requests the server 200 via the fourth communication processing unit 304 to transfer the content file 210 corresponding to the specified content identification (S124).

The content processor 303 acquires the content file 210 from the server 200 (S125), and processes it (S126). More specifically, when the content file 210 contains a text and image data, the content processor 303 decodes these data. When the content file 210 contains voice data or image data, it is decoded and played-back.

The result of processing of the content file 210 by the content processor 303 is provided via the output unit 305 (S127), where it is presented to the handheld device user 10 (S128).

FIG. 5 is a flowchart illustrating an example of the operation that the handheld device user 10 monitors the contents displayed on the cooperating computer device 300 and selects the contents to be displayed on the handheld device 100.

The handheld device user 10 sends via the I/O unit 106, to the second user interface 107 of the handheld device 100, information concerning the initiation of processing by which the contents displayed on the cooperating computer device 300 are transferred to and displayed on the handheld device 100 (S129).

Upon receiving the above information, the second user interface 107 presents to the handheld device user 10 a menu for selecting whether the contents to be displayed on the handheld device 100 is the whole contents (for example, the entire Web page) displayed on the cooperating computer device 300 or a partial area (image data on the Web page or other contents linked with the Web page) of the displayed contents (S130).

In this case, when the handheld device user 10 selects the partial area of the displayed contents (S131), the second user interface 107 goes into a content selection mode (S132). The second user interface 107 provides an interface which permits selecting a partial area of the contents displayed on the cooperating computer device 300, for example, an interface which controls a pointer function of the cooperating computer device 300 or shifts the focus based on tag information.

In the content selection mode, the handheld device user 10 performs on the second user interface 107 operations for selecting a partial area of the contents being displayed on the cooperating computer device 300, such as operations for specifying and determining the direction of movement of the pointer on the cooperating computer device 300 or for specifying the direction of movement of the focus (S133).

The control information generator 108 generates the control information 121 corresponding to the event contents transferred from the second user interface 107 (S134).

The control information 121 is transferred to the second content processor controller 306 via the second communication processing unit 105 of the handheld device 100 and the third communication processing unit 301 of the cooperating computer device 300 (S135).

In accordance with the contents of the control information 121, the second content processor controller 306 determines the direction of pointer movement or instructs the movement of the focus (S136), urging the content processor 303 to move or shift the focused portion of the contents displayed on the cooperating computer device 300 (S137).

The result of focus movement is output to the output unit 305, where which it is presented to the handheld device user 10 (S139).

By repeating the processing from steps S133 to S139, the handheld device user 10 selects a partial area of the contents displayed on the cooperating computer device 300 (S140).

FIG. 6 is a flowchart illustrating an example of the operation that the handheld device user 10 acquires a content file for the contents selected on the cooperating computer device 300 and outputs it onto the handheld device 100.

In a case where the handheld device user 10 selects the whole or partial area of contents displayed on the cooperating computer device 300 (S141), the second user interface 107 instructs the control information generator 108 to acquire the content identification information 320 (S142).

At this time, the second user interface 107 presents to the control information generator 108 at least selected-type information for identifying whether the handheld device user 10 has selected the whole or partial area of the displayed contents.

The control information generator 108 generates the control information 121 which contains the "selected-type information" provided from the second user interface 107 (S143).

The control information 121 is transferred to the second content processor controller 306 via the second communication processing unit 105 of the handheld device 100 and the third communication processing unit 301 of the cooperating computer device 300 (S144).

The second content processor controller 306 transfers the selected-type information of the control information 121 to the content identification information acquisition unit 307 (S145).

When having received the selected-type information that the whole contents are being selected, the content identification acquisition unit 307 acquires, as the second content identification information, identification information for identifying the whole content file displaying on the cooperating computer device 300 (S146). On the other hand, when having received the selected-type information that a partial area of the contents is being selected, the content identification information acquisition unit 307 acquires, as the second content identification information 320, identification information for identifying a content file which forms the currently focused area (S147).

The second content identification information 320 thus obtained is applied to the content processor controller 109 of the handheld device 100 via the third communication processing unit 301 of the cooperating computer device 300 and the second communication processing unit 105 of the handheld device 100 (S148).

The content processor controller 109 presents the second content identification information 320 to the content processor 101 of the handheld device 100, urging it to acquire the content file 210 (S149).

The content processor 101 requests the server 200 via the first communication processing unit 102 to transfer the content file 210 concerning the specified contents (S150).

The content processor 101 obtains the content file 210 from the server 200 (S151), and processes the content file 210 (S152). When the content file 210 contains a text and image data, the content processor 101 decodes their data, whereas the content file 210 contains voice data or image data, the content processor 101 decodes and plays back it.

The result of processing of the content file 210 by the content processor 101 is output to the I/O unit 106 of the handheld device 100 (S153) for display to the handheld device user 10 (S154).

FIG. 7 is a flowchart illustrating an example of the operation that the handheld device user 10 obtains and holds therein content identification information about the contents selected on the cooperating computer device 300.

In a case where the handheld device user 10 has selected the acquisition of content identification for the whole or partial area of the contents (S160) after the operation described above with reference to FIG. 5, the second user interface 107 instructs the control information generator 108 to obtain the content identification information 320 (S161). At this time, the second user interface 107 presents to the control information generator 108 at least selected-type information for identifying whether the handheld device user 10 has selected the acquisition of the content identification information about the whole or partial area contents of the displayed contents.

The control information generator 108 generates control information 121 containing the selected-type information presented from the second user interface 107 (S162).

The control information 121 is applied to the second content processor controller 306 via the second communication processing unit 105 of the handheld device 100 and the third communication processing unit 301 of the cooperating computer device 30 (S163).

The second content processor controller 306 transfers the selected type information of the control information to the content identification information acquisition unit 307 (S164).

When having received the selected-type information that the whole contents are being selected, the content identification information acquisition unit 307 acquires, as the second content identification information 320, identification information for identifying the whole content file (S165).

When having received the selected-type information that a partial part of the contents is being selected, the content identification information acquisition unit 307 acquires, as the second content identification information 320, identification information for identifying the content file 210 forming the currently focused area (S166).

The second content identification information 320 thus obtained is applied to the content processor controller 109 of the handheld device 100 via the third communication processing unit 301 of the cooperating computer device 300 and the second communication processing unit 105 of the handheld device 199 (S167).

The content processor controller 109 stores the second content identification information 320 in the handheld device 100 (S168).

Figure 8B:
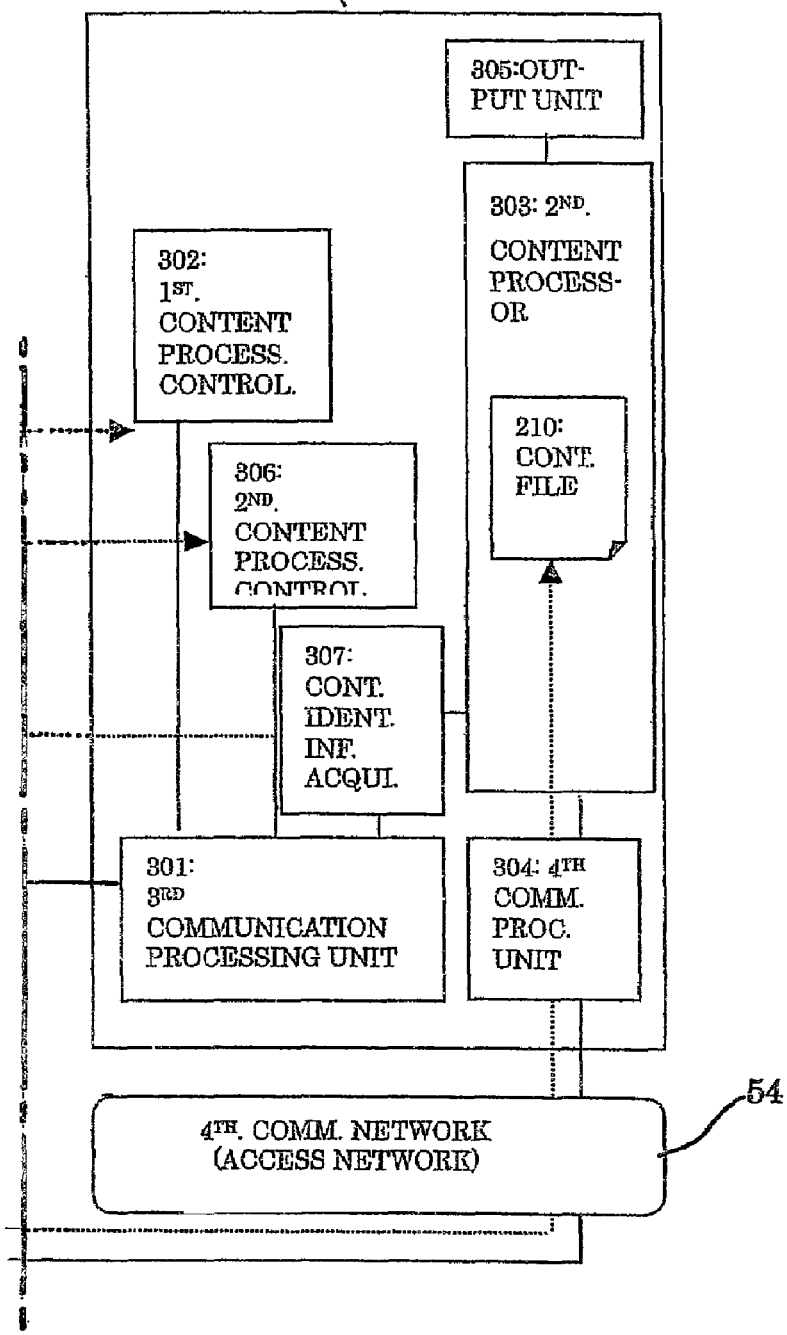
FIG. 8 is a block diagram illustrating another embodiment of the content viewing system according to the present invention that permits control of the destination of contents between the handheld device and the cooperating computer device.

FIG. 8 is a block diagram illustrating another embodiment of the contents display system which permits switching the transfer destination of contents between the handheld device 100 and the cooperating computer device 300.

The handheld device 100 comprises, in addition to the content processor 101, the first communication processing unit 102, the first user interface 103, the content identification information acquisition unit 104, the second communication processing unit 105, the I/O unit 106, the second user interface 107, the control information generator 108 and the content processor controller 109 referred to in the above examples, a third user interface 110 to which the handheld device user 10 inputs an instruction for switching between the first and second user interfaces 103 and the second user iterface 107.

The cooperating computer device 300 is provided with the third communication processing unit 301, the first content processor controller 302, the content processor 303, the fourth communication processing unit 304, the output unit 305, the second content processor controller 306 and the content identification acquisition unit 307 mentioned in the above examples.

FIG. 9 is a flowchart explanatory of operations of the FIG. 8 embodiment for switching between the transfer of contents displayed on the handheld device 100 to the cooperating computer device 300 for display thereon and the transfer of contents displayed on the cooperating computer device 300 to the handheld device 100 for display thereon.

At its start-up or in its initial state, the handheld device user 10 instructs the handheld device 100 so that an input event via the I/O unit 106 is addressed to the content processor 101 and the first user interface 103 (S170).

In this state, by presenting identification information of contents A to the content processor 101, the handheld device user 10 can cause it to process the contents A (S171) and provide the result of processing to the I/O unit 106 (S172)

Alternatively, by presenting identification information of contents B to the content processor 101, the handheld device user 10 may cause it to process the contents B (S173) and provide the result of processing to the I/O unit 106 (S174).

Further, by presenting content identification information of the whole or partial area of the contents displayed on the handheld device 100 to the content processor 303 of the cooperating computer device 300 at an arbitrary stage during content output processing on the handheld device 100, it is possible for the handheld device user 10 to cause the content processor 303 to process the whole or partial area of the contents (S175) to change the transfer destination of the processed contents (S176). This is processing for changing the transfer destination of the whole contents (contents B) displayed on the handheld device 100 to the cooperating computer device.

Moreover, by presenting identification information of contents C to the content processor 101 of the handheld device 100, the handheld device user 10 may also cause the content processor 101 to processing the contents C (S177) and output the result of processing to the I/O unit (S178).

Besides, the handheld device user 10 can switch the transfer destination of the input event from the I/O unit 106 to the second user interface 107 by providing a user interface switching instruction to the third user interface 110 at the above-mentioned arbitrary stage during the content output processing on the cooperating computer device 100 (S179).

Thereafter, the handheld device user 10 is allowed to control the content output processing on the cooperating computer device 300 via the second user interface 107.

By presenting identification information of contents D to the content processor 303 of the cooperating computer device 300, the handheld device user 10 may cause it to process the contents D (S180) and output the result of processing to the output unit 305 (S181).

Further, by presenting content identification information of the whole or partial area of the contents displayed on the cooperating computer device 300 to the content processor 101 of the handheld device 100 at an arbitrary stage during the content output processing on the cooperating computer device 300, it is possible for the handheld device user 10 to cause the content processor 101 to process the whole or partial area of the contents (S182) to change the transfer destination of the processed contents (S183). This is processing for changing the transfer destination of the whole contents (contents D) displayed on the cooperating computer device 300.

By presenting identification information of contents E to the content processor 303 of the cooperating computer device 300 after the above processing, the handheld device user 10 may cause the content processor 303 to process the contents E (S184) and output the result of processing to the output unit 305 (S185).

Besides, the handheld device user 10 can switch the destination of the input event from the I/O unit 106 to the first user interface 103 by providing a user interface switching instruction to the third user interface 110 at an arbitrary stage during the content output processing on the cooperating computer device 300 (S186).

Thereafter, the handheld device user 10 is allowed to control the content output processing on the handheld device 100 via the first user interface 103.

After this, the handheld device user 10 can freely control the contents to be output and its transfer destination by repeating steps S170 through S186.

FIGS. 10 to 23 are block diagrams and flowcharts for explaining other embodiments of the content viewing system according to the present invention which allow the handheld device user 10 to select the cooperating computer device 300 to link with the handheld device 100.

Figure 10:
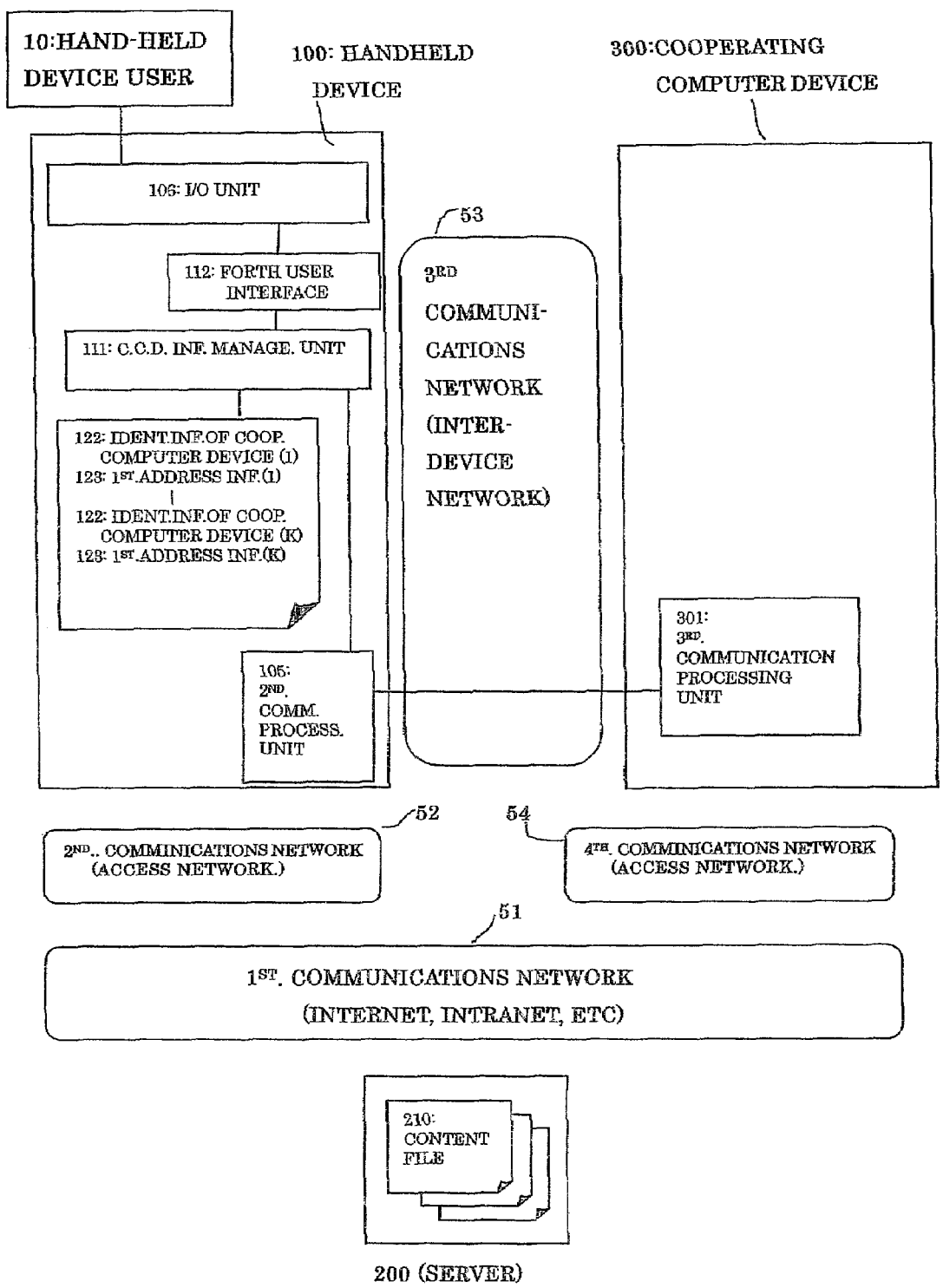
FIG. 10 is a block diagram illustrating another embodiment of the content viewing system according to the present invention that enables the handheld device user to select a desired cooperating computer device from a list of cooperates and to register previously on the handheld device.

FIG. 10 depicts an example of the functional system configuration that allows the handheld device user 10 to select a desired cooperating computer device 300 from a list of cooperating computer devices 300 pre-registered with the handheld device 100. Incidentally, this example will be described as being an additional function of the content viewing system described above with reference to FIGS. 1 to 8.

The handheld device 100 is provided with:

a cooperating computer device information management unit 111 which manages at least one piece of identification information of cooperating computer device 122 for identifying the cooperating computer device 300 and at least one piece of first address information 123 necessary for communication with the cooperating computer device 300 identified with the identification information of cooperating computer device 122; and a fourth user interface 112 which presents at least one piece of identification information of cooperating computer device 122 or first address information 123 managed by the cooperating computer device information management unit 111 to the handheld device user 10 to urge him to select the cooperating computer device 300 to be linked with the handheld device 100 and accepts the selection results from the handheld device user 10.

Figure 11:
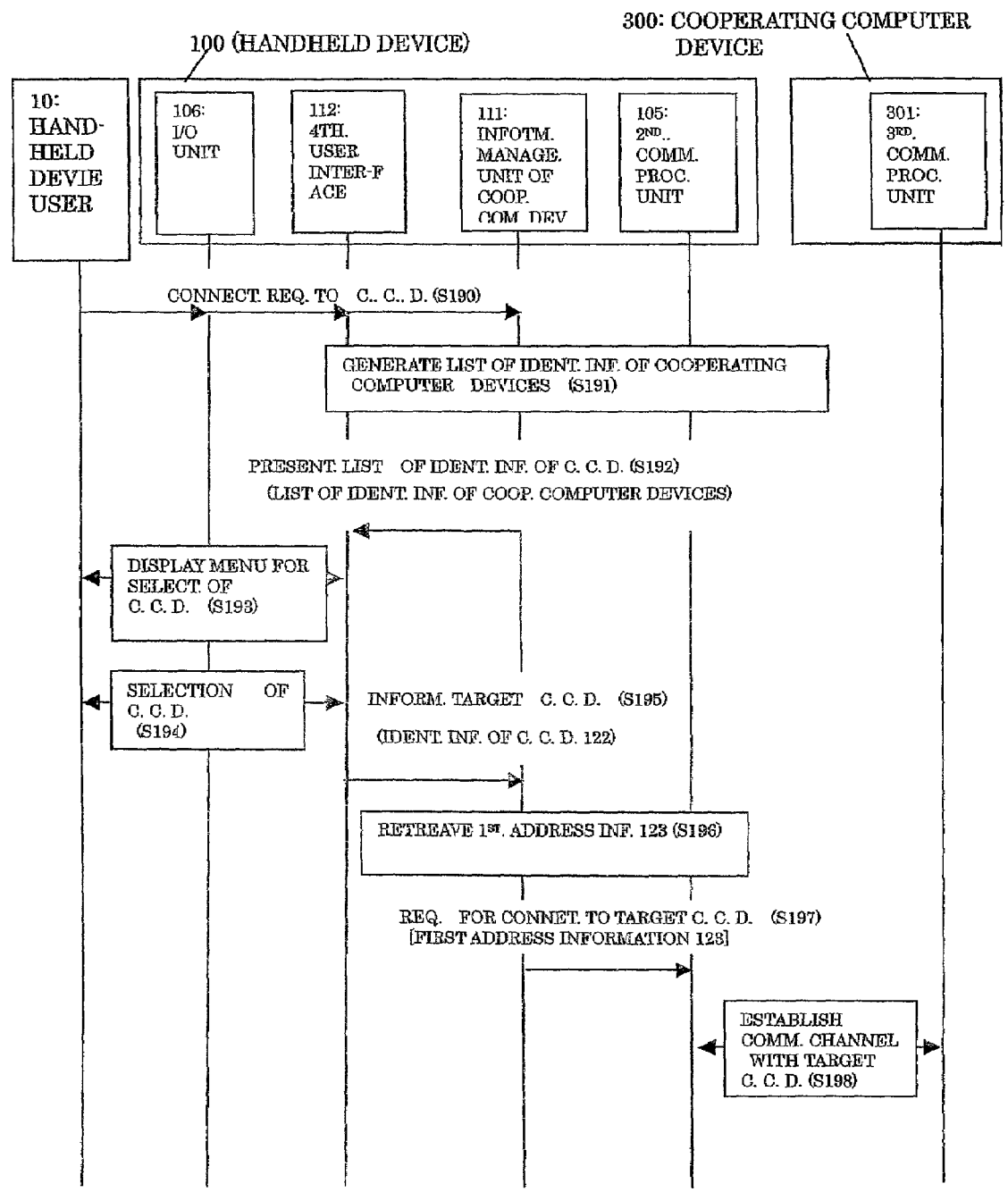
FIG. 11 is a flowchart explanatory of an example of an operation for establishing a channel in the embodiment illustrated in FIG. 10.

FIG. 11 is a flowchart for explaining an example of channel establishment processing in the content display system of FIG. 10 equipped with a channel establishment function.

The handheld device user 10 requests the fourth user interface 112 for connection to the cooperating computer device 300, and this request signal is applied to the cooperating computer device information management unit 111 of the handheld device 100 (S190). Upon receiving the request signal, the cooperating computer device information management unit 111 retrieves at least one piece of identification information of cooperating computer device 122 held therein and makes up a list of identification information of cooperating computer device (S191).

The list of identification information of cooperating computer device is sent to the fourth user interface 112 (S192). Based on the contents of the list, the fourth user interface 112 presents a cooperating computer device selection menu to the handheld device user 10 (S193).

Upon receiving the menu, the handheld device user 10 selects the cooperating computer device 300 to be connected (S194). The fourth user interface 112 presents the identification information of cooperating computer device 122 about the selected cooperating computer device to the cooperating computer device information management unit 111 (S195).

The cooperating computer device information management unit 111 retrieves first address information 123 corresponding to the presented identification information of presented cooperating computer device 122 (S196) and presents the retrieved first address information 123 to the second communication processing unit 105, urging it to establish a communication channel between it and the third communication processing unit 301 of the selected cooperating computer device 300 (S197).

Based on the first address information 123 presented thereto, the second communication processing unit 105 establishes a channel between it and the third communication processing unit 301 of the selected cooperating computer device 300 based on the presented first address information 123 (S198).

Figure 12:
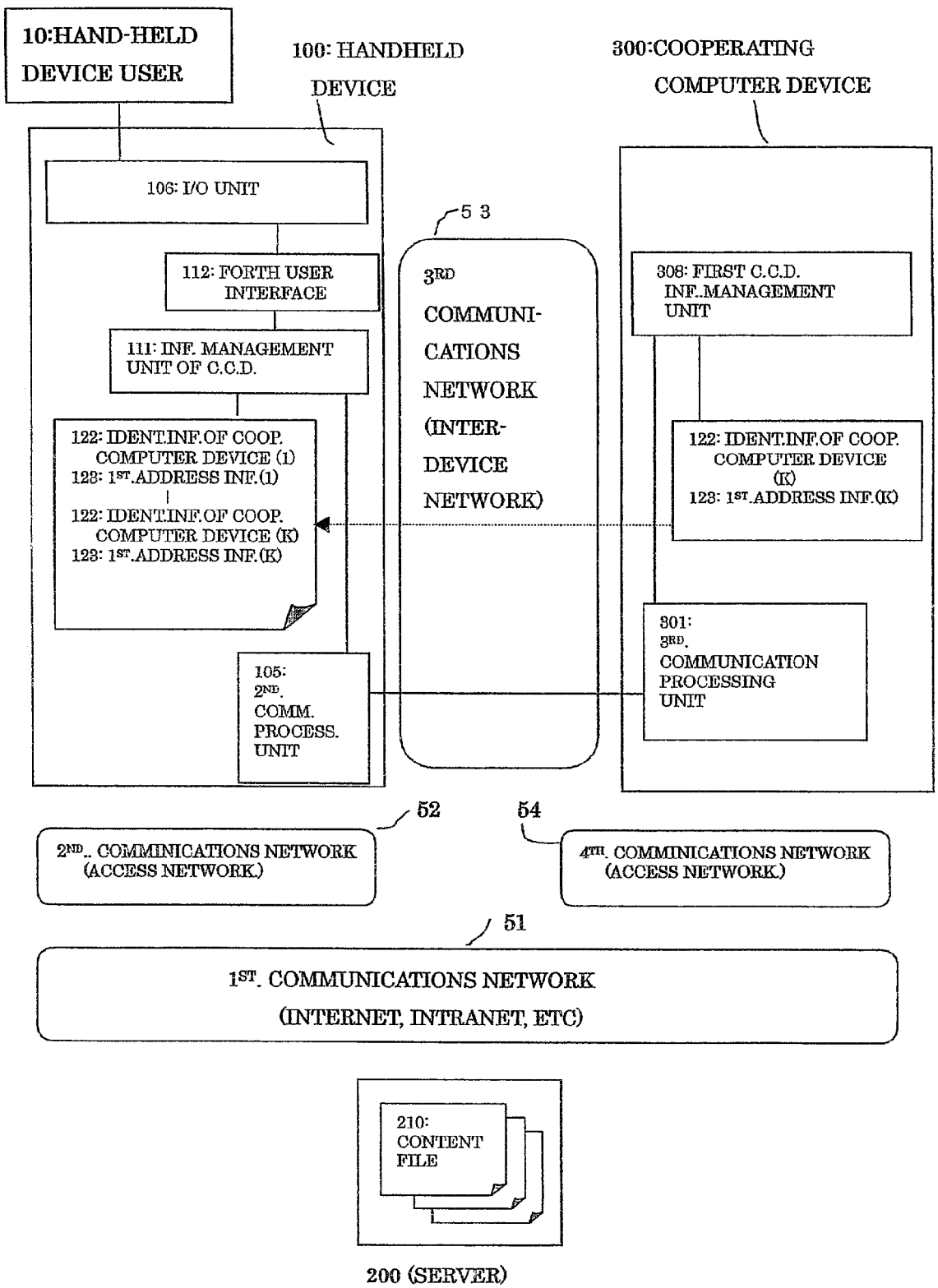
FIG. 12 is a block diagram illustrating another embodiment of the content viewing system according to the present invention that enables the handheld device user to select a desired cooperating computer device from among those connectable thereto as required.

FIG. 12 illustrates in block form an example of a functional configuration that permits the handheld device user 10 to select a required one of cooperating computer devices 300 connectable to the handheld device 100. Incidentally, this example will be described as being an additional function of the content display system described above with reference to FIGS. 1 to 8.

In the illustrated example each cooperating computer device 300 has a first computer device information management unit 308 which holds identification information of cooperating computer device 122 for identifying the cooperating computer device 300 and first address information 123 necessary for communication with the handheld device 100.

Figure 13:
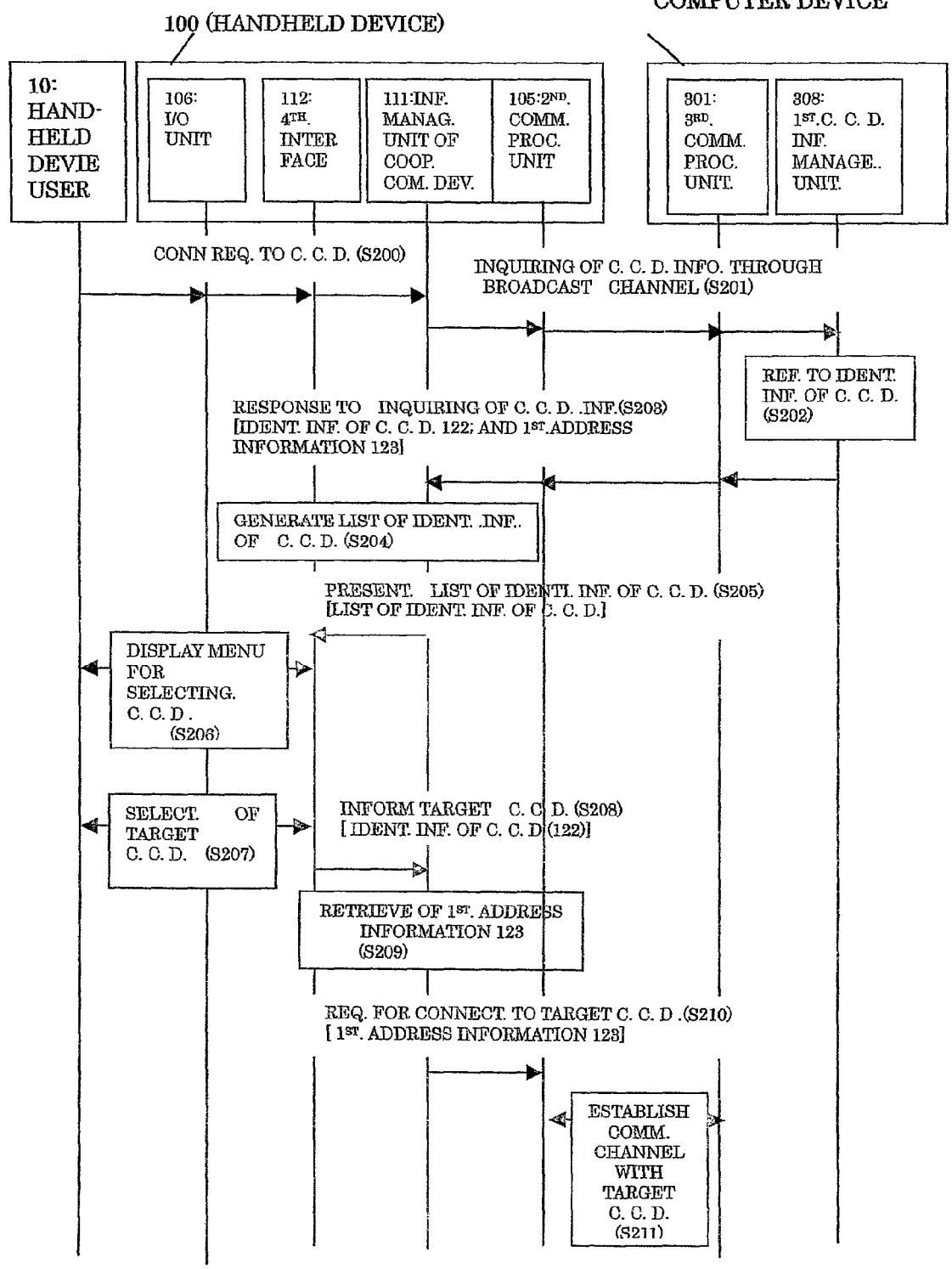
FIG. 13 is a flowchart explanatory of an example of the channel establishing operation in the embodiment illustrated in FIG. 12.

FIG. 13 is a flowchart explanatory of an example of channel establishing processing in the content viewing system shown in FIG. 12.

The handheld device user 10 requests the fourth user interface 112 for connection to the cooperating computer device 300, and the request signal is applied to the cooperating computer device information management unit 111 of the handheld device 100 (S200).

Upon receiving the request signal, the cooperating computer device information management unit 111 inquires of at least one of the cooperating computer devices 300 about its identification information of cooperating computer device 122 and address information 123 via a broadcast channel on the third communications network 53 (S201).

Upon receiving the inquiry, the first cooperating computer device information management unit 308 of the cooperating computer device 300 refers to its identification information of cooperating computer device 122 and first address information 123 (S202) and sends an answer containing these pieces of information to the cooperating computer device information management unit 111 of the handheld device 100 having made the inquiry (S203).

The cooperating computer device information management unit 111 of the handheld device 100 waits for an answer from the cooperating computer device 300 for a certain period of time and makes up a list of identification information of cooperating computer devices 122 based on the identification information of cooperating computer device 122 about at least one cooperating computer device 300 obtained by the above inquiry (S204).

The identification information of cooperating computer device list is sent to the fourth user interface 112 (S205).

Based on the list of identification information of cooperating computer device sent thereto, the fourth user interface 112 presents a cooperating computer device selection menu to the handheld device user 10 (S206).

The handheld device user 10 selects, through the menu presented thereto, the cooperating computer device 300 to be connected (S207).

The fourth user interface 112 sends the identification information of cooperating computer device 122 about the selected cooperating computer device 300 to the cooperating computer device information management unit 111 (S208).

The cooperating computer device information management unit 111 retrieves the first address information 123 corresponding to the identification information of cooperating computer device 122 (S209), and presents the retrieved address information 123 to the second communication processing unit 105, thereby urging it to establish a communication channel between it and the third communication processing unit 301 of the selected cooperating computer device 300 (S210).

The second communication processing unit 105 establishes a communication channel between it and the third communication processing unit 301 of the selected cooperating computer device 300 based on the first address information 123 (S211).

Figure 14:
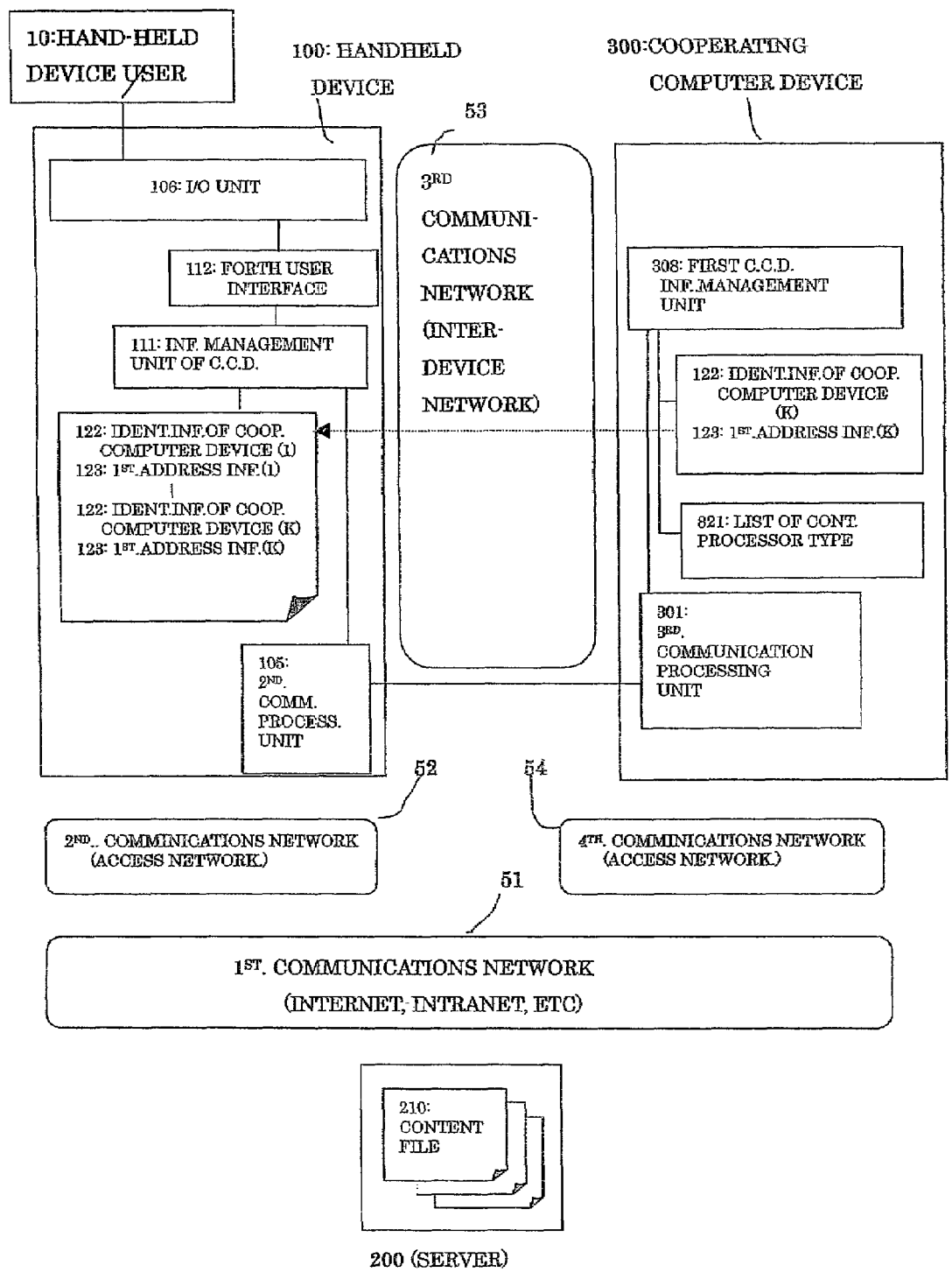
FIG. 14 is a block diagram illustrating another embodiment of the content viewing system according to the present invention that enables the handheld device user to select a desired cooperating computer device from among those equipped with particular content processing capabilities.

FIG. 14 illustrates in block form an example of a functional configuration which permits the handheld device user 10 to select that one of cooperating computer devices 300 which is equipped with a particular content processing function. Incidentally, this example will be described as being limited to an additional function of the content viewing system described above with reference to FIGS. 1 to 8.

In the illustrated example, the first cooperating computer device information management unit 308 of each cooperating computer device 300 manages or holds a list of content processor type 321 which the handheld device user 10 are allowed to use.

Figure 15:
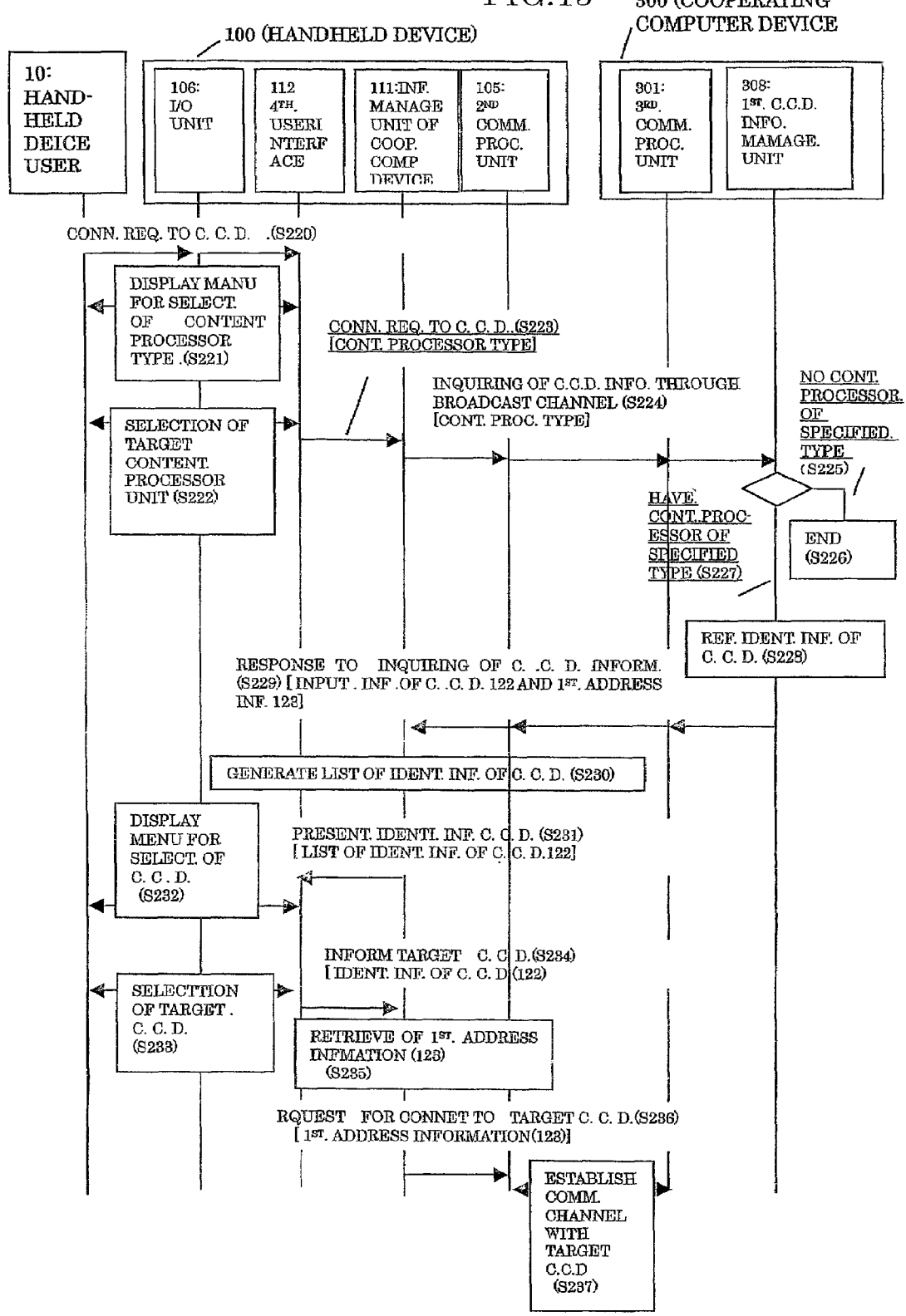
FIG. 15 is a flowchart explanatory of an example of the channel establishing operation in the embodiment illustrated in FIG. 14.

FIG. 15 is a flowchart explanatory of an example of channel establishment processing in the content viewing system shown in FIG. 14.

The handheld device user 10 requests the fourth user interface 112 of the handheld device 100 to establish a connection to at least one of the cooperating computer devices 300 (S220). Upon receiving the request signal, the fourth user interface 112 presents to the handheld device user 10 a selection menu from which he selects the type of content processor desired to use on the cooperating computer device 300 (S221). The handheld device user 10 selects the type of content processor desired to use through the selection menu (S222). The fourth user interface 112 sends to the cooperating computer device information management unit 111 a cooperating computer device connection request signal containing the type of content processor selected by the handheld device user 10 (S223).

Upon receiving the request signal, the cooperating computer device information management unit 111 presents, via a broadcast channel on the third communication network 53, the type of the content processor selected by the handheld device user 10 to the cooperating computer device 300, thereby inquiring about its terminal identification information 122 and address information 123 (S224).

The first cooperating computer device identification information management unit 308 of the cooperating computer device 300 having received the inquiry discontinues processing (S226) if the cooperating computer device 300 has no content processor of the type selected by the handheld device user 10 (S225). When the cooperating computer device 300 has the content processor of the specified type (S227), the first cooperating computer device information management unit 308 refers to the terminal identification information 122 and first address information 123 held therein (S228) and sends an answer containing these pieces of information to the cooperating computer device information management unit 111 of the handheld device 100 having made the inquiry(S229).

The cooperating computer device information management unit 111 of the handheld device 100 waits for an answer from the cooperating computer device 300 for a certain period of time, and, based on the thus obtained identification information of cooperating computer devices 122 about the cooperating computer devices 300, makes up a list of identification information of cooperating computer devices 122 based on them obtained by the above inquiry (S230).

The identification information of cooperating computer device list is presented to the fourth user interface 112 (S231). Based on the contents of the identification information of cooperating computer device list, the fourth user interface 112 presents a cooperating computer device selection menu to the handheld device user 10 (S232).

The handheld device user 10 selects the cooperating computer device 300 to be connected, through the cooperating computer device selection menu (S233). The fourth user interface 112 presents to the cooperating computer device information management unit 111 the identification information of cooperating computer device 122 about the selected cooperating computer device 300 (S234).

The cooperating computer device information management unit 111 retrieves the first address information 123 corresponding to the presented identification information of cooperating computer device 122 (S235) and presents the retrieved first address information 123 to the second communication processing unit 105, thereby urging it to establish a channel between it and the third communication processing unit 301 of the selected cooperating computer device 300 (S236).

The second communication processing unit 105 establishes a communication channel between it and the third communication processing unit 301 of the selected cooperating computer device 300 based on presented first address information 123 (S237).

Figure 16:
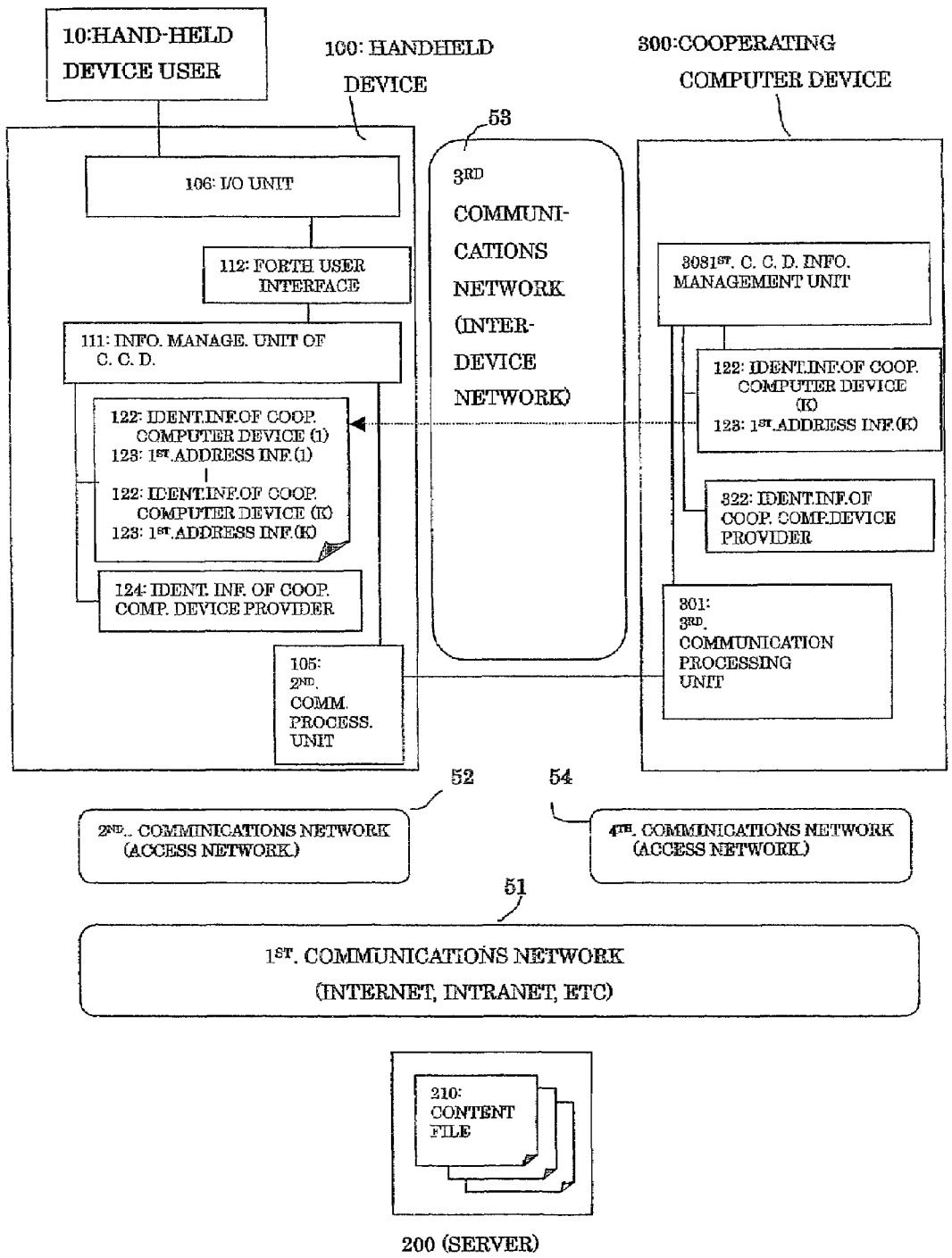
FIG. 16 is a block diagram illustrating another embodiment of the content viewing system according to the present invention that enables the handheld device user to select a desired cooperating computer device from among those offered by particular owners or operators.

FIG. 16 illustrates in block form an example of a function configuration which permits the handheld device user 10 to select a desired one of cooperating computer devices 300 provided by particular owners or operators. Incidentally, this example will be described as being limited to an additional function of the content viewing system described above with reference to FIGS. 1 to 8.

In this example, the first cooperating computer device information management unit 308 of each cooperating computer device 300 holds or manages identification information of cooperating computer device provider 322 for identifying the owner or operator of the cooperating computer device 300, and the cooperating computer device information management unit 111 of the handheld device 100 holds or manages identification information of cooperating computer device provider 124 for identifying owners or operators of cooperating computer devices 300 that can be linked to the handheld device 100.

Figure 17:
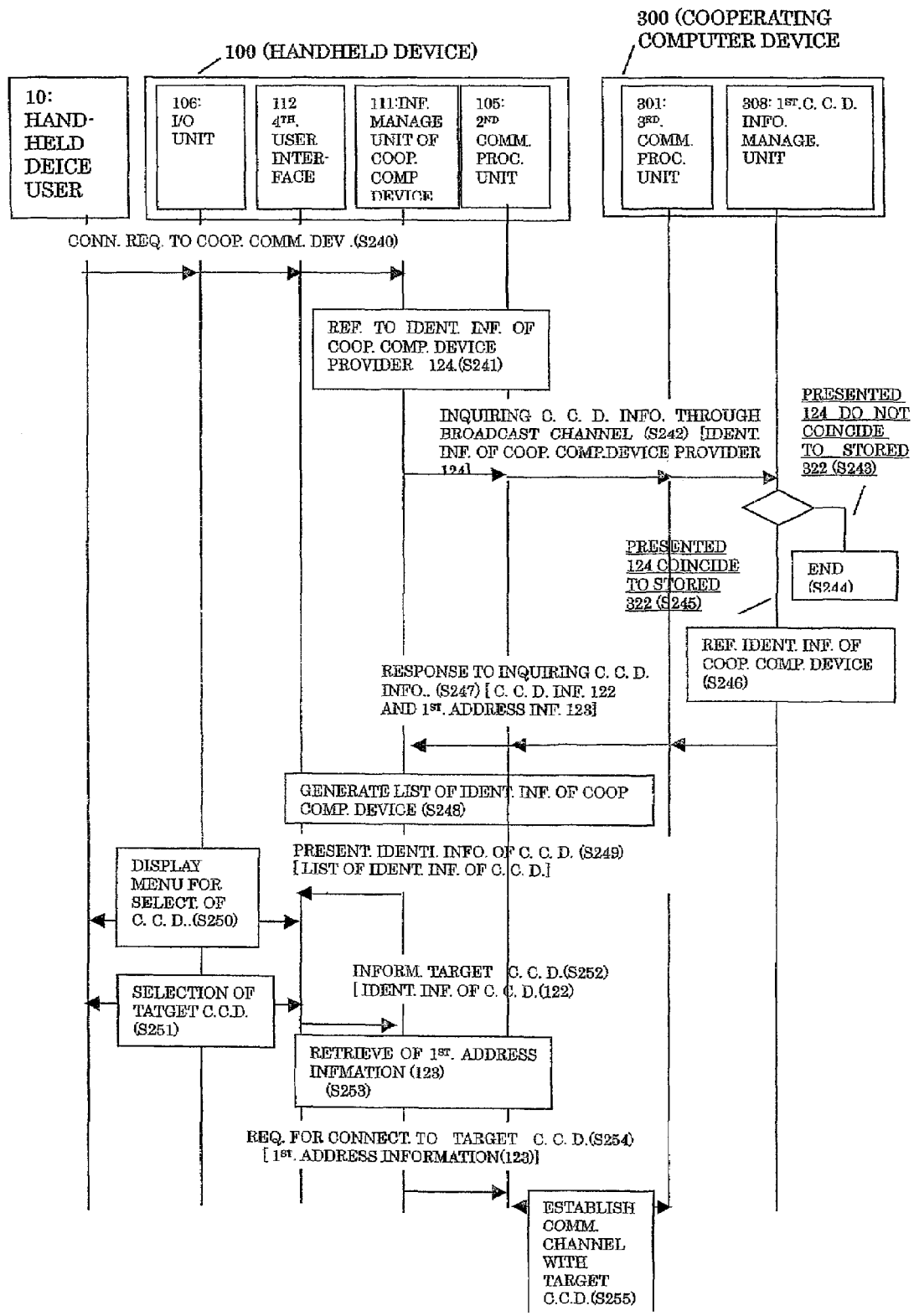
FIG. 17 is a flowchart explanatory of an example of the channel establishing operation in the embodiment illustrated in FIG. 16.

FIG. 17 is a flowchart explanatory of an example of channel establishment processing in the content display system shown in FIG. 16.

The handheld device user 10 requests the fourth user interface 112 of the handheld device 100 to connect to at least one of the cooperating computer devices 300, and the request signal is sent to the cooperating computer device information management unit 111 of the handheld device 100 (S240).

Upon receiving the request signal, the cooperating computer device information management unit 111 refers to the identification information of cooperating computer device provider 124 (S241) and presents the identification information of cooperating computer device provider 124 via a broadcast channel on the third communication network 53, thereby inquiring at least one of the cooperating computer devices 300 about its the identification information 122 and address information 123 (S242).

The first cooperating computer device information management unit 308 of the cooperating computer device 300 having received the inquiry discontinues processing (S244) when the identification information of cooperating computer device provider 124 presented thereto does not match with the identification information of cooperating computer device provider 322 held in the cooperating computer device information management unit 308 (S243). On the other hand, when a match result is found between the identification information of presented cooperating computer device provider 124 and the identification information of cooperating computer device provider 322 (S245), the first cooperating computer device information management unit 308 refers to the identification information of cooperating computer device 122 and the first address information 123 held therein (S246) and sends an answer containing these pieces of information to the cooperating computer device information management unit 111 of the handheld device 100 (S247).

The cooperating computer device information management unit 111 of the handheld device 100 waits for an answer from the cooperating computer device 300 for a certain period of time, and, based on the identification information of cooperating computer device 122 about at least one cooperating computer device 300 obtained as mentioned above (s248), makes up a list of identification information of cooperating computer device 122.

The identification information of cooperating computer device list is presented to the fourth user interface 112 (S231). Based on the contents of the identification information of cooperating computer device list, the fourth user interface 112 presents a cooperating computer device selection menu to the handheld device user 10 (S232).

The handheld device user 10 selects the cooperating computer device 300 to be connected, through the cooperating computer device selection menu (S251). The fourth user interface 112 presents the identification information of cooperating computer device 122 of the selected cooperating computer device 300 to the cooperating computer device information management unit 111 (S252).

The cooperating computer device information management unit 111 retrieves the first address information 123 corresponding to the identification information of cooperating computer device 122 presented thereto (S253) and presents the retrieved address information 123 to the second communication processing unit 105, thereby urging it to establish a communication channel between it and the third communication processing unit 301 of the selected cooperating computer device 300 (S254).

The second communication processing unit 105 establishes a communication channel between it and the third communication processing unit 301 of the selected cooperating computer device 300 based on the presented address information 123 (S255).

Figure 18:
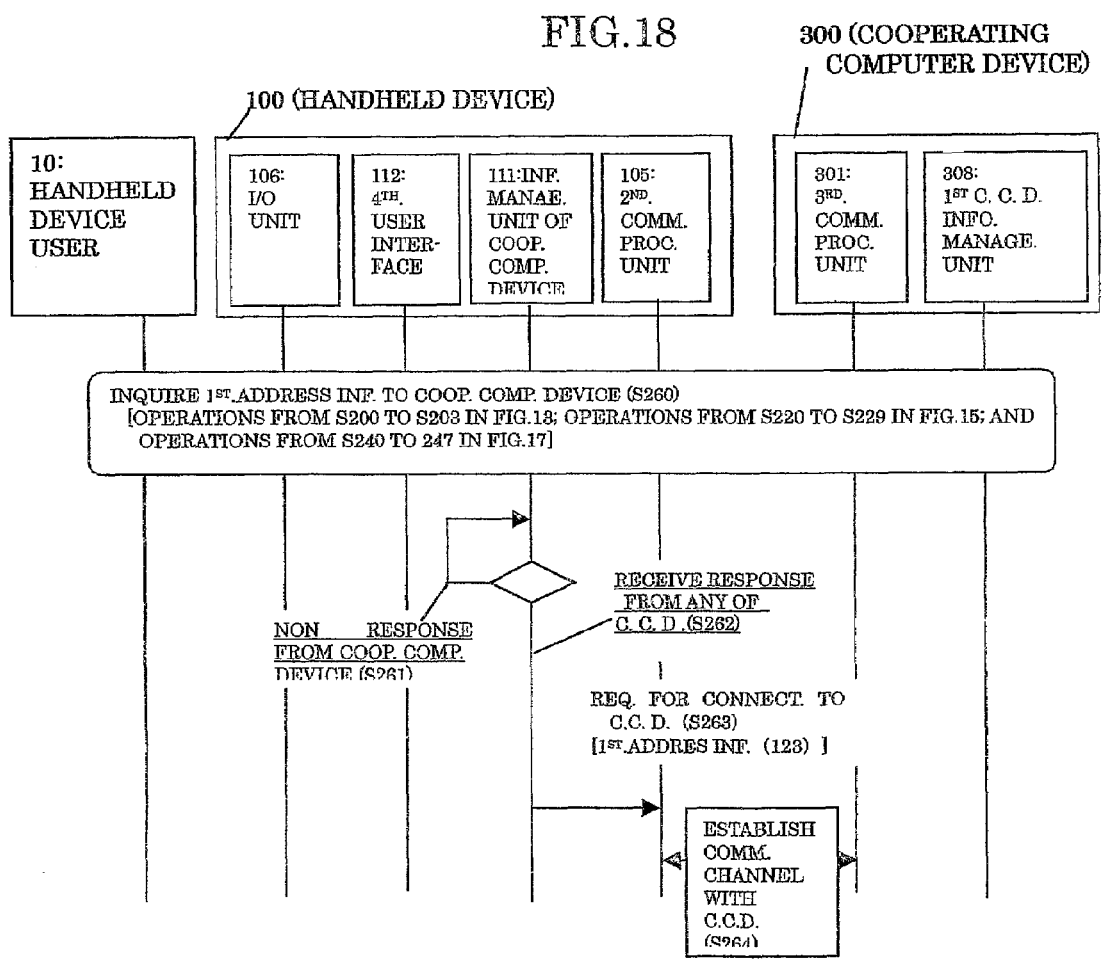
FIG. 18 is a flowchart explanatory of operations of the embodiments of FIGS. 12, 14 and 16 when each incorporates therein the functional configuration for establishing a channel between the handheld device and a cooperating computer device connected thereto by a first address.

FIG. 18 is a flowchart illustrating, by way of example, operations for establishing a communication channel between the handheld device 100 and the cooperating computer device 300, which answers earliest to the inquire from the handheld device 100. Such a communication channel can be established in the content display systems of the functional configurations depicted in FIGS. 12, 14 and 16.

The handheld device 100 responds to an instruction from the handheld device user 10 to inquire at least one cooperating computer device 300 about its identification information 122 and address information 123 (S260).

While receiving no answer from any of the cooperating computer devices 300, the cooperating computer device information management unit 111 of the handheld device 10 remains waiting for an answer (S261). When receiving an answer from any one of the cooperating computer devices 300 (S262), the cooperating computer device information management unit 111 presents the received first address information 123 to the second communication processing unit 105, urging it to establish a communication channel between it and the third communication processing unit 301 of the cooperating computer devices 300 having answered the inquiry (S263).

The second communication processing unit 105 establishes a communication channel between it and the third communication processing unit 301 of the cooperating computer device 300 based on the first address information 123 presented to the second communication processing unit 105 (S264).

Figure 19:
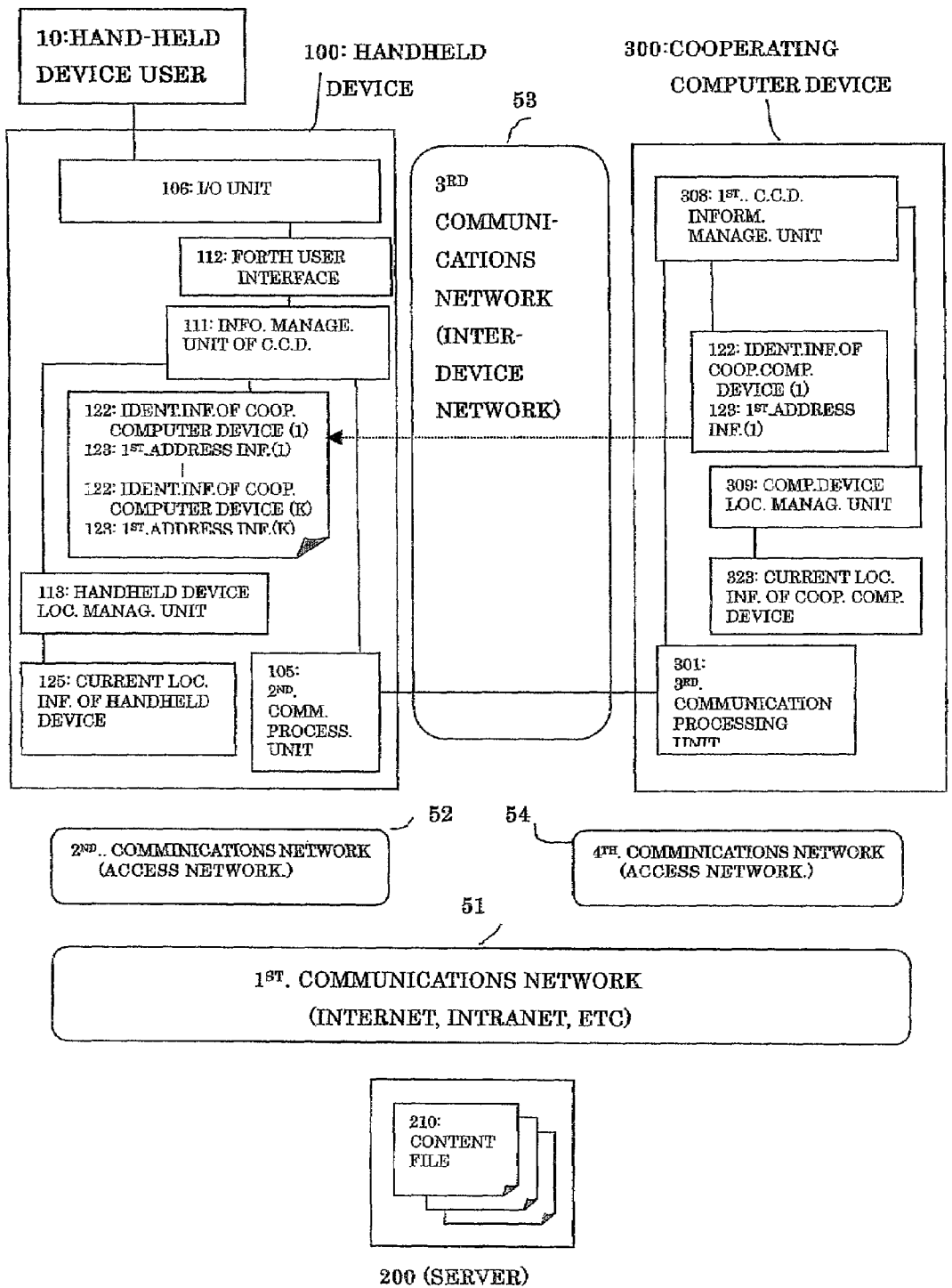
FIG. 19 is a block diagram illustrating another embodiment of the content viewing system according to the present invention that enables the handheld device user to select a desired cooperating computer device from among those present within a particular range of distance about the geographical position of the handheld device.

FIG. 19 is a block diagram illustrating an example of a functional configuration that permits the handheld device user 10 to select one of cooperating computer devices 300 present in a particular range of distance about the geographical or physical position of the handheld device 100. Incidentally, this example will be described as being limited to an additional function of the content viewing system described above with reference to FIGS. 1 to 8.

In the illustrated example, the handheld device 100 is provided with a handheld device location management unit 113 for the management of its current geographical position, and a range of searching cooperating computer device 126 is held or managed by the cooperating computer device information management unit 111. The range of searching cooperating computer device 126 represents the geographical or physical distance from the handheld device 100. The cooperating computer devices 300 each have computer device location management unit 309 that manages its current geographical position 322.

Figure 20:
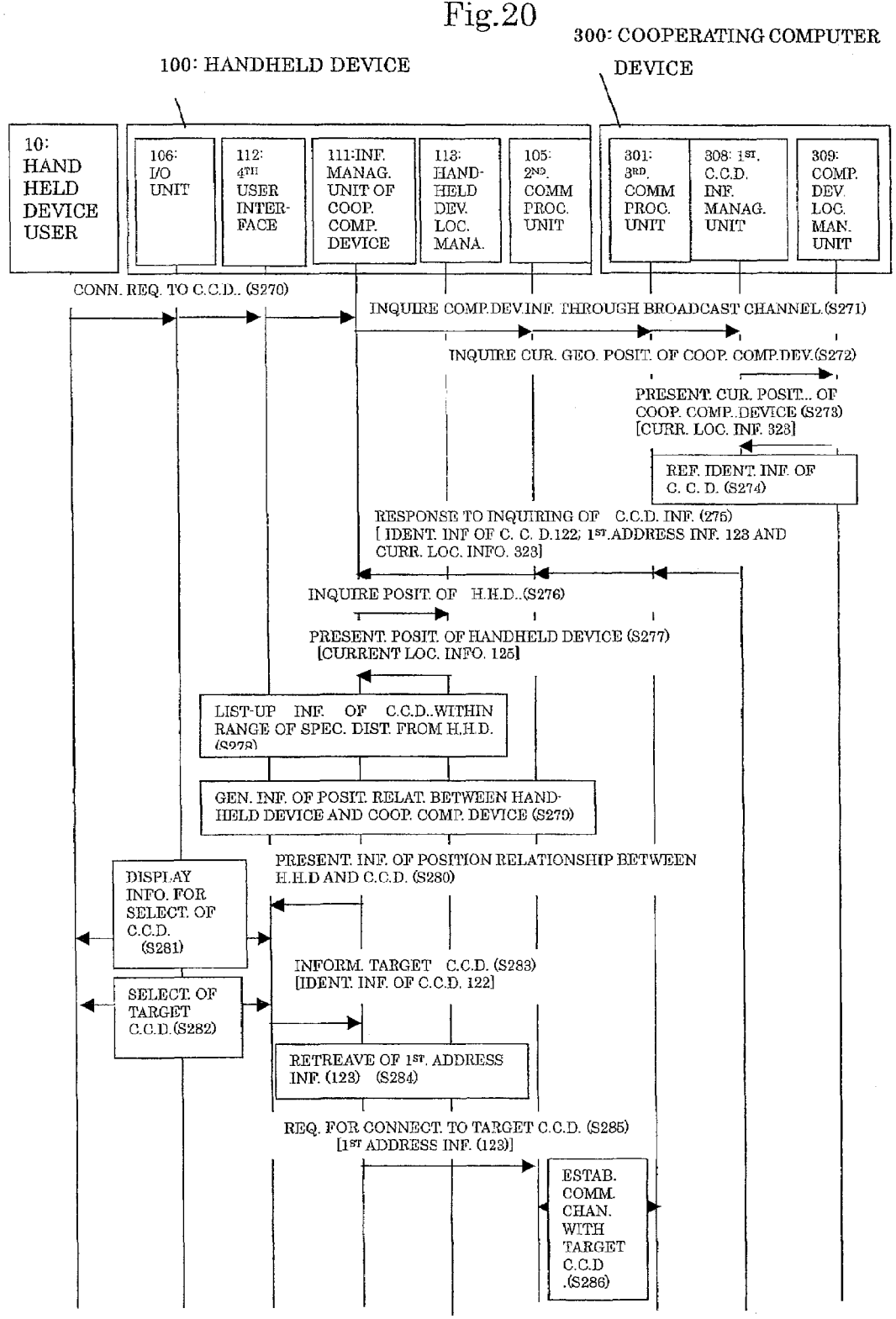
FIG. 20 is a flowchart explanatory of an example of the channel establishing operation in the embodiment illustrated in FIG. 19.

FIG. 20 is a flowchart explanatory of an example of channel establishment processing in the contents display system shown in FIG. 19.

The handheld device user 10 requests the fourth user interface 112 to connect the handheld device 100 to each cooperating computer devices 300, and the request signal is applied to the cooperating computer device information management unit 111 of the handheld device 100 (S270).

Upon receiving the request signal, the cooperating computer device information management unit 111 inquires each cooperating computer device 300 about its cooperating computer device identification information and the first address information via a broadcast channel on the third communication network 53 (S271).

The first cooperating computer device information management unit 308 of the cooperating computer device 300 inquires the computer device location management unit 309 about its current geographical position (S272), and the computer device location management unit 309 presents the current location information 323 (S273).

Next, the first computer device information management unit 308 refers to the cooperating computer device identification information 122 and the first address information 123 held therein (S274), and sends an answer containing the identification information 122, the address information 123 and the current location information 323 on the cooperating computer device 300 to the cooperating computer device information management unit 111 of the handheld device 100 (S275).

The cooperating computer device information management unit 111 of the handheld device 100 waits for an answer from each cooperating computer device 300 for a certain period of time and inquires the handheld device location management unit 113 about the current location of the handheld device 100 (S276). The handheld device location management unit 113 presents current location information 125 held therein to the cooperating computer device information management unit 111 (S277).

Based on the relationship between the current location information 323 of each cooperating computer device 300 and the current location information 125 of the handheld device 100, the cooperating computer device information management unit 111 makes up a list of identification information of cooperating computer device that contains information about cooperating computer devices 300 present within that range of distance, which is indicated by the range of searching cooperating computer device 126, from the current location of the handheld device 100 (S278).

Then, based on the relationship between the current location of each cooperating computer device 300 contained in the list of identification information of cooperating computer device and the current location of the handheld device 100, the cooperating computer device information management unit 111 generates information representative of the positional relationship between the handheld device 100 and each cooperating computer device 300 (S279). The positional relationship representing information is presented to the fourth user interface 112 (S280).

The fourth user interface 112 generates a cooperating computer device selection menu based on the positional relationship representing information and presents the menu to the handheld device user 10 (S281).

The handheld device user 10 selects a desired cooperating computer device on the menu (S282).

The fourth user interface 112 presents the identification information of cooperating computer device 122 about the selected cooperating computer device 300 to the cooperating computer device information management unit 111 (S283).

The cooperating computer device information management unit 111 retrieves the first address information 123 corresponding to the identification information of cooperating computer device 122 presented thereto (S284) and presents the retrieved first address information 123 to the second communication processing unit 105, urging it to establish a communication channel between it and the third communication processing unit 301 of the specified cooperating computer device 300 (S285).

Based on the first address information 123 presented thereto, the second communication processing unit 105 establishes a channel between it and the third communication processing unit 301 of the cooperating computer device 300 (S286).

Figure 21:
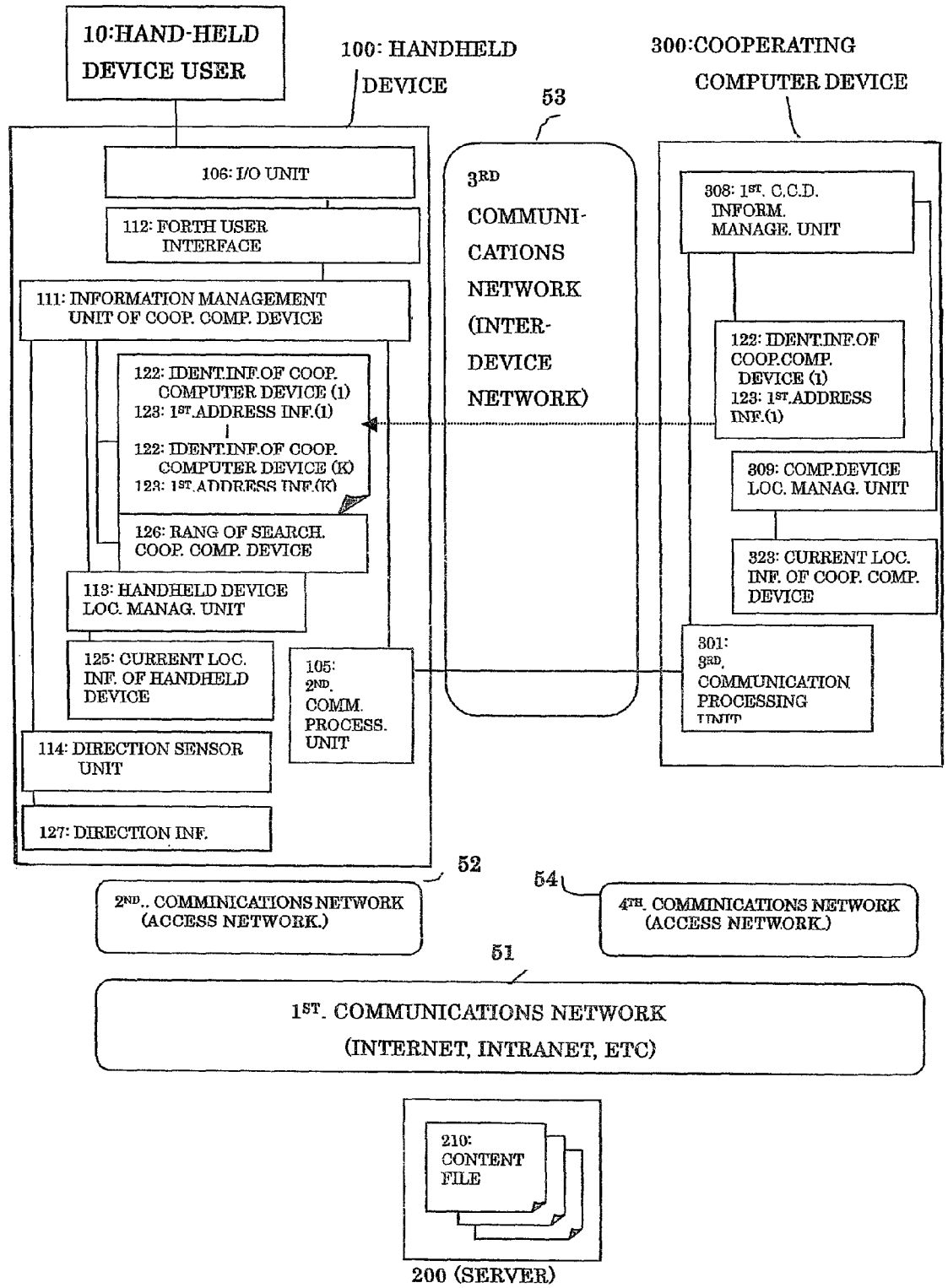
FIG. 21 is a block diagram illustrating another embodiment of the content viewing system according to the present invention that enables the handheld device user to select a desired cooperating computer device from among those present in a particular direction or azimuth within a particular range of distance about the geographical position of the handheld device.

FIG. 21 illustrates in block form an example of a functional configuration that permits the handheld device user 10 to select one of cooperating computer devices 300 locate in a particular direction or azimuth within a particular range of distance from the geographical or physical location of the handheld device 100. Incidentally, this example will be described as being limited to an additional function of the content viewing system described above with reference to FIGS. 1 to 8.

The handheld device 100 is provided with a handheld device location management unit 113 that holds and manages its current location information 125 and a direction sensor unit 114 for automatically obtaining direction information 127 in which a particular portion of the handheld device 100 is directed. The cooperating computer device information management unit 113 of the handheld device 100 holds and manages the range of searching cooperating computer device 126. The cooperating computer devices 300 each have the computer device location management unit 309 that holds and manages its current location information 223.

FIG. 22 is a flowchart explanatory of an example of channel establishment processing in the content display system depicted in FIG. 21.

The handheld device 100 responds to an instruction from the handheld device user 10 to inquire at least one or more cooperating computer devices 300 about their cooperating computer device identification information 122 and address information 123 (S290).

The cooperating computer device information management unit 111 of the handheld device 100 waits for answers from the cooperating computer devices 300 for a certain period of time and inquires the handheld device location management unit 113 of the handheld device 100 about its current position (S291). The handheld device location management unit 113 presents the current location information 125 of the handheld device 100 held therein to the cooperating computer device information management unit 111 (S292).

The cooperating computer device information management unit 111 of the handheld device 100 inquires the direction sensor unit 114 about the direction in which a particular portion of the handheld device 100 is directed (S293). The direction sensor unit 114 presents the direction information 127 held therein to the cooperating computer device information management unit 111 (S294).

Based on relationships among the current location information 323 of each cooperating computer device 300, the current location information 125 of the handheld device 100 and the direction information 127 of the latter, the cooperating computer device information management unit 111 makes up a list of cooperating computer device identification information that contains information only about cooperating computer devices 300 locate in the direction indicated by the direction information 127 within that range of distance, which is indicated by the range of searching cooperating computer device 126, from the current location of the handheld device 100 (S295).

Based on the relationship picked up in the current location of each cooperating computer device 300 registered on the list of cooperating computer device identification information and the current location of the handheld device 100, the cooperating computer device information management unit 111 generates information representing the positional relationship between the handheld device 100 and each picked-up cooperating computer device 300 (S296).

The positional relationship representing information thus generated is presented to the fourth user interface 112 (S297).

The fourth user interface 112 generates a cooperating computer device selection menu based on the contents of the positional relationship representing information, and presents the menu to the handheld device user 10 (S298).

The handheld device user 10 selects a desired cooperating computer device on the menu (S299).

The fourth user interface 112 presents the identification information of cooperating computer device 122 about the selected cooperating computer device 300 to the cooperating computer device information management unit 111 (S300).

The cooperating computer device information management unit 111 retrieves the first address information 123 corresponding to the identification information of cooperating computer device 122 presented thereto (S301) and presents the retrieved address information 123 to the second communication processing unit 105, urging it to establish a communication channel between it and the third communication processing unit 301 of the selected cooperating computer device 300 (S302).

Based on the first address information 123 presented thereto, the second communication processing unit 105 establishes a communication channel between it and the third communication processing unit 301 of the cooperating computer device 300 (S303).

FIG. 23 is a flowchart showing, by way of example, the operation for the handheld device 100 to establish a channel between it and the nearest one of cooperating computer devices 300. This operation can be implemented in the content display system shown in FIGS. 19 and 21.

The handheld device 100 responds to an instruction from the handheld device user 10 to inquire each cooperating computer device 300 about its identification information 122 and the first address information 123 (S310).

The cooperating computer device information management unit 111 of the handheld device 100 waits for an answer from each cooperating computer device 300 for a certain period of time and inquires the handheld device location management unit 113 of the handheld device 100 about its current location (S311). The handheld computer device location management unit 113 presents the current location information 125 of the handheld device 100 held therein to the cooperating computer device information management unit 111 (S312). When the handheld device 100 has the direction sensor unit 114, the cooperating computer device information management unit 111 may inquire the direction sensor unit 114 about the direction to which a particular portion of the handheld device 100 is directed. At this time, the direction sensor unit 114 presents its stored direction information 127 to the cooperating computer device information management unit 111.

Based on the relationship between the current location of each cooperating computer device 300 and the current location of the handheld device 100, the cooperating computer device information management unit 111 generates information about that one of the cooperating computer devices 300 which is geographically nearest to the handheld device 100 (S313). Incidentally, when the handheld device 100 has the direction sensor unit 114, the above-mentioned nearest cooperating computer device 300 may also be limited to that lying in that direction from the current location information 125 of the handheld device 100 which is indicated by the direction information 127.

The cooperating computer device information management unit 111 retrieves the first address information 123 corresponding to the identification information of cooperating computer device 122 of the selected cooperating computer device (S314) and presents the retrieved address information 123 to the second communication processing unit 105, urging it to establish a communication channel between it and the third communication processing unit 301 of the selected cooperating computer device 300 (S315).

The second communication processing unit 105 establishes a communication channel between it and the third communication processing unit 301 of the selected cooperating computer device 300 (S316).

FIGS. 10 to 23 are illustrative of the configurations and operations of content display systems equipped with functions that allow the handheld device user 10 to select the cooperating computer device 300 or that perform such cooperating computer device selection without handheld device's instructions. While in the above the cooperating computer device 300 select functions each have been described as being independent of the others, they may also be combined in one content display system.

FIGS. 24 to 28 are block diagrams and flowcharts illustrative of other embodiments of the content display systems according to the present invention in which the cooperating computer device 300 to be linked to the handheld device 100 is selected based on information that is presented by a cooperating computer device' information management server 400 which is a server for managing attribute information about plural cooperating computer device 300.

Figure 24:
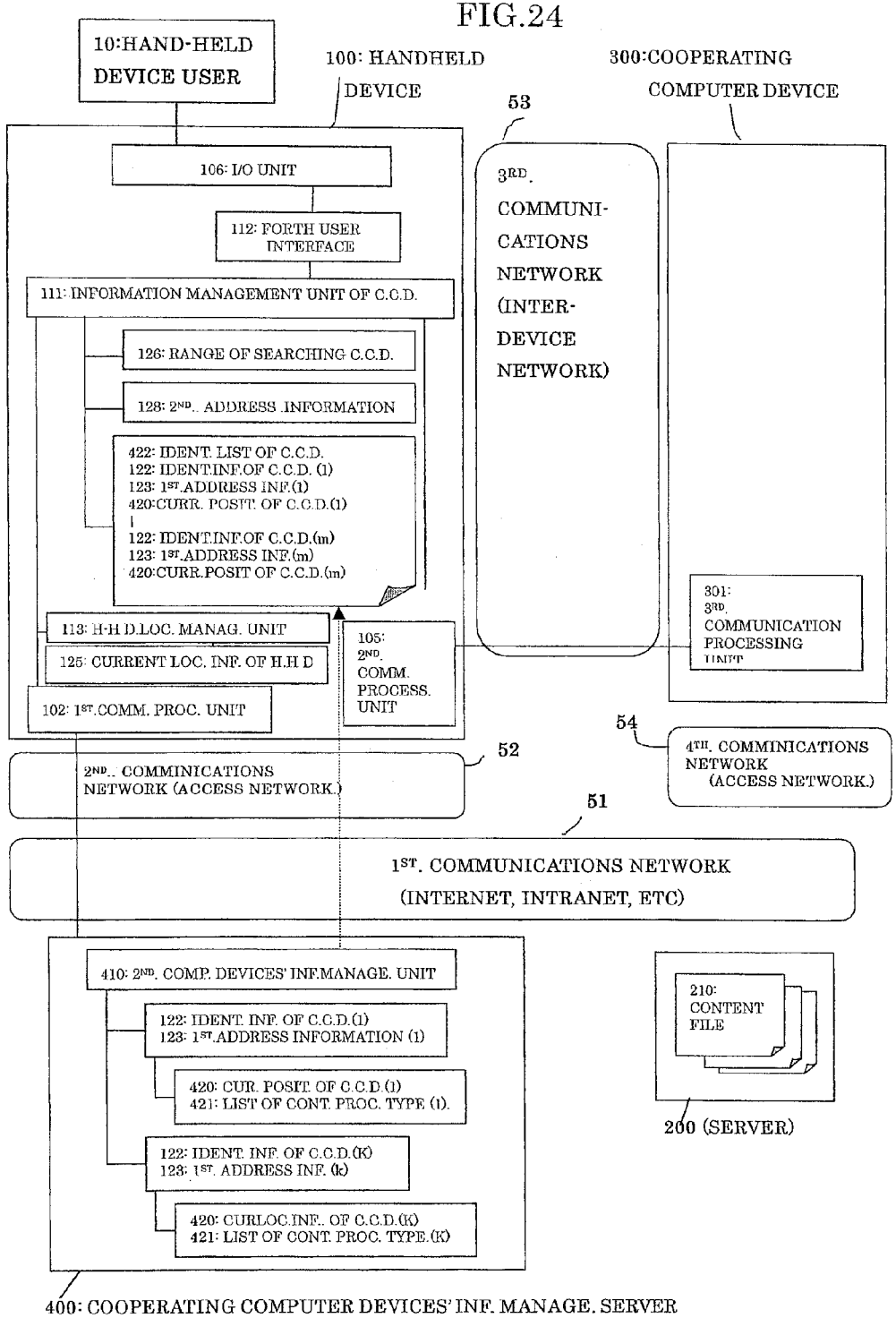
FIG. 24 is a block diagram illustrating an example of a functional configuration for selecting the cooperating computer device based on the type of a desired content processor and information about the current position of the cooperating computer device in the embodiments of FIGS. 1 to 9.

FIG. 24 illustrates an example of the configuration of the content display system in which the desired content processor type and current location information 125 of the handheld device are presented from the handheld device 100 to the cooperating computer devices' information management server 400. Incidentally, this example will be described as being limited to an additional function of the content display systems described previously with reference to FIGS. 1 to 8.

The owner or operator of each cooperating computer device 300 prepares the cooperating computer devices' information management server 400 provided with a second computer devices' information management unit 410 that manages the identification information of cooperating computer device 122 and first address information 123 of at least one cooperating computer device 300 in correspondence with cooperating computer device attributes each composed of at least the current location information 420 of the cooperating computer device 300 and the list of content processor type 421 supported by the cooperating computer device 300.

The handheld device 100 has the handheld device location management unit 113 which manages the current location information of the handheld device 100. The cooperating computer device information management unit 111 of the handheld device 100 manages: the second address information 128 for establishing connection to the cooperating computer device information management server 400; and a list of cooperating computer device identification information 422 presented from the second computer devices' information management unit 410 of the cooperating computer device information management server 400.

Figure 25:
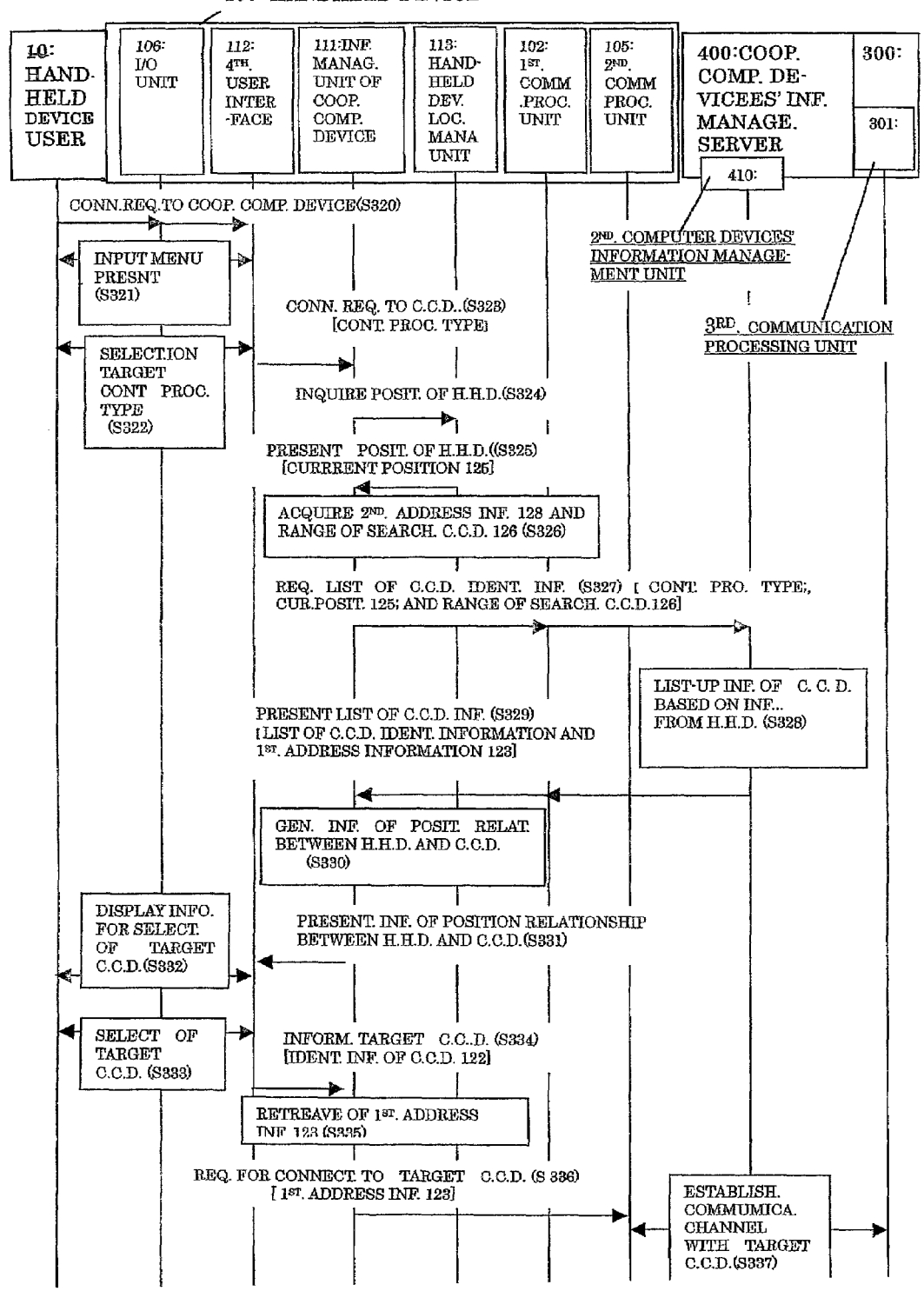
FIG. 25 is a flowchart explanatory of an example of the channel establishing operation in the embodiment illustrated in FIG. 24.

FIG. 25 is a flowchart showing an example of the channel establishing operation in the content display system of the FIG. 24 configuration.

The handheld device user 10 requests to the fourth user interface 112 of the handheld device 100 to connect the handheld device 100 to the cooperating computer device 300 (S320). The fourth user interface 112 presents a selection menu from which the handheld device user 10 selects the type of the content processor desired to use on the cooperating computer device 300 (S321). The handheld device user 10 selects the type of the content processor desired to use from the selection menu (S322). The fourth user interface 112 sends to the cooperating computer device information management unit 111 a cooperating computer device connect-request signal containing the type of the content processor selected by the handheld device user 10 (S323).

Upon receiving the request signal, the cooperating computer device information management unit 111 inquires the handheld device location management unit 113 of the handheld device 100 about the current position of the handheld device 100 (S324). The handheld device location management unit 113 presents its stored current location information 125 of the handheld device 100 to the cooperating computer device information management unit 111 (S325).

The cooperating computer device information management unit 111 acquires the second address information 128 and the range of searching cooperating computer device 126 (S326). The cooperating computer device information management unit 111 presents the content processor type presented from the fourth user interface 112, the current location information 125 and the range of searching cooperating computer device 126 to the second computer devices' information management unit 410 of the cooperating computer device information management server 400, requesting it to present a list of cooperating computer device identification information 422 (S327).

The second computer devices' information management unit 410 of the cooperating computer device information management server 400 makes up a list of cooperating computer device identification information 422 containing information about only cooperating computer devices 300 each of which has the content processor (not shown) type specified by the handheld device user 10 and locate in the range of distance from the handheld device 100 indicated by the range of searching cooperating computer device 126 (S328), and sends the list to the cooperating computer device information management unit 111 (S329).

Based on the relationship between the current location information 420 of each cooperating computer device 300 contained in the list of cooperating computer device identification information 422 and the current location information 125 of the handheld device 100, the cooperating computer device information management unit 111 generates information indicative of the positional relationship between the handheld device 100 and each cooperating computer device 300 (S330).

The fourth user interface 112 generates a cooperating computer device selection menu based on the contents of the positional relationship representing information and presents it to the handheld device user 10 (S332).

The handheld device user 10 selects his desired cooperating computer device on the menu presented thereto (S333).

The fourth user interface 112 presents the identification information of cooperating computer device 122 about the specified cooperating computer device 300 to the cooperating computer device information management unit 111 (S334).

The cooperating computer device information management unit 111 retrieves the first address information 123 corresponding to the identification information of cooperating computer device 122 presented thereto (S335) and presents the retrieved address information 123 to the second communication processing unit 105, urging it to establish a communication channel between it and the third communication processing unit 301 of the selected cooperating computer device 300 (S336).

Based on the first address information 123 presented thereto, the second communication processing unit 105 establishes a communication channel between it and the third communication processing unit 301 of the selected cooperating computer device 300 (S337).

Figure 26:
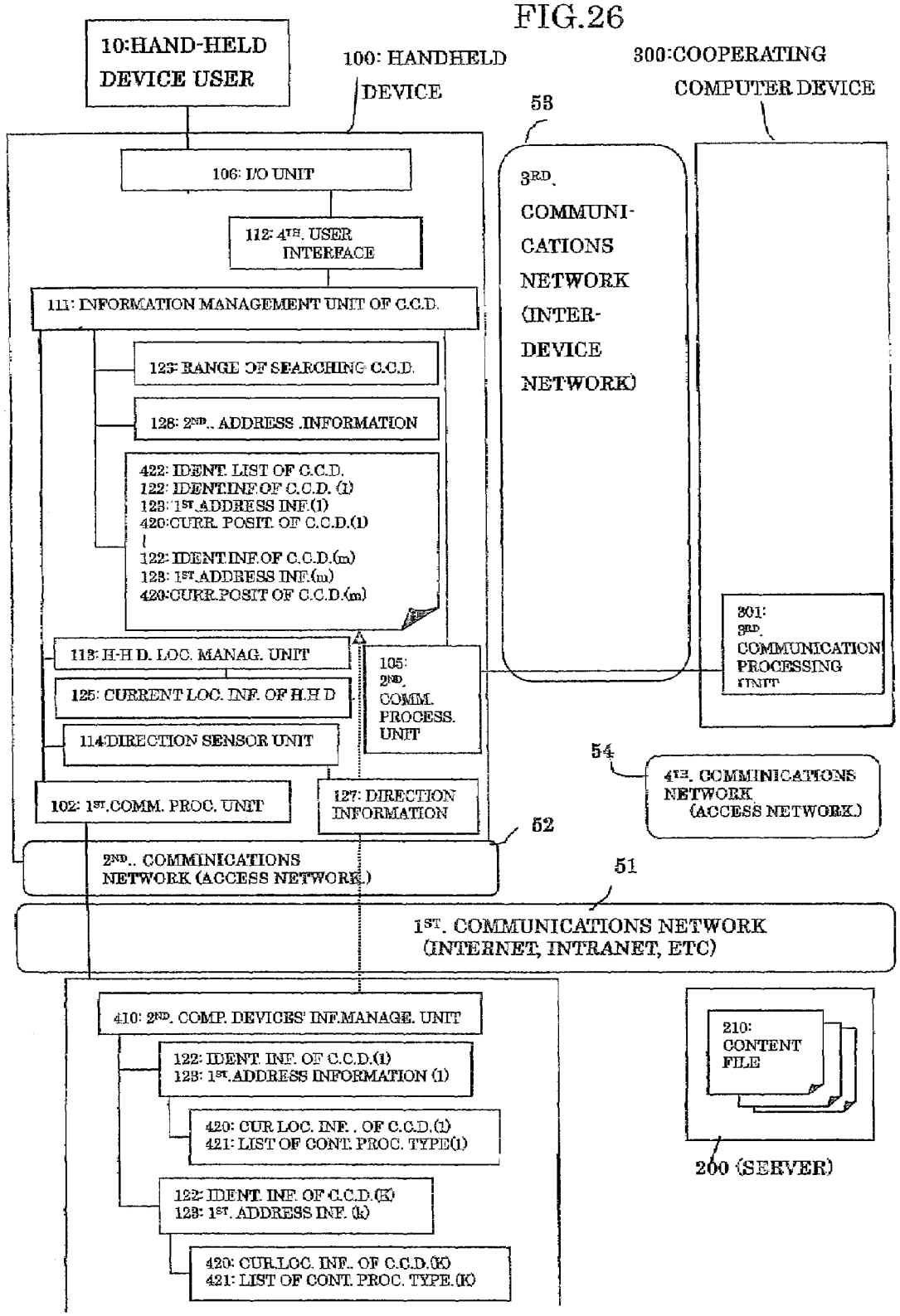
FIG. 26 is a block diagram illustrating an example of a functional configuration for selecting the cooperating computer device based on the type of a desired content processor and information about the current position and direction or azimuth of the cooperating computer device in the embodiments of FIGS. 1 to 9.

FIG. 26 illustrates in block form an example of a functional configuration of the content display system in which the desired type of content processor and the current location information 125 of the handheld device and direction information 127 are presented from the handheld device 100 to the cooperating computer device information management server 400. Incidentally, this example will be described as being limited to an additional function of the content display systems described previously with reference to FIGS. 1 to 8.

The owner or operator of each cooperating computer device 300 prepares the cooperating computer device information management server 400 provided with a second computer devices' information management unit 410 which manages the identification information of cooperating computer device 122 and first address information 123 of at least one cooperating computer device 300 in correspondence with cooperating computer device attributes. Each of the cooperating computer device attributes composed of at least the current geographical position 420 of the cooperating computer device 300 and the list of content processors or type 421 supported by the cooperating computer device 300.

The handheld device 100 is provided with the handheld device location management unit 113 for managing its current location information 125 and the direction sensor unit 114 for automatically sensing the direction information 127 to which a particular portion of the handheld device 100, is directed. The cooperating computer device information management unit 111 of the handheld device 100 manages the second address information 128 to connect to the cooperating computer device information management server 400 and the list of cooperating computer device identification information 422 which is presented from the second computer devices' information management unit 410.

Figure 27A:
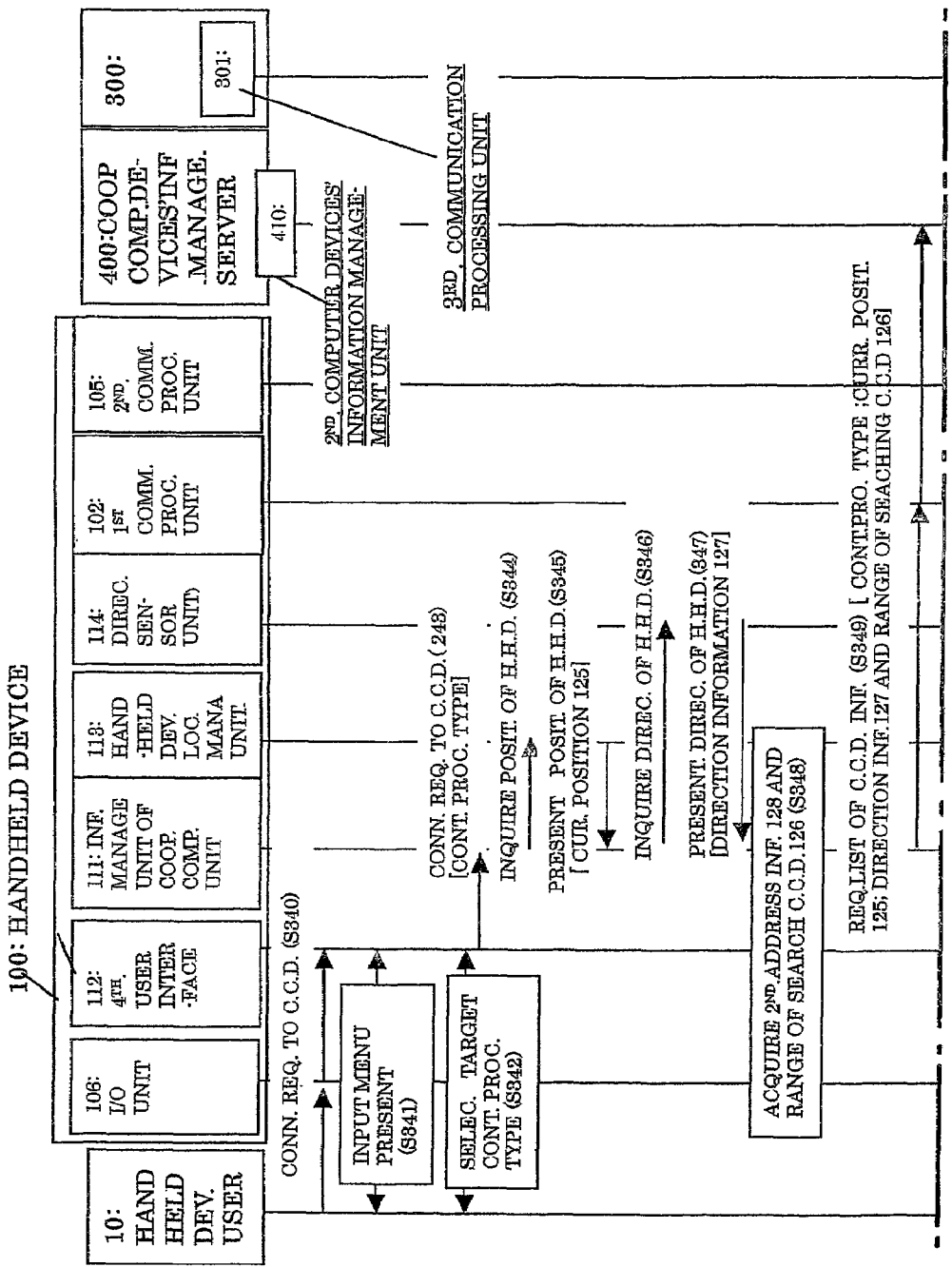
FIG. 27 is a flowchart explanatory of an example of the channel establishing operation in the embodiment of FIG. 26.
Figure 27B:
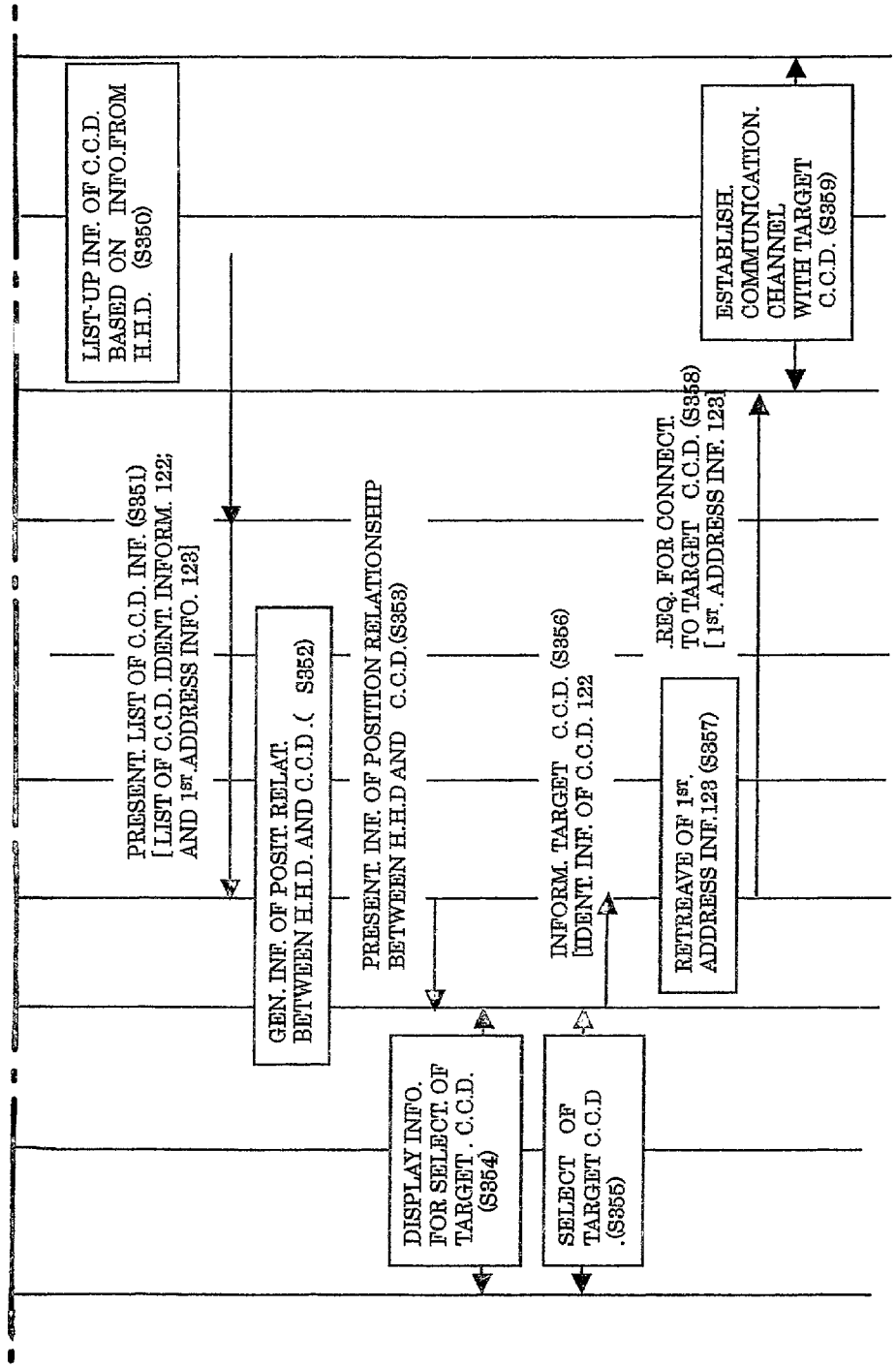

FIG. 27 is a flowchart for explaining an example of the channel establishing operation in the content display system depicted in FIG. 26.

The handheld device user 10 requests to the fourth user interface 112 of the handheld device 100 to connect the handheld device 100 to the cooperating computer device 300 (S340). The fourth user interface 112 presents a selection menu from which the handheld device user 10 selects the type of the content processor desired to use on the cooperating computer device 300 (S341). The handheld device user 10 selects the type of the content processor desired to use from the selection menu (S342).

The fourth user interface 112 sends to the cooperating computer device information management unit 111 a cooperating computer device connect-request signal containing the type of the content processor selected by the handheld device user 10 (S343).

Upon receiving the request signal, the cooperating computer device information management unit 111 inquires the computer device location management unit 113 of the handheld device 100 about its current position (S344). The handheld device location management unit 113 presents its stored current location information 125 to the cooperating computer device information management unit 111 (S345).

The cooperating computer device information management unit 111 inquires the direction sensor unit 114 of the handheld device 100 about the direction to which a particular portion of the handheld device 100 is directed (S346). The direction sensor unit 114 presents its stored direction information 127 to the cooperating computer device information management unit 111 (S347).

The cooperating computer device information management unit 111 obtains the second address information 128 and the range of searching cooperating computer device 126 (S348). The cooperating computer device information management unit 111 presents the content processor type presented from the fourth user interface 112, the current location information 125, the range of searching cooperating computer device 126 and the direction information 127 to the second computer devices' information management unit 410 of the cooperating computer device information management server 400, requesting it to present a list of cooperating computer device identification information 422 (S349).

The second computer devices' information management unit 410 of the cooperating computer device information management server 400 makes up a list of cooperating computer device identification information 422 containing information about only cooperating computer devices 300, each of which has the content processor type selected by the handheld device user 10 and locates in a particular direction within the range of distance from the handheld device 100 indicated by the range of searching cooperating computer device 126 (S350), and sends the list to the cooperating computer device information management unit 111 (S351).

Based on the relationship between the current location information 420 of each cooperating computer device 300 contained in the list of cooperating computer device identification information 422 and the current location information 125 of the handheld device 100, the cooperating computer device information management unit 111 generates information indicative of the positional relationship between the handheld device 100 and each cooperating computer device 300 (S352). The positional relationship representing information is presented to the fourth user interface 112 (S353).

The fourth user interface 112 generates a cooperating computer device selection menu based on the contents of the positional relationship representing information and presents it to the handheld device user 10 (S354).

The handheld device user 10 selects his desired cooperating computer device on the menu presented thereto (S355).

The fourth user interface 112 presents the identification information of cooperating computer device 122 about the specified cooperating computer device 300 to the cooperating computer device information management unit 111 (S356).

The cooperating computer device information management unit 111 retrieves the first address information 123 corresponding to the identification information of cooperating computer device 122 presented thereto (S357) and presents the first address information 123 to the second communication processing unit 105, urging it to establish a communication channel between it and the third communication processing unit 301 of the selected cooperating computer device 300 (S358).

Based on the first address information 123 presented thereto, the second communication processing unit 105 establishes a communication channel between it and the third communication processing unit 301 of the selected cooperating computer device 300 (S359).

Figure 28B:
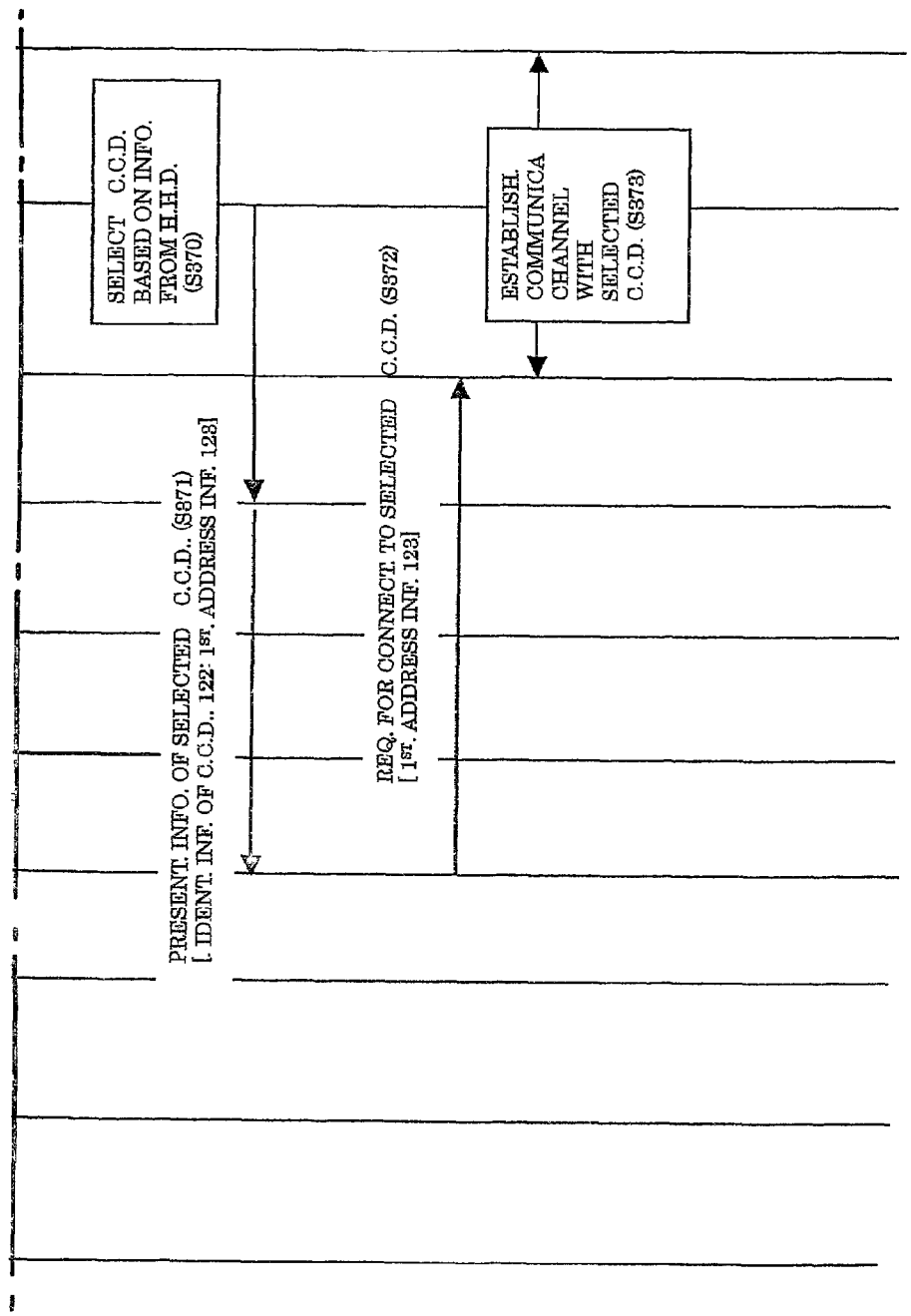
FIG. 28 is a flowchart explanatory of operations of the embodiments of FIGS. 24 and 26 when each incorporates therein the functional configuration for establishing a channel between the handheld device and a cooperating computer device connected thereto by a single first address that is provided from a cooperating computer device information management server.

FIG. 28 is a flowchart showing an example of the system configuration that permits the formation of a channel between the handheld device 100 and the cooperating computer device 300 corresponding to the first address information 123 applied from the cooperating computer device information management server 400 to the handheld device 100. This operation can be implemented in the content display systems shown in FIGS. 24 and 26.

The handheld device user 10 requests to the fourth user interface 112 of the handheld device 100 to connect the handheld device 100 to the cooperating computer device 300 (S360). The fourth user interface 112 responds to the request signal to present a selection menu from which the handheld device user 10 selects the type of the content processor desired to use on the cooperating computer device 300 (S361). The handheld device user 10 selects the type of the content processor desired to use from the selection menu (S362).

The fourth user interface 112 sends to the cooperating computer device information management unit 111 a connect request signal containing the type of the content processor selected by the handheld device user 10 (S363).

Upon receiving the request signal, the cooperating computer device information management unit 111 inquires the handheld device location management unit 113 of the handheld device 100 about its current position (S364). The computer device location management unit 113 presents its stored current location information 125 to the cooperating computer device information management unit 111 (S365).

When the handheld device 100 has the direction sensor unit 114, the cooperating computer device information management unit 111 may inquire it about the direction information to which a particular portion of the handheld device 100 is directed (S366). At this time, the direction sensor unit 114 presents its stored direction information 127 to the cooperating computer device information management unit 111 (S367).

The cooperating computer device information management unit 111 acquires the second address information 128 and the range of searching cooperating computer device 126 (S368). The cooperating computer device information management unit 111 transfers the content processor-type presented from the fourth user interface 112, the current location information 125, the range of searching cooperating computer device 126 and the direction information 127 to the second computer devices' information management unit 410 of the cooperating computer device information management server 400, requesting it to present a list of cooperating computer device identification information (S369).

The second computer devices' information management unit 410 of the cooperating computer device information management server 400 acquires the identification information 122 and the first address information 123 about that one of cooperating computer devices 300 which has the content processor of the type selected by the handheld device user 10 and locates at a position nearest the handheld device 100 in a particular direction relative thereto and the first address information 123 (S370), and sends these pieces of information to the cooperating computer device information management unit 111 (S371). In a case where the direction information 127 is presented to the second computer devices' information management unit 410, the range of retrieval for the cooperating computer device 300 may be limited to the specified direction.

The cooperating computer device information management unit 111 presents its received first address information 123 received from the second computer devices' information management unit 410 to the second communication processing unit 105, urging it to establish a communication channel between it and third communication processing unit 301 of the selected cooperating computer device 300 (S372).

Based on the first address information 123 presented thereto, the second communication processing unit 105 establishes a communication channel between it and the third communication processing unit 301 of the selected cooperating computer device 300 (S373).

Figure 29:
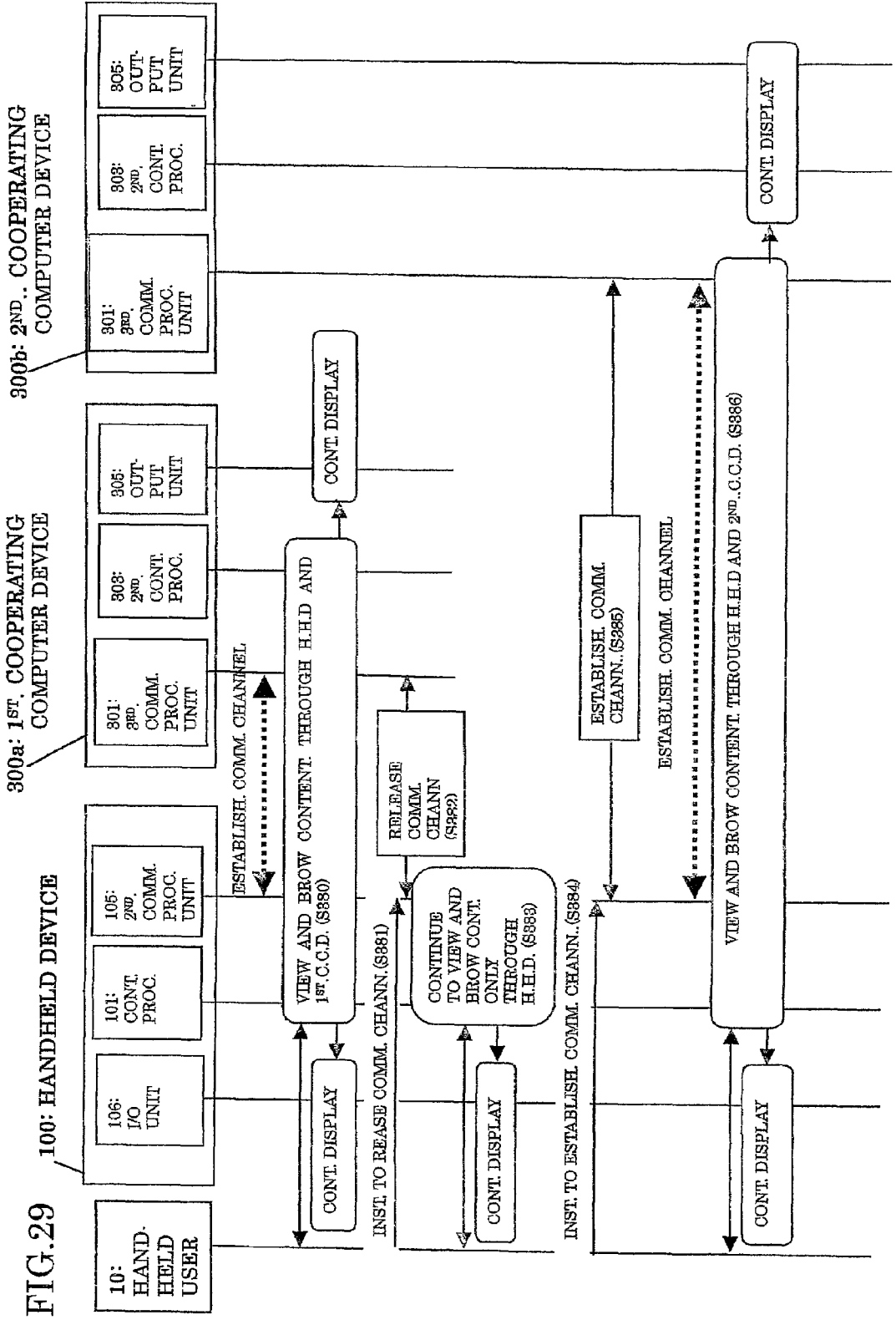
FIG. 29 is a flowchart explanatory of an operation for continuing the content viewing operation on the handheld device when the channel established so far between the handheld device and the cooperating computer device is cut off for cooperating operation in the embodiments of FIG. 8.
Figure 31A:
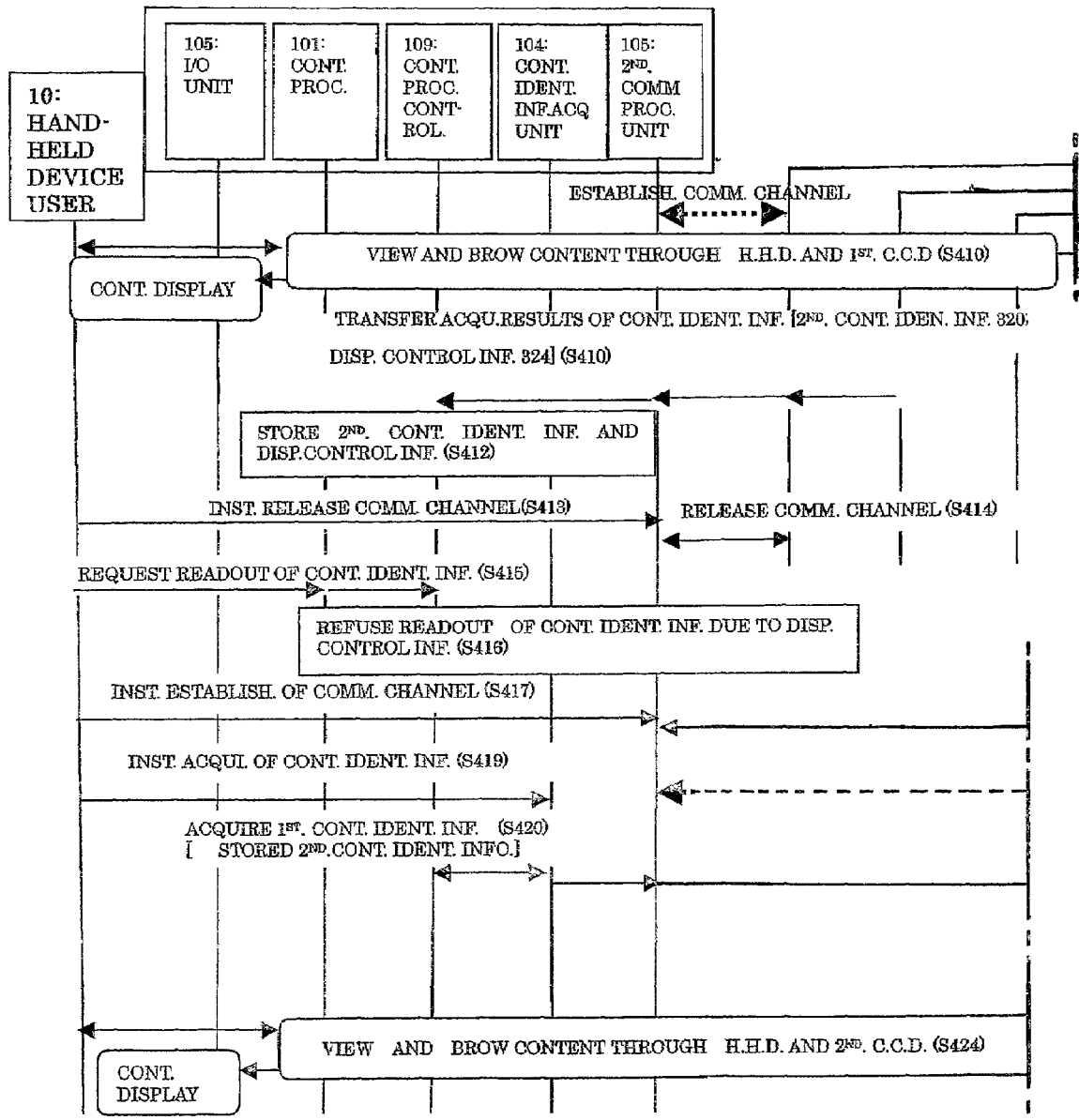
FIG. 31 is a flowchart explanatory of an operation for recording second content identification information acquired from the cooperating computer device to the handheld device and for limiting the output thereon of the contents corresponding to the recorded content identification information when the channel established so far between the handheld device and the cooperating computer device is cut off for cooperating operation in the embodiments of FIG. 8.
Figure 31B:
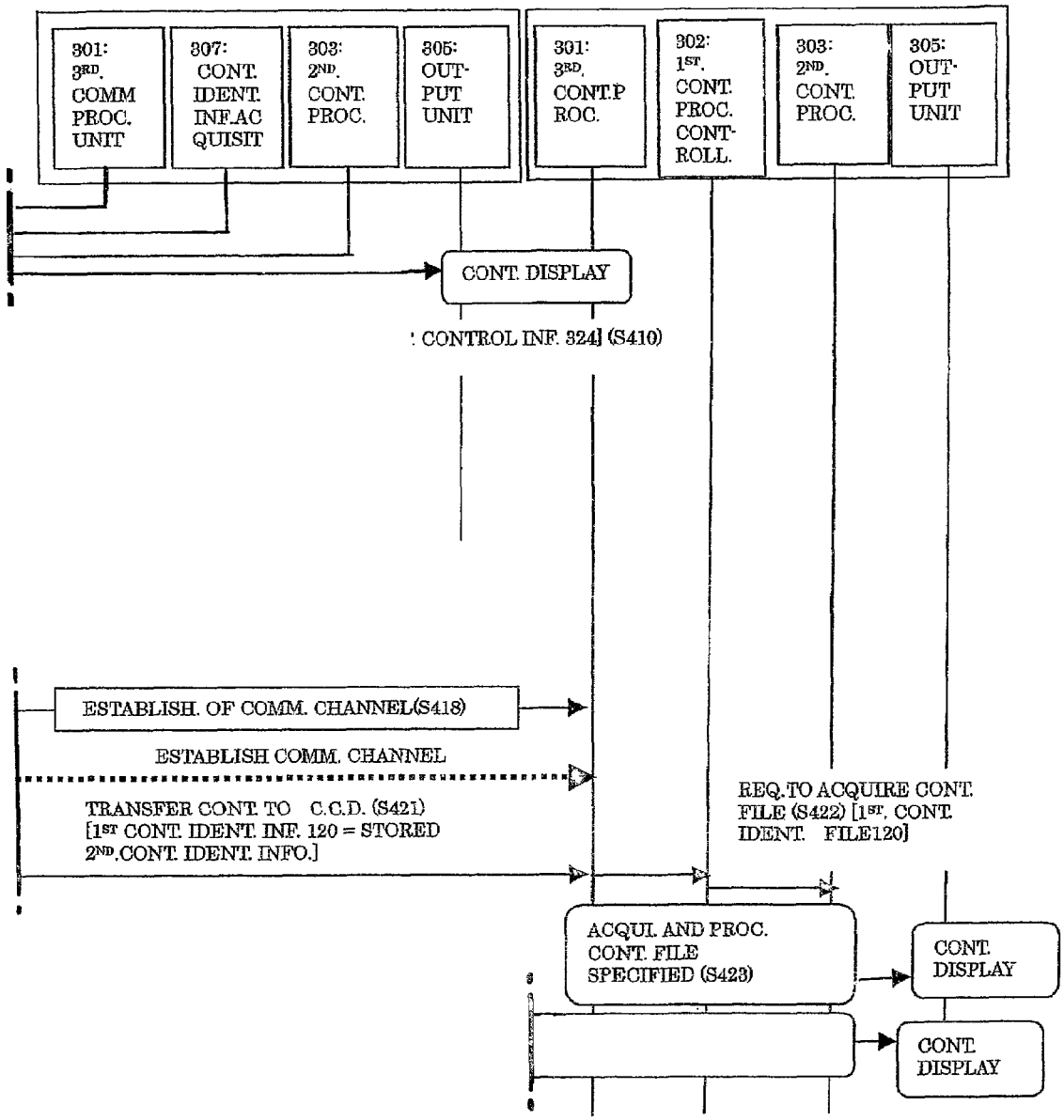

FIGS. 29 to 31 are flowcharts each showing an example of processing for continuing/resuming the content display operation by use of cooperating computer devices 300 placed at various locations.

FIG. 29 is a flowchart depicting an example of a control operation for continuing the content display operation on the handheld device 100 when the communication channel established so far between the handheld device 100 and the cooperating computer device 300 for their cooperation is cut off for new operation.

The handheld device user 10 views or browses contents through the use of the handheld device 100 and a first cooperating computer device 300*a* (S380).

The second communication processing unit 105 responds to an instruction from the handheld device user 10 (S381) to cut off the communication channel established so far between it and the third communication processing unit 301 of the first cooperating computer device 300*a* (S382). Incidentally, even after the channel is cut off, the handheld device user 10 continues to view or browse the contents by the use of the content processor 101 of the handheld device 100 (S383).

The second communication processing unit 105 responds to an instruction from the handheld device user 10 (S384) to establish a channel between it and the third communication processing unit 301 of a second cooperating computer device 300*b* (S385).

The handheld device user 10 executes the content viewing or browsing operation by the use of the handheld device 100 and the second cooperating computer device 300*b* (S386).

FIG. 30 is a flowchart depicting an example of a control operation for recording the second content identification information 320 provided to the handheld device 100 from the cooperating computer device 300 in a case of cutting off the channel established so far between the handheld device 100 and the cooperating computer device 300 for a new linkage operation.

The handheld device user 10 performs his contents viewing or browsing operation by the use of the handheld device 100 and the first cooperating computer device 300*a* (S390).

At an arbitrary time during the content viewing or browsing operation, the content identification information acquisition unit 307 of the first cooperating computer device 300*a* responds to an instruction from the handheld device user 10 to transfer his specified second content identification information 320 to the content processor controller 109 of the handheld device 100 (S391), wherein the second content identification information 320 transferred thereto is stored (S392).

The second communication processing unit 105 responds to an instruction from the handheld device user 10 (S393) to cut off the channel established so far between it and the third communication processing unit 301 of the first cooperating computer device 300*a* (S394). Incidentally, the handheld device user 10 needs not to perform the content viewing or browsing operation on the handheld device 100 until a channel is established between the handheld device 100 and a new cooperating computer device 300.

The second communication processing unit 105 responds to an instruction from the handheld device user 10 (S395) to establish a channel between it and the third communication processing unit 301 of the second cooperating computer device 300*b* (S396).

The content identification information acquisition unit 104 responds to an instruction from the handheld device user 10 (S397) to acquire, as the first content identification information 120, the second content identification information 320 from the content processor controller 109 of the handheld device 100 (S398).

The content identification information acquisition unit 104 of the handheld device 100 transfers the first content identification information 120 to the first content processor controller 302 of the second cooperating computer device 300*b* (S399).

The first content processor controller 302 presents the first content identification information 120 to the content processor 303 (S400).

The content processor 303 obtains from the server 200 the content file 210 corresponding to the first content identification information 120 and outputs result of processing of the content file 210 to the output unit 305 of the second cooperating computer device 300*b* (S401).

Thereafter, the handheld device user 10 continues his content viewing or browsing operation by the use of the handheld device 100 and the second cooperating computer device 300*b* (S402).

FIG. 31 is a flowchart depicting an example of a control operation for recording the second content identification information 320 provided to the handheld device 100 from the cooperating computer device 300 and for limiting the content output corresponding to the recorded content identification information 320 on the handheld device 100 in a case of cutting off the channel established so far between the handheld device 100 and the cooperating computer device 300 for a new linkage operation.

The handheld device user 10 performs his content viewing or browsing operation by the use of the handheld device 100 and the first cooperating computer device 300*a* (S410).

At an arbitrary time during the content viewing or browsing operation the content identification information acquisition unit 307 of the first cooperating computer device 300*a* responds to an instruction from the handheld device user 10 to transfer his specified second content identification information 320 with the display control information to the content processor controller 109 of the handheld device 100 (S411), wherein the second content identification information 320 transferred thereto is stored (S412).

The second communication processing unit 105 responds to an instruction from the handheld device user 10 (S413) to cut off the channel established so far between it and the third communication processing unit 301 of the first cooperating computer device 300a (S414). Incidentally, the handheld device user 10 needs not to view or browse the contents on the handheld device 100 until a channel is established between the handheld device 10 and a new cooperating computer device 300.

When the content processor 101 of the handheld device 100 responds to an instruction from the handheld device user 10 to request the content processor controller 109 to present the second content identification information 320 held therein (S415), the content processor controller 109 refuses the request by display control information 324 which indicates restriction of display of the requested content (S416).

The second communication processing unit 105 responds to an instruction from the handheld device user 10 (S417) to establish a channel between it and the third communication processing unit 301 of the second cooperating computer device 300b (S418).

The content identification information acquisition unit 104 of the handheld device 100 responds to an instruction from the handheld device user 10 (S419) to acquire, as the first content identification information 120, the second content identification information 320 from the content processor controller 109 of the handheld device 100 (S420).

The content identification information acquisition unit 104 of the handheld device 100 transfers the first content identification information 120 to the first content processor controller 302 of the second cooperating computer device 300b (S421).

The first content processor controller 302 presents the first content identification information 120 to the content processor 303 (S422).

The content processor 303 obtains from the server 200 the content file 210 corresponding to the first content identification information 120 and outputs the result of processing of the content file 210 to the output unit 305 of the second cooperating computer device 300b (S423).

Thereafter, the handheld device user 10 continues his content viewing or browsing operation by the use of the handheld device 100 and the second cooperating computer device 300b (S424).

Figure 32B:
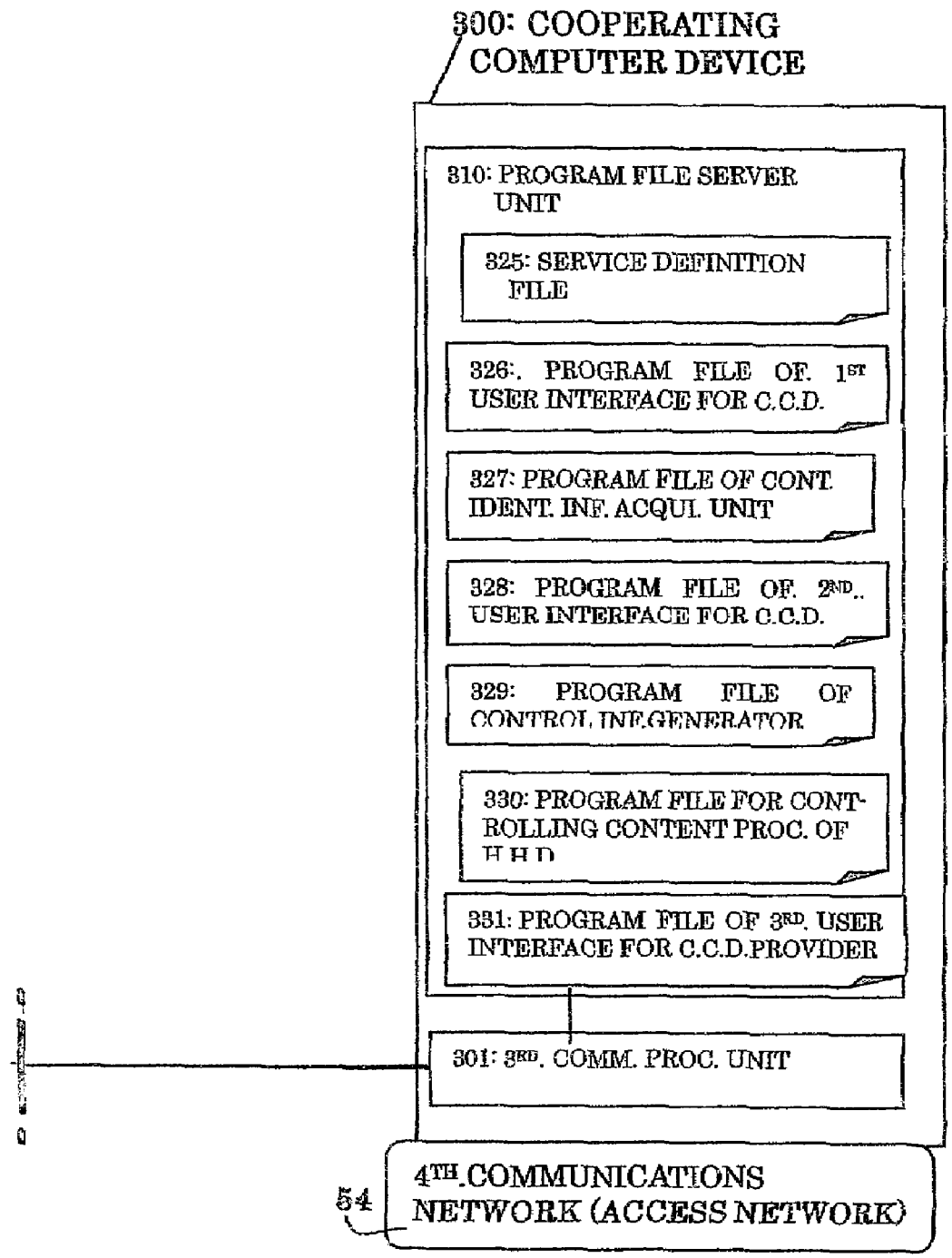
FIG. 32 is a block diagram illustrating an example of a functional configuration for acquiring cooperating functions of a content processor in the cooperating computer device immediately after a channel is established between the handheld device and the cooperating computer device in the embodiments of FIGS. 1 to 8.
Figure 33:
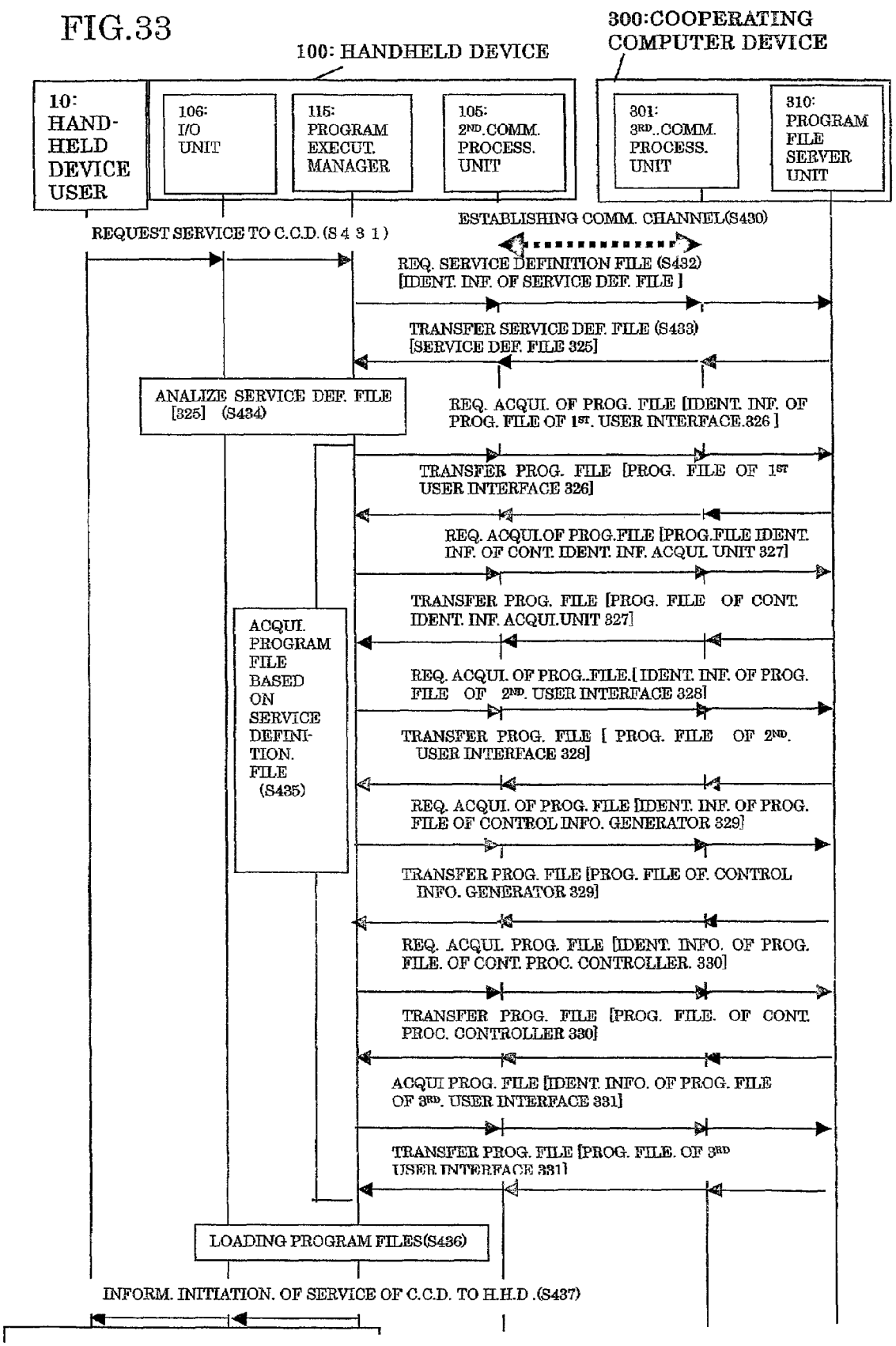
FIG. 33 is a flowchart explanatory of an operation for the handheld device to automatically acquire all files described in a service definition file in the embodiment of FIG. 32.
Figure 34:
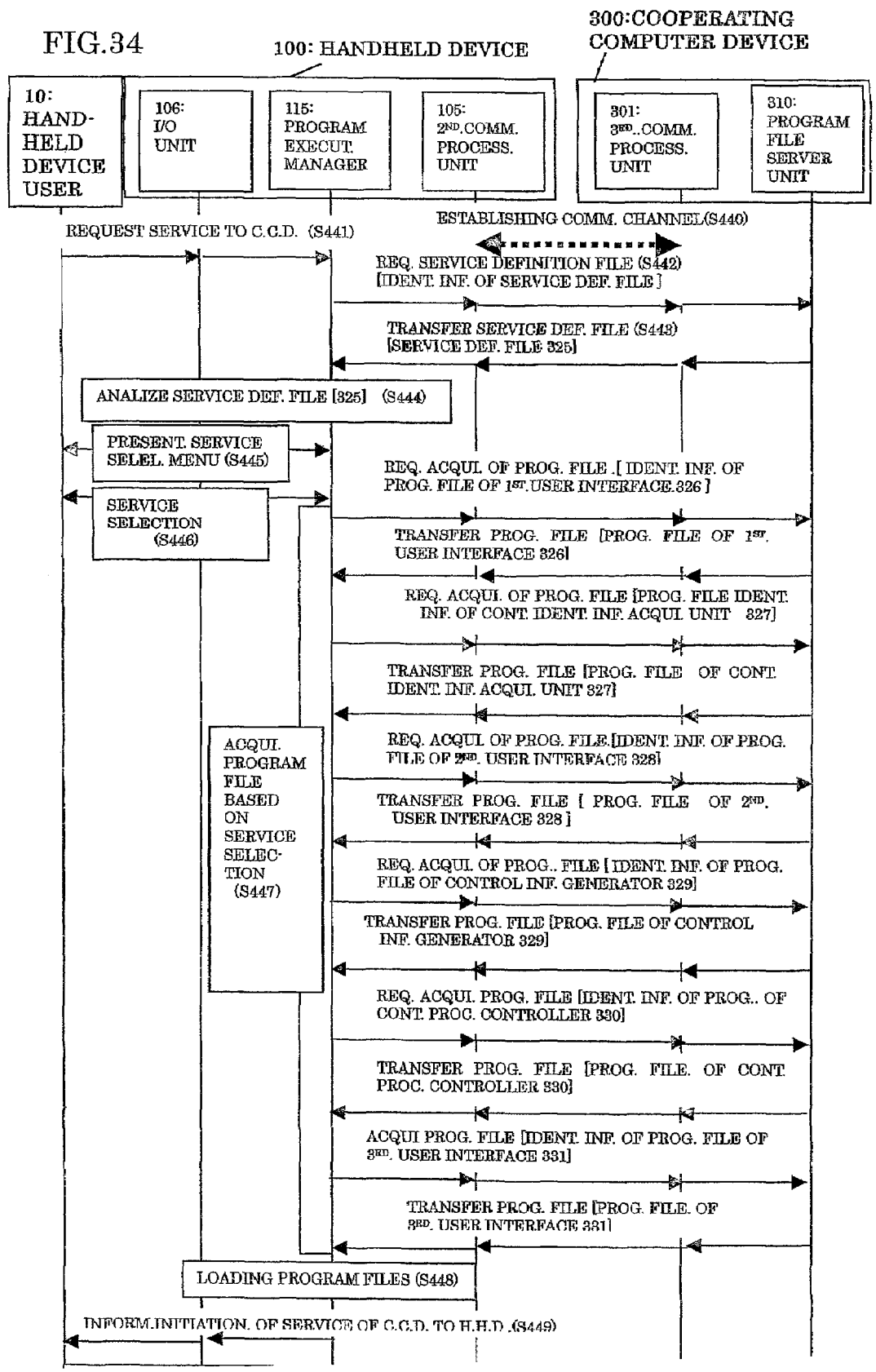
FIG. 34 is a flowchart explanatory of an operation for the handheld device to acquire only a file concerning a service specified by the user in the embodiment illustrated in FIG. 32.

FIGS. 32 to 34 are a block diagram and flowcharts illustrating other embodiments of the content display system according to the present invention adapted, so that the handheld device 100 can dynamically obtain functions to cooperate with a cooperating computer device (300) from the cooperating computer device 300.

FIG. 32 depicts an example of the system configuration for the handheld device 100 to acquire the functions for implementing the linkage operations immediately after a communication channel is established between the handheld device 100 and the cooperating computer device 300. Incidentally, this example will be described as being limited to an additional function of the contents display systems described previously with reference to FIGS. 1 through 28.

The cooperating computer device 300 is provided with a program file server unit 310 which holds and manages: a service definition file 325 having described therein identification information about program files necessary for cooperation with the cooperating computer device 300; and a program file of the first user interface 326 and a program file of content identification information acquisition unit 327, or a program file of the second user interface 328, a program file of the control information generator 329 and a program file of the controlling content processor of the handheld device 330, or a program file of the user interface 331.

The handheld device 100 is provided with a program execution manager 115 that controls the execution of program files obtained from the program file server unit 310 of the cooperating computer device 300.

FIG. 33 is a flowchart for explaining an example of the operation of the content display system in FIG. 32 by which the handheld device 10 automatically acquires all files described in the service definition file 325.

This example shows a case where the service definition file 325 has described therein at least:

(1) Information on the program file of the first user interface for a cooperating computer device service 326;

(2) Information on the program file of the content identification information acquisition unit 327;

(3) Information on the program file of the second user interface for a cooperating computer device service 328;

(4) Information on the program file of the control information generator 329;

(5) Information on the program file for controlling the content processor of the handheld device 330; and (6) Information on the program file of the third user interface for a cooperating computer device service 331.

The handheld device user 10 requests the use of the services, provided by the cooperating computer device 300, to the program execution manager 115 of the handheld device 100 (S431).

The program execution manager 115 requests, in turn, the program file server unit 310 of the cooperating computer device 300 to present the service definition file 325 (S432). The program file server 310 responds to the request to transfer the service definition file 325 to the program execution manager 115 (S433).

The program execution manager 115 analyzes the contents of the service definition file 325 (S434) and, based on the analyzed results, acquires program files (S435). The program execution manager 115 loads therein the program files in executable form (S436) and transfers the initiation of the use of service to the handheld device user (S437).

At this time, the handheld device user 10 is allowed to start the content viewing or browsing operation using the function of the cooperating computer device 300 through the handheld device 100 (S438).

FIG. 34 is a flowchart for explaining an example of the operation of the content display system of the FIG. 32 configuration by which the handheld device 10 is controlled to acquire only the file concerning the service specified by the handheld device user 10.

This example shows the case where the service definition file 325 has described therein at least:

(1) Information on the program file of the first user interface for a cooperating computer device service 326;

(2) Information on the program file of the content identification information acquisition unit 327;

(3) Information on the program file of the second user interface for a cooperating computer device service 328;

(4) Information on the program file of the control information generator 329;

(5) Information on the program file for controlling the content processor of the handheld device 330; and (6) Information on the program file of the third user interface for a cooperating computer device service 331.

In this example, the handheld device user 10 has determined the use of all of the program files mentioned above.

The handheld device user 10 requests the use of the services, provided by the cooperating computer device 300, to the program execution manager 115 of the handheld device 100 (S441).

The program execution manager 115 requests, in turn, the program file server unit 310 of the cooperating computer device 300 to present the service definition file 325 (S442). The program file server 310 responds to the request to transfer the service definition file 325 to the program execution manager 115 (S443).

The program execution manager 115 analyzes the contents of the service definition file 325 (S444) and, based on the analyzed results, presents a service selection menu to the handheld device user 10 (S445). The handheld device user 10 selects services desired to use from the service selection menu (S446).

Having received the selection results from the handheld device user 10, the program execution manager 115 acquires the program files concerned with the selection results from the program file server unit 310 of the cooperating computer device 300 (S447).

The program execution manager 115 loads therein the program files in executable form (S448) and transfers the initiation of the use of service to the handheld device user 10 (S449).

At this time, the handheld device user 10 is allowed to start the content viewing or browsing operation using the function of the cooperating computer device 300 through the handheld device 100 (S450).

In the examples of FIGS. 33 and 34, the provider of the cooperating computer device 300 can freely set the kind and number of program files that are registered in the service definition file 325.

FIGS. 35 through 38 are block diagrams and flowcharts illustrating other embodiments of the contents display system of the present invention that permit the utilization of cooperating computer devices 300 by using an electronic money circulative over the network and paying logical currencies of reasonable values.

Figure 35A:
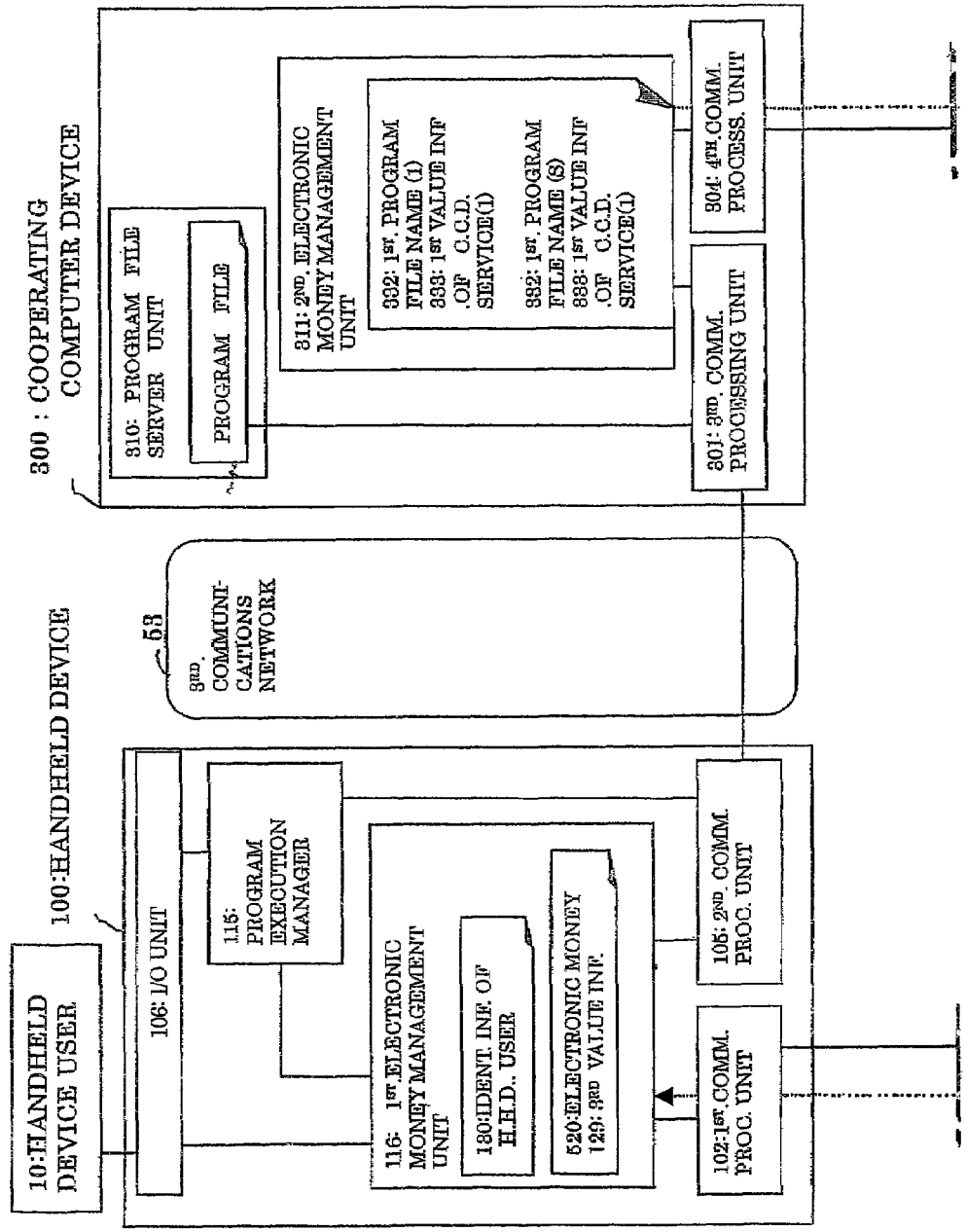
FIG. 35 is a block diagram illustrating another embodiment of the content viewing system according to the present invention in which the handheld device and the cooperating computer device, each of which has a function for the transmission and reception of a electronic money circulative over the network used so as to achieve a facility that permits the use of the cooperating computer device by payment of the electronic money of a reasonable value.
Figure 35B:
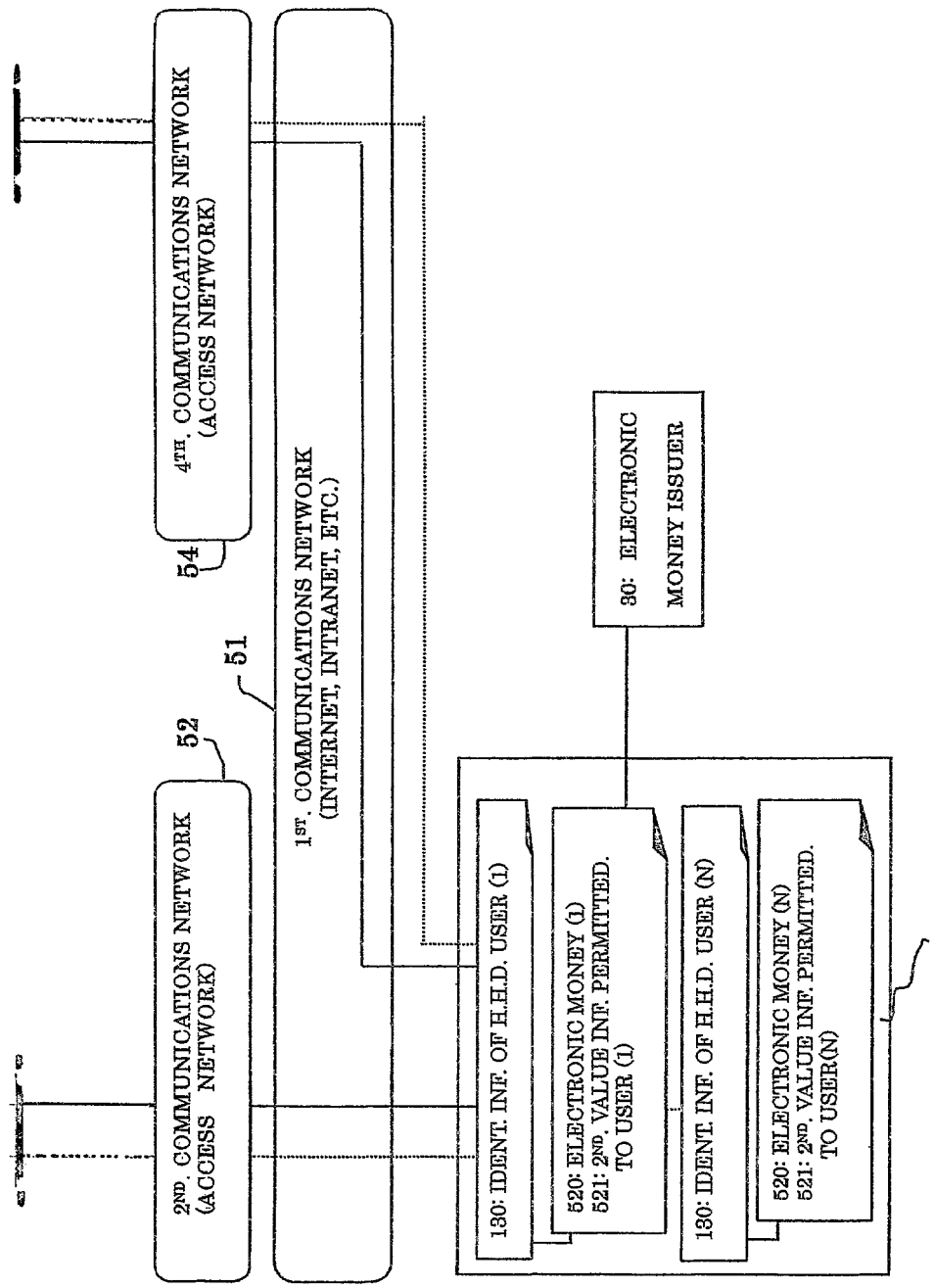

FIG. 35 depicts in block form a system configuration in which the handheld device 100 and the cooperating computer device 300 each have a function of transmitting and receiving electronic money.

On the Internet or Intranet there is prepared a settlement (or electronic banking) server 500 which issues electronic money 520 added with at least settler's identification information and circulative across the network, and which collects and manages information concerning the use of the electronic money.

The handheld device 100 has: a first electronic money management unit 116 which obtains the electronic money 520 from the settlement server 500 and manages the use of the electronic money; and a program execution manager 115 which controls the execution of program files obtained from the program file server unit 310 of the cooperating computer device 300.

The cooperating computer device 300 has: a program file server unit 310 which holds program files and manages their distribution; and a second electronic money management unit 311 which manages first value information 333 in correspondence with a first program file name 332 of a program file obtainable from the cooperating computer device 300, obtains the electronic money 520 from the handheld device 100 and generates electronic receipt data of electronic money 334 for the electronic money obtained.

Reference numeral 30 denotes an electronic money issuer who issues the electronic money 520.

Figure 36:
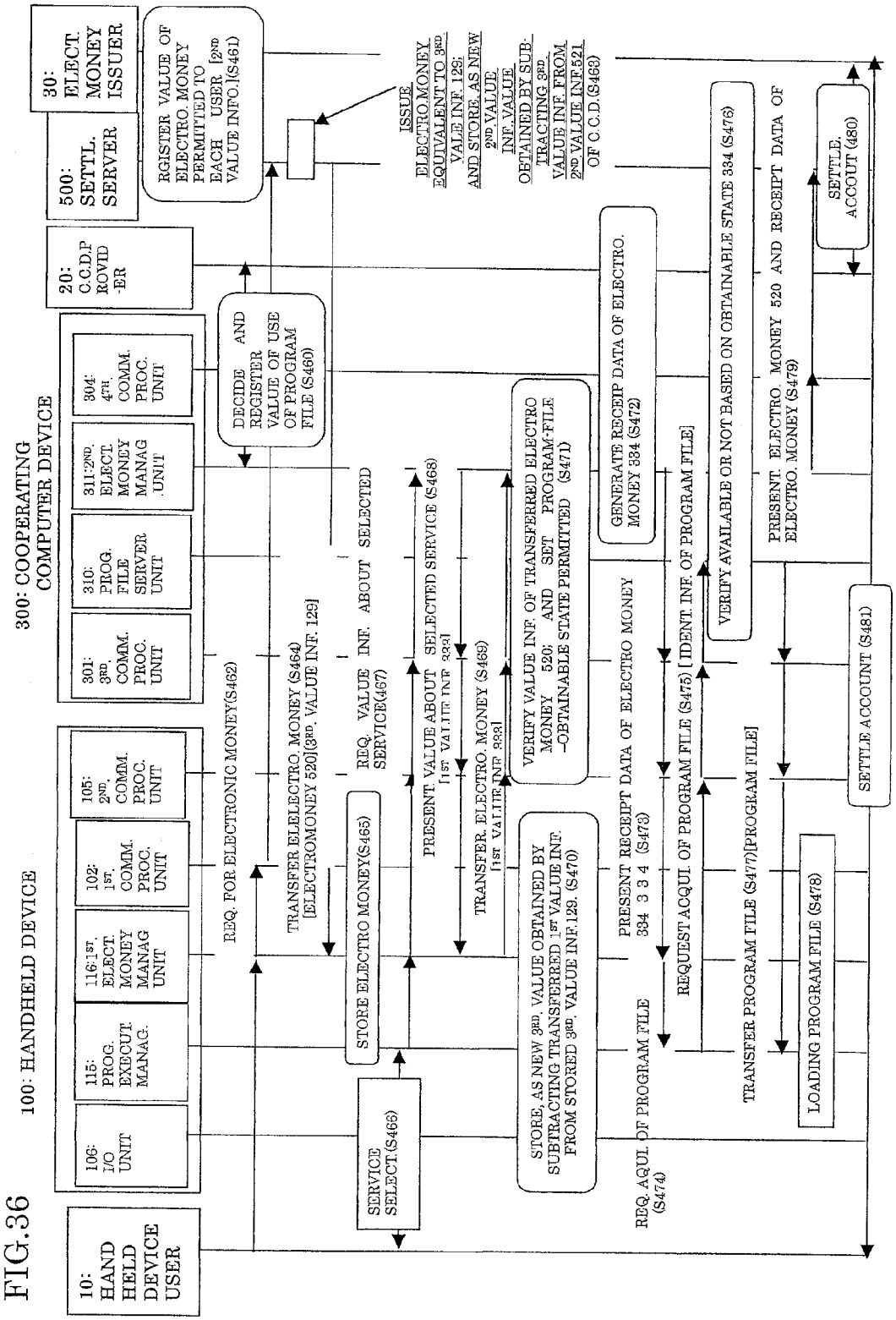
FIG. 36 is a flowchart explanatory of the operation of the embodiment of FIG. 35.

FIG. 36 is a flowchart for explaining an example of the operation of the content display system in which the handheld device 100 and the cooperating computer device 300 each have the function of transmitting and receiving the electronic money.

The owner or operator of the cooperating computer device 300 registers the first program file name 332 obtainable from the handheld device 100 and its first value information 333 with the second electronic money management unit 311 (S460).

The electronic money issuer 30 registers the electronic money 520 equivalent to the second value information 521 with the settlement server 500 in correspondence with the identification information 130 of respective handheld device users 10 (S461).

The first electronic money management unit 116 of the handheld device 100 responds to an instruction of the handheld device user 10 to present the identification information 130 of the handheld device user 10 via the first communication processing unit 102 to the settlement server 500, requesting it to issue the electronic money 520 having third value information 129 (S462).

The settlement server 500 issues the electronic money 520 corresponding to the third value information 129. At this time, the settlement server 500 stores, as new second value information 521, a value obtained by subtracting the third value information 129 of the electronic money 520 obtained by the handheld device 10 from the second value information 521 (S463).

Having received the electronic money 520 from the settlement server 500 (S464), the first electronic money management unit 116 stores the electronic money 520 (S465).

Based on the contents of the service selected by the handheld device user 10 (S466), the program execution manager 115 of the handheld device 100 transfers the first program file name 332 to be selected to the first electronic money management unit 116 of the handheld device 100, and the first electronic money management unit 116 transfers the first program file name 332 to the second electronic money management unit 311 of the cooperating computer device 300 (S467).

The second electronic money management unit 311 presents the first value information 333 to the first electronic money management unit 116 of the handheld device 100 (S468).

The first electronic money management unit 116 transfers the electronic money 520 equivalent to the transferred first value information 333 to the second electronic money management unit 311 (S469) and stores, as new third value information 129, a value obtained by subtracting the first value information 333 of the electronic money transferred thereto from the third value information 129 of the electronic money 520 held in the first electronic money management unit 116 (S470).

The second electronic money management unit 311 verifies the first value information 333 of the electronic money 520 transferred thereto and sets in the program file server unit 310 of the cooperating computer device 300 the availability of the acquisition of program files to the handheld device 100 from which the electronic money 520 was transferred to the second electronic money management unit 116 (S471).

The second electronic money management unit 311 generates the first receipt data of electronic money 334 about the reception of the electronic money 520 transferred thereto (S472) and transfers the first receipt data of electronic money 334 to the first electronic money management unit 116 of the handheld device 100 which is the sender of the electronic money 520 (S473).

The first receipt data of electric money 334 contains at least: identification information of the handheld device user who is the user of the electronic money obtained as described above; the name of program file to be obtained; information about the date of reception of the electronic money; value information of the received electronic money; and identification information of the owner or operator of the cooperating computer device.

Upon receiving the first receipt data of electronic money 334, the first electronic money management unit 116 urges the program execution manager 115 of the handheld device 100 to obtain the program file (S474), and the program execution manager 115 requests the program file server unit 310 of the cooperating computer device 300 to transfer the selected program files (S475).

The program filer server unit 310 verifies whether the requested program files are available or not based on the availability (S476) and, if available, transfers the program file to the program execution manager 115 (S477). The program execution manager 115 loads therein the program files transferred thereto, making it possible to use the service provided by the cooperating computer device 300 (S478).

The second electronic money management unit 311 presents to the settlement server 500 the electronic money 520 of the first value information 333 received from the first electronic money management unit 116 and the receipt data of electronic money 334 generated by itself (S479). Based on the electronic money 520 and the receipt data of electronic money 334 presented thereto, the settler (the electronic money issuer 30) settles an account with the owner or operator of the cooperating computer device 300 (S480).

Further, the settler settles an account with the handheld device user 10 in the amount corresponding to his used or spent electronic money 520 according to the amount of electronic money 520 obtained that is recorded for each handheld device user 10 (S481).

Figure 37A:
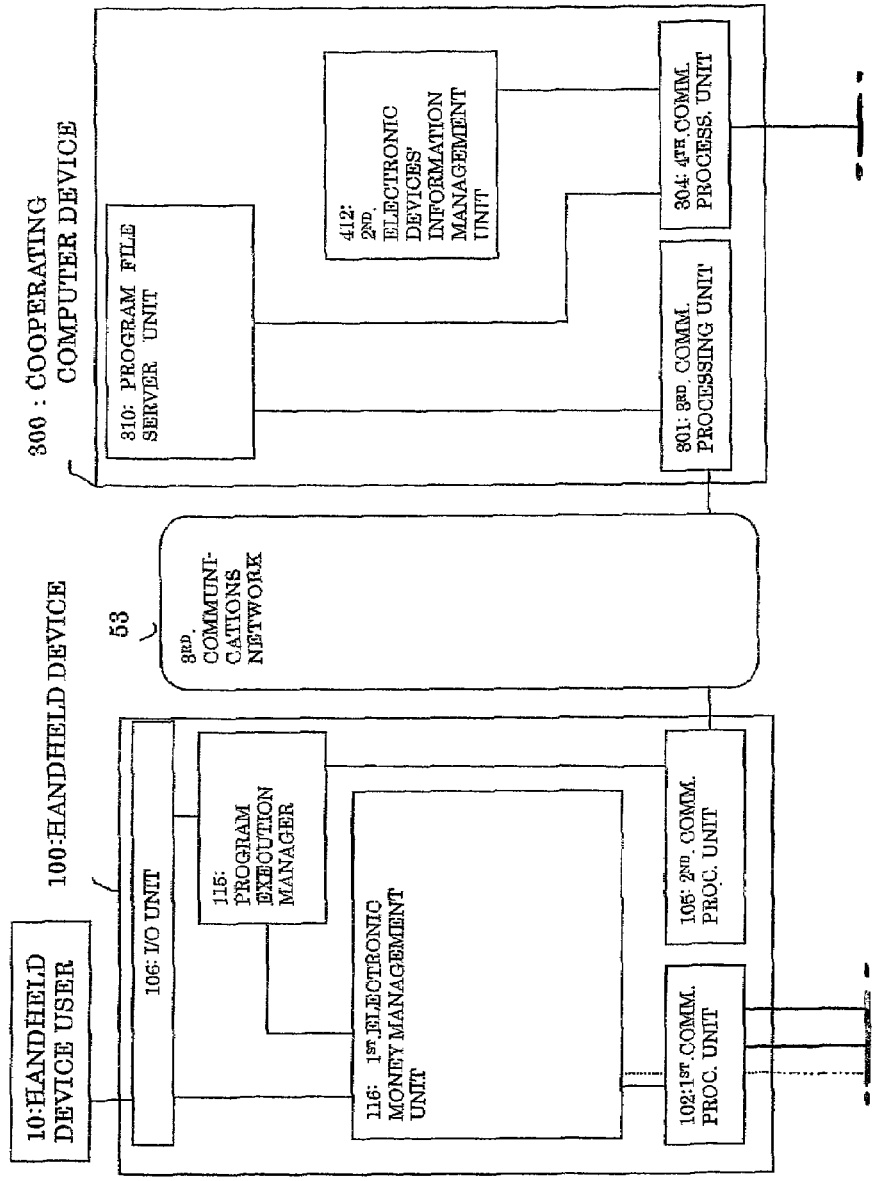
FIG. 37 is a block diagram illustrating a modified form of the embodiment of FIG. 35, in which the handheld device and a cooperating computer device information management server each has the function for the transmission and reception of electronic money.
Figure 37B:
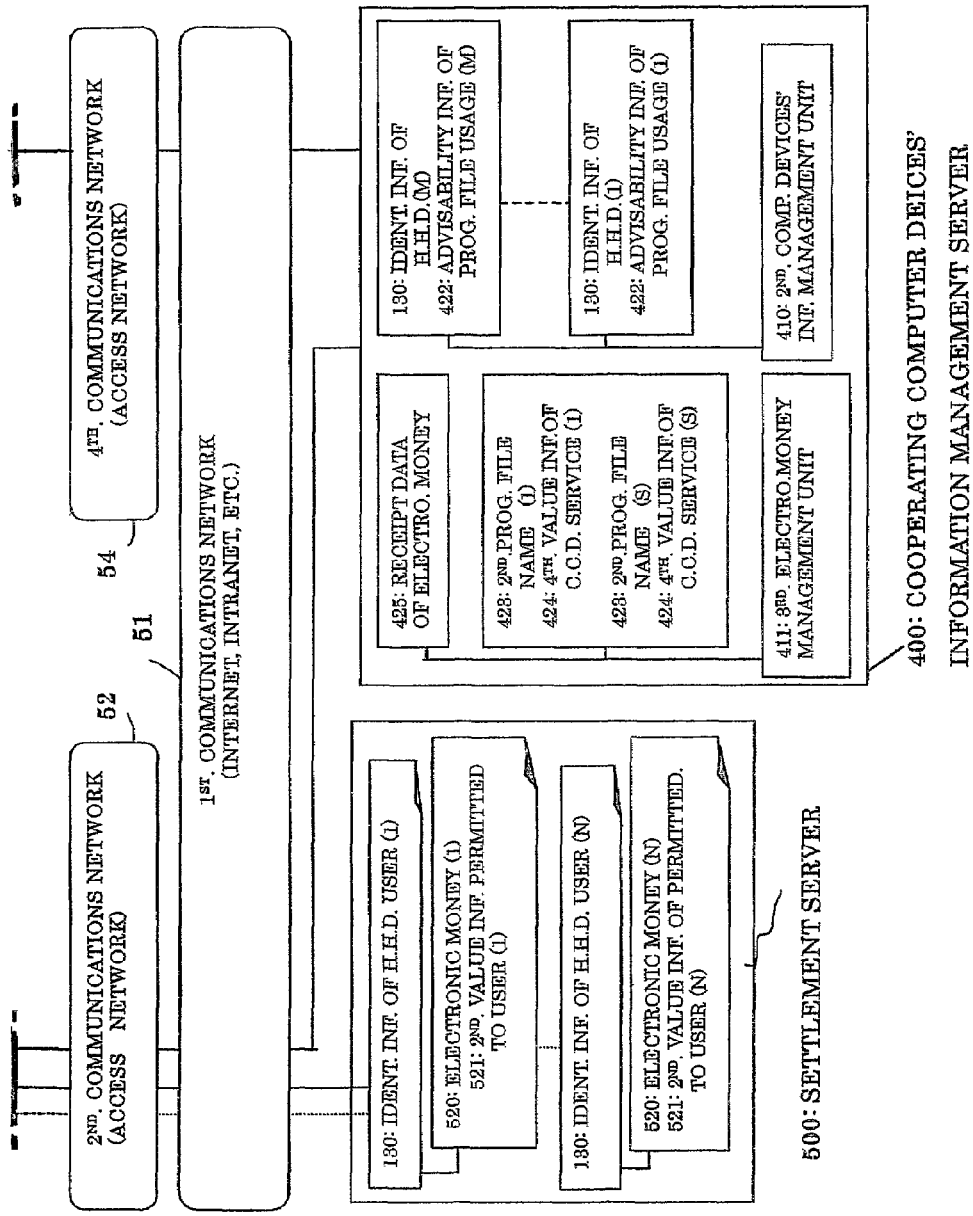

FIG. 37 illustrates in block form an example of the content display system in which the handheld device 100 and a cooperating computer device information management server 400 each have the function of transmitting and receiving the electronic money.

On the Internet or Intranet there is prepared a settlement (or electronic banking) server 500 which issues the electronic money 520 added with at least settler's identification information and circulative across the network and which collects and manages information concerning the use of the electronic money.

The handheld device 100 has: a first electronic money management unit 116 which holds the identification information 130 of the handheld device user 10, obtains the electronic money 520 from the settlement server 500 and manages the use of the electronic money obtained; and a program execution manager 115 which controls the execution of program files obtained from the program file server unit 310 of the cooperating computer device 300.

The cooperating computer device information management server 400 has at least: a second computer devices' information management unit 410 which manages program file usage advisability information 422 in association with identification information 130 of the handheld device user 10; and a third electronic money management unit 411 manages fourth value information 424 in correspondence with a second program file name 423 of a program file obtainable from the cooperating computer device 300 and generates receipt data of electronic money 425 for the reception of electronic money.

The cooperating computer device 300 has at least: a program file server unit 310 which holds program files and manages their distribution; and a second electronic money management unit 311 which obtains the electronic money 520 from the handheld device 100.

Figure 38B:
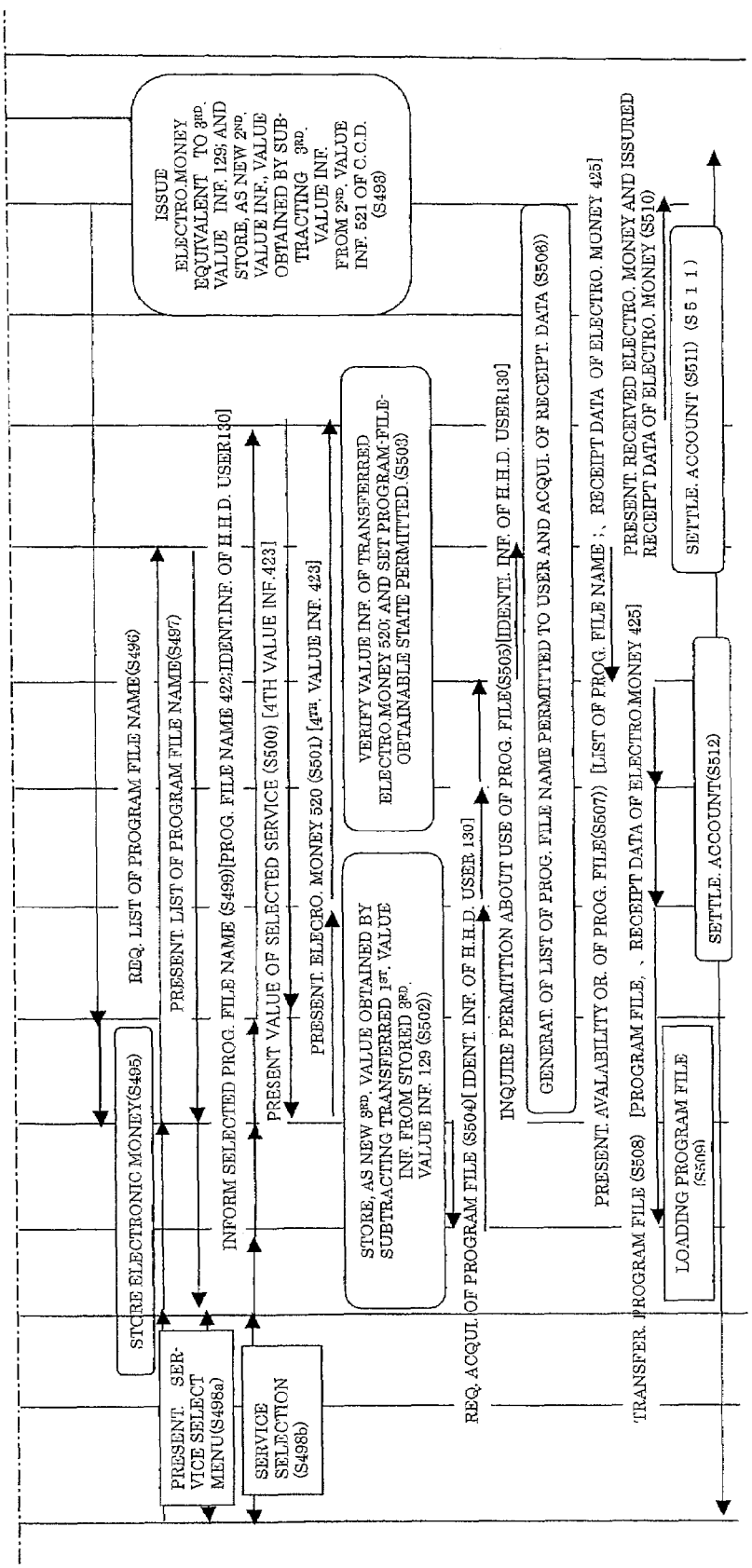
FIG. 38 is a flowchart explanatory of the operation of the embodiment of FIG. 37.

FIG. 38 is a flowchart for explaining an example of the operation of the contents display system of FIG. 37 in which the handheld device 100 and the cooperating computer device information management server 400 each have the function of transmitting and receiving the electronic money.

The owner or operator of the cooperating computer device 300 registers the second program file name 423 obtainable from the cooperating computer device 300 and its fourth value information 424 with the second computer devices' information management unit 410 (S490).

The electronic money issuer 30 registers the electronic money 520 equivalent to the second value information 521 with the settlement server 500 in correspondence with the identification information 130 of respective handheld device users 10 (S491).

The first electronic money management unit 116 of the handheld device 100 responds to an instruction of the handheld device user 10 to request the settlement server 500 via the first communication processing unit 102 to issue the electronic money 520 having the third value information 129 (S492).

The settlement server 500 issues the electronic money 520 equivalent to the third value information 129. At this time, the settlement server 500 stores, as new second value information 521, a value obtained by subtracting the third value information 129 of the electronic money 520 obtained by the handheld device 10 from the second value information 521 (S493).

The electronic money 520 corresponding to the third value information 521 is transferred from the settlement server 500 to the first electronic money management unit 116 of the handheld device 100 (S494).

Having received the electronic money 520 from the settlement server 500, the first electronic money management unit 116 stores the electronic money 520 (S495).

The cooperating computer device information management unit 111 responds to an instruction of the handheld device user 10 to obtain from the second computer devices' information management unit 410 of the cooperating computer device information management server 400 a list of program file name on which there are described program file names of program files usable by the handheld device user 10 (S496, S497).

Upon receiving the list of program file name, the cooperating computer device information management unit 111 urges the handheld device user 10 via the I/O unit 106 to select the program file to be used (S498).

Based on the contents of the service selected by the handheld device user 10 (S498), the program execution manager 115 of the handheld device 100 transfers the second program file name 422 to be used to the first electronic money management unit 116 of the handheld device 100. Then, the first electronic money management unit 116 transfers, in turn, the second program file name 422 and the first handheld device user identification information 130 to the third electronic money management unit 411 of the cooperating computer device information management server 400 (S499).

The third electronic money management unit 411 presents fourth value information 424 to the first electronic money management unit 116 of the handheld device 100 (S500).

The first electronic money management unit 116 transfers the electronic money 520 equivalent to the transferred fourth value information 424 to the third electronic money management unit 411 (S501) and stores, as new third value information 129, a value obtained by subtracting the fourth value information 424 of the electronic money 520 transferred thereto from the third value information 129 of the electronic money 520 held in the first electronic money management unit 116 (S502).

The third electronic money management unit 411 verifies the electronic money 520 transferred thereto and sets in the second computer devices' information management unit 410 of the cooperating computer device information management server 400 the program file usage advisability information 422 concerning the first handheld device user identification information 130 (S503).

The program execution manager 115 of the handheld device 100 responds to an instruction from the handheld device user 10 to present at least the first handheld device user identification information 130 to the program filer server 310 of the cooperating computer device 300, requesting it to transfer a program file (S504).

The program filer server 310 of the cooperating computer device 300 sends the first handheld device user identification information 130 received from the handheld device 100 to the second computer devices' information management unit 410 of the cooperating computer device information management server 400, requesting it to decide whether or not the handheld device 100 be allowed to obtain its desired program file (S505).

Based on the handheld device user identification information 130 received from the cooperating computer device 300, the second computer devices' information management unit 410 of the cooperating computer device information management server 400 decides the program files available to the handheld device 100, then generates a list of program file names and, at the same time, by presenting the received handheld device user identification information 130 to the third electronic money management unit 411, obtains the electronic receipt data of electronic money 425 for the handheld device 100 which obtains the program files (S506).

The second computer devices' information management unit 410 transfers the program file name list and the receipt data of electronic money 425 to the program file server unit 310 of the cooperating computer device 300 (S507).

The program file server unit 310 of the cooperating computer device 300 transfers the program files specified by the list of program file name and the receipt data of electronic money 425 to the program execution manager 115 of the handheld device 100 (S508).

The program execution manager 115 loads therein the program files thus obtained, making it possible to use the services of the cooperating computer device 300 (S509).

The third electronic money management unit 411 presents the electronic money 520 of the fourth value information 333 received from the first electronic money management unit 116 and the receipt data of electronic money 425 to the settlement server 500 (S510). Based on the electronic money 520 and the receipt data of electronic money 425 thus presented, the settler (the electronic money issuer 30) settles an account with the owner or operator of the cooperating computer device 300 (S511).

Further, the settler settles an account with the handheld device user 10 in the amount corresponding to his used or spent electronic money 520 according to the amount of electronic money 520 obtained that is recorded for each handheld device user 10 (S512).

Figure 39:
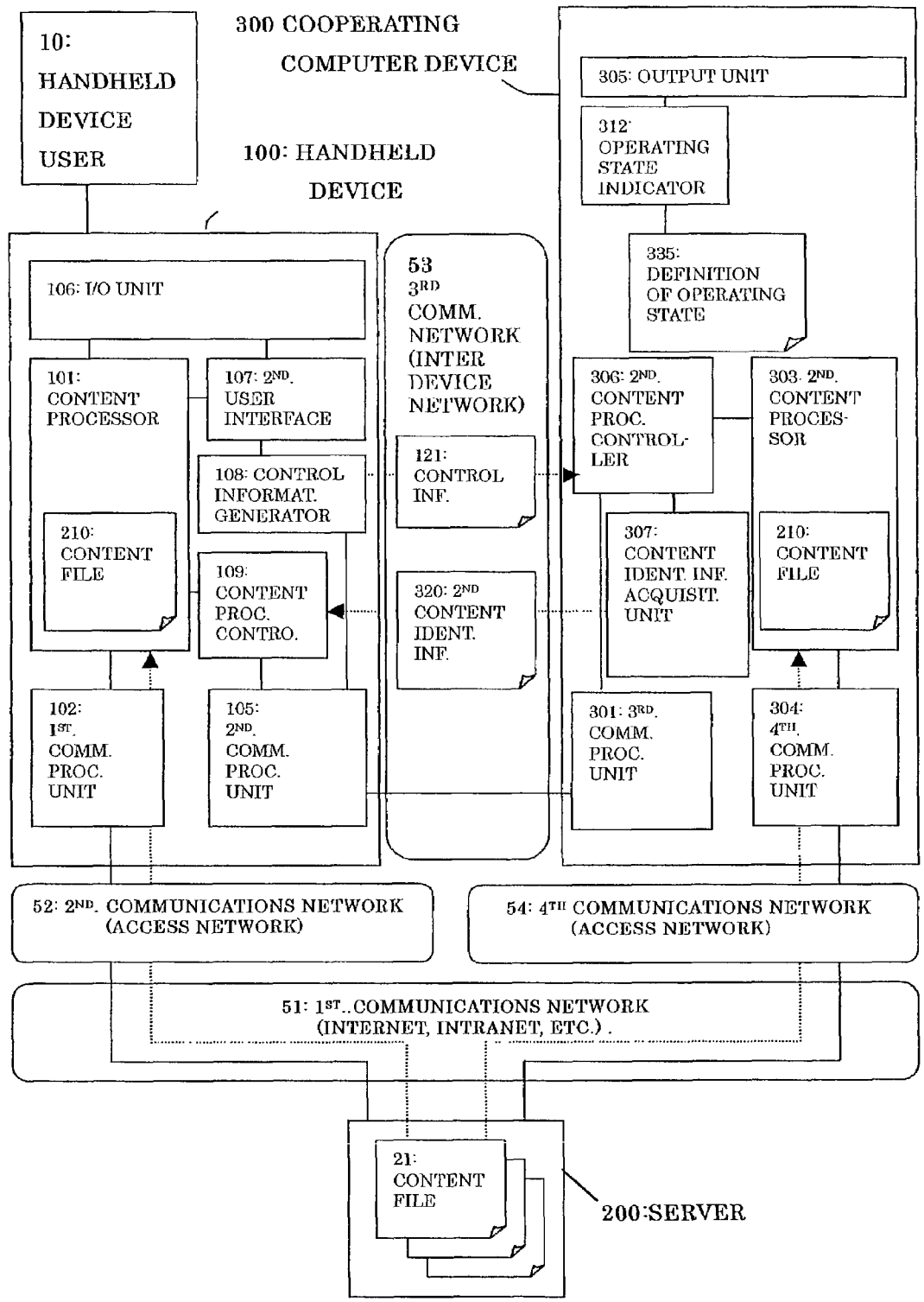
FIG. 39 is a block diagram illustrating still another embodiment of the content viewing system according to the present invention, in which the handheld device user manages on the cooperating computer device the choice and execution of an operation to be performed on the cooperating computer device.

FIG. 39 illustrates in block form another embodiment of the content display system according to the present invention adapted so that the selection and execution of operations by the handheld device user 10 on the cooperating computer device are controlled on the latter.

The handheld device 100 comprises at least a content processor 101, a first communication processing unit 102, a second communication processing unit 105, an I/O unit 106, a second user interface 107, a control information generator 108, and a content processor controller 109.

The cooperating computer device 300 comprises at least a third communication processing unit 301, a content processor 303, a fourth communication processor 304, an output unit 305, a second content processor controller 306, a content identification information acquisition unit 307, and an operating state indicator 312. The second content processor controller 306 manages definition of operating state 335 that defines the transition of operating state which can be provided to the handheld device user 10 in response to an input event from the handheld device 100.

Figure 40:
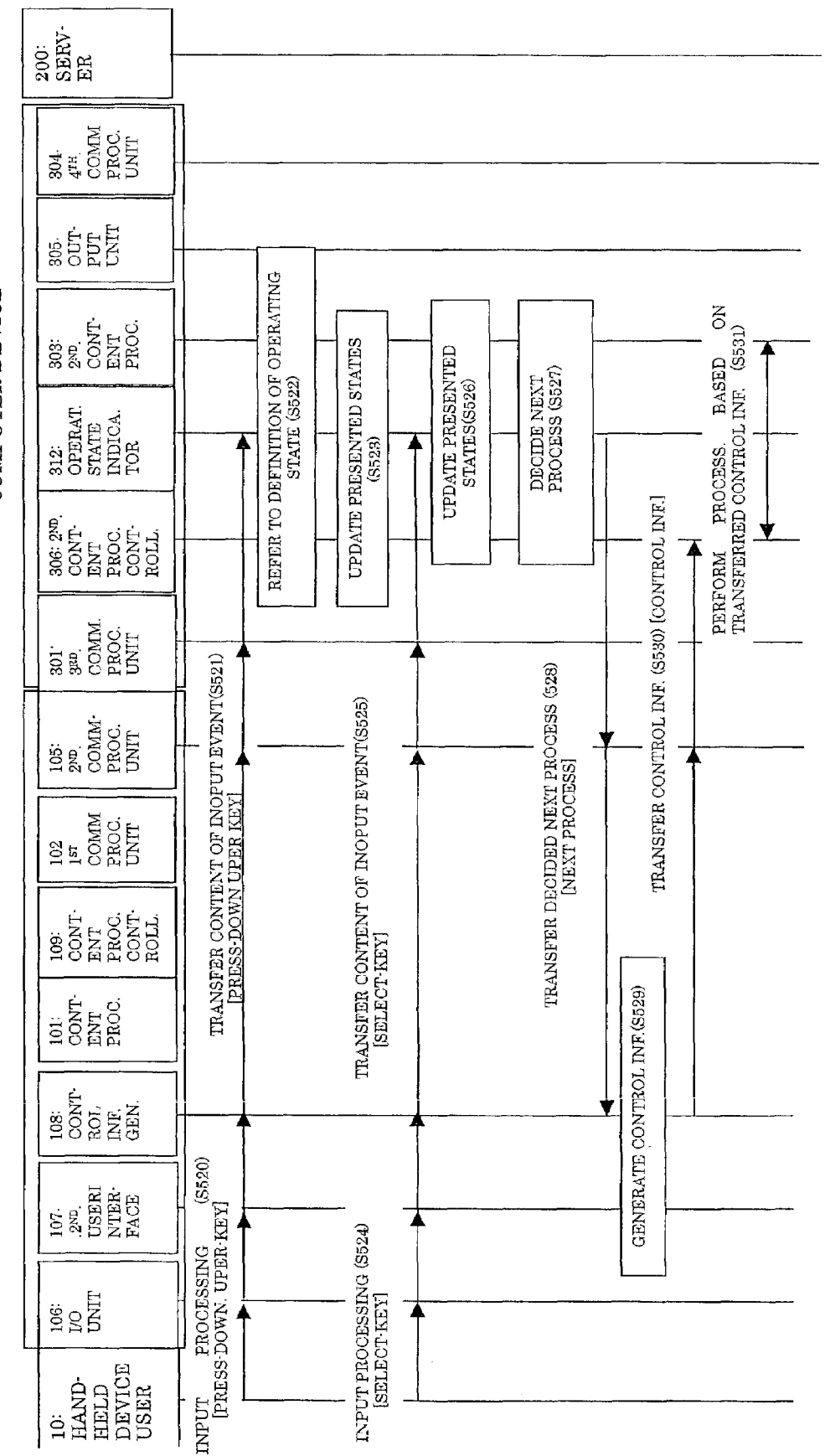
FIG. 40 is a flowchart explanatory of the operation of the embodiment of FIG. 39.

FIG. 40 is a flowchart showing the operation of the content display system of FIG. 39.

The handheld device user 10 performs input processing via the second user interface 101 on the handheld device 100 (S520). The input event is transferred to the control information generator 108, from which the event is transferred via the second communication processing unit 105 and the third communication processing unit to the operating state presentation part 312 (S521).

When the event transferred thereto are to change the selection of operation, the operating state indicator 312 refers to the definition of operating state 335 (S522), then analyzes the correspondence or relationship between the contents of the input event transferred thereto and those currently presented thereon, and updates the latter based on the definition of operating state 335 (S523).

On the other hand, when the contents of the input event are to change the state of execution of operation (S524 to S525), the operating state indicator 312 updates its currently presented contents with the contents of the newly input event (S526). Further, the operating state indicator 312 decides the contents of processing to be performed by the control information generator 108 of the handheld device 100 (S527) and transfers thereto the contents of the decision (S528).

The control information generator 108 of the handheld device 100 generates control information corresponding to the transferred contents of decision (S529) and sends the control information to the second content processor 306 of the cooperating computer device 300 (S530). The second content processor 306 performs processing based on the control information sent thereto (S531).

As described above in detail, according to the content display system of the present invention, since the handheld device user is allowed to transfer a content display from the handheld device to the cooperating computer device as required, the handheld device user can enjoy comfortable content browsing/viewing environments without being affected by the processing power, display or communication capability of the handheld device, or a change in the state of communication of the channel used by the handheld device.

Further, since the handheld device user is allowed to specify the whole or required part of contents displayed on the cooperating computer device and acquire his specified contents into the handheld device for display thereon, the handheld device user can continue browsing/viewing of the specified contents even when he goes away from the location where the cooperating computer device is placed.

Further, since the handheld device user is allowed to store the identification information of the whole or required part of contents displayed on the cooperating computer device into the handheld device, the handheld device user can resume browsing/viewing of the specified contents at anywhere at which the cooperating computer device is available without being affected by the limitations of handheld device capability.

Further, the handheld device user does not need to input identification information of cooperating computer device or address information each time it is necessary to establish a channel between the handheld device and the cooperating computer device; hence, it is possible to minimize interruption of the handheld device user's content browsing/viewing operation.

Further, even if the handheld device user has no knowledge of the identification information or address information about the cooperating computer device to be used, the handheld device user does not need to input the identification information of cooperating computer device or address information each time it is necessary to establish a channel between the handheld device and the cooperating computer device; hence, it is possible to minimize interruption of the handheld device user's content browsing/viewing operation.

Further, since an appropriate number of usable cooperating computer devices is presented to the handheld device user for selection, or since the handheld device user does not need to select the cooperating computer device to be used, it is possible to lighten the workload for the handheld device user and keep interruption of his content browsing/viewing operation to a minimum.

Further, since the retrieval of a usable cooperating computer device by the handheld device does not necessitate accessing to plural cooperating computer devices and collecting answers therefrom, it is possible to reduce the time to present the usable cooperating computer device to the handheld device user. This permits minimization of interruption of the handheld device user's contents browsing/viewing operation.

Further, since the owner or operator of cooperating computer device is allowed to efficiently install and manage them, it is possible to improve the content browsing/viewing environment for the handheld device user.

Further, since the appropriate number of usable cooperating computer devices is presented to the handheld device user for selection, it is possible to lighten the workload for the handheld device user and keep interruption of his content browsing/viewing operation to a minimum.

Further, even if the handheld device user moves to various places where usable cooperating computer devices are installed, the handheld device user is allowed to continue/resume his content browsing/viewing operation. Besides, since the contents are displayed on the cooperating computer device alone, it is possible to exclude possibilities of the contents being unduly acquired into and held in the handheld device and unduly leaked to other handheld devices.

Further, since the handheld device user is not required to provide previously acquisition function to user interfaces and control information generating function necessary for controlling the cooperating computer device and to store previously them in the handheld device, it is possible to lighten the workload for the handheld device user and efficiently utilize a memory of a limited capacity in the handheld device.

Further, since the owner or operator of the cooperating computer devices can get value for the use of the cooperating computer devices, it is possible to open the cooperating computer device to a large number of users without inflicting a loss on the owner or operator by the use of the cooperating computer devices. Accordingly, the handheld device user can use cooperating computer devices at more places and opportunities by paying prices to the owner or operator. This ensures the continuity of the handheld device user's content browsing/viewing operation.

Further, since the individual cooperating computer devices need not be equipped with a price-for-use-of-cooperating computer device input/output management facility, and since the owner or operator can efficiently install and manage a plurality of cooperating computer devices, it is possible to enrich the content browsing/viewing environments for the handheld device user.

Moreover, since the handheld device user need not to pay the price for the use of the cooperating computer device each time a channel to the cooperating computer device is established, it is possible to reduce the time for presenting usable cooperating computer devices to the handheld device user. This permits minimization of interruption of the handheld device user's content browsing/viewing operation.

What we claim is:

1. A content display system for displaying, multimedia contents delivered from a server of a communication network, by the use of a handheld device and a cooperating computer device cooperated to the handheld device:
   said handheld device comprising:
   I/O unit for receiving commands from and displaying contents to a user of the handheld device;
   a first content processor for acquiring a content file for the handheld device from the server on the communication network and processing the content file to display to the user of the handheld device;
   a first communication processing unit for accessing to the server;
   a first user interface for making selection the user of the handheld device one of the presented contents which is desired to be processed by the cooperating computer device cooperated to the handheld device;
   a content identification information acquisition unit for acquiring, from the content file, identification information specified via the first user interface unit; and
   a second communication processing unit for exchanging commands and information with the cooperating computer device;
   processing results from the first content processor being displayed via said I/O unit to the use of said handheld device;
   said cooperating computer device, comprising:
   a fourth communication processing unit for accessing to the server;
   a third communication processing unit for exchanging commands and information with the handheld device;
   a second content processor for acquiring the content file for the cooperating computer device from the server on the communications network and processing the content file to display to the handheld device user;
   a first content processor controller for controlling, the content processing of the second content processor according to the contents of the content identification information transferred from the handheld device; and
   an output unit for displaying the processing results to the user of the handheld device;
   said first content processor acquiring the contents specified by the handheld device user via the first communication processing unit of said handheld device and displaying the contents via said I/O unit to the handheld device user;

said first user interface urging the handheid device user to select that a part of the contents displayed on the handheld device, which the handheld device user wants to display on the cooperating computer device;

when received completion of the content selection from the handheld device user, the first user interface instructing the content identification information acquisition unit to get the content identification information so that the content identification information acquisition unit obtains the identification information for identifying the content file;

the first content identification information thus obtained being transferred to the first content processing controller via the second communication processing unit of the handheld device and the third communication processing unit of the cooperating computer device;

the first content processing controller, having received the first content identification information, presenting the first content identification information to the second content processor so that the second content processor acquires the content file concerning the first content identification information from the server via the fourth communication processing unit; and the second content processor processing the content file thus acquired so that processed results of the content file is displayed via said output unit to the handheld device user.

2. A content display system for displaying, multimedia contents delivered from a server of a communication network, by the use of a handheld device and a cooperating computer device cooperated to the handheld device:

said handheld device comprising:

I/O unit for receiving commands from and displaying contents to a user of the handheld device;

a first content processor for acquiring a content file for the handheld device from the server on the communications network and processing the content file to display to the user of the handheld device;

a first communication processing unit for accessing to the server;

a user interface for instructing to control a second content processor of the cooperating computer device and for making selection one of the contents displayed on cooperating computer device, which is desired to be processed by the handheld device;

a control information generator for generating control information employed for controlling operations of the second content processor in accordance with contents of instructions presented from the user interface;

a content processor controller for controlling the content processing of the first content processor according to the contents of the content identification information transferred from the cooperating computer device; and a second communication processing unit for exchanging commands and information with the cooperating computer device;

processing results from the first content processor being displayed via said I/O unit to the use of said handheld device;

said cooperating computer device, comprising:

a fourth communication processing unit for accessing to the server;

a second content processor for acquiring the content file for the cooperating computer device from the server and processing the content file to display to the handheld device;

a third communication processing unit for exchanging commands and information with the handheld device;

a second content processor controller for controlling, the content processing of the second content processor according to the contents of the control information transferred from the handheld device;

a content identification information acquisition unit for acquiring, from content file, content identification information specified via the user interface; and an output unit for displaying the processing results to the user of the handheld device;

the control information generator generates, according to the input content identification information applied by the handheld device user via the user interface, control information which instructs the display of the contents on the cooperating computer device, so that the control information is transferred via the second communication processing unit and the third communication processing unit to the second content processor controller of the cooperating computer device;

the second content processor of the cooperating computer device acquiring the content file from the server via the fourth communication processing unit based on the control information so that processed result thereof is displayed to the handheld device user via the output unit of the cooperating computer device;

upon receiving the command concerning the initiation of displaying the content file on the handheld device, the user interface presenting to the handheld device user a control menu for selecting the content to be processed on the handheld device;

the control information generator generating the control information from contents of selection processing performed on the control menu so that the control information is transferred, via the second communication processing unit of the handheld device and the third communication processing unit of the cooperating computer device, to the second content processor;

the second content processor controller transferring the contents of the control information to the second content processor so that the second content processor moves or shifts the focused portion of the contents displayed on the cooperating computer device, the result of focus movement being output in visual format via the output unit to the handheld device user;

the handheld device user instructing via the user interface whether the handheld device user wants to acquire into the handheld device the whole or partial area of contents displayed on the cooperating computer device;

the user interface presenting the instruction from the handheld device user to the control information generator so that the control information generator generates the control information for acquisition of the instructed content and transfers the control information to the second content processor controller on the cooperating computer device via the second communication processing unit of the handheld device and the third conimunication processing unit of the cooperating computer device;

the second content processor controller transferring the control information to the content identification information acquisition unit of the cooperating computer device;

when having received the control information indicative of selection of the whole contents, the content identification acquisition unit acquires, as the second content identification information, content identification information for identifying the whole content file;

when having received the control information indicative of selection of a partial area of the contents, the content identification information acquisition unit acquires, as the second content identification information, content identification information for identifying a content file which forms the currently focused area;

the content identification information acquisition unit transferring the second content identification information thus obtained to apply to the content processor controller of the handheld device via the third communication processing unit of the cooperating computer device and the second communication processing unit of the handheld device; and the first content processor of the handheld device acquiring via the first communication processing unit of the handheld device the content file specified by the content processor controller of the handheld device and displaying the acquired content to the handheld device user via the I/O unit.

3. A content display system for displaying, multimedia contents delivered from a server of a communication network, by the use of a handheld device and a cooperating computer device cooperated to the handheld device according to claim 2, further comprising:

the handheld device user proposing, to the user interface, the acquisition of content identification for the whole or for the focused part of the contents displayed on the cooperating computer device;

the user interface instructing to the control information generator to obtain the content identification information so that the control information generator generates control information based on the instructions from second the user interface and transfers the control information to the second content processor controller in the cooperating computer device via the second communication processing unit of the handheld device and the third communication processing unit of the cooperating computer device;

when having received the control information indicative of selection of the whole contents from the second content processor controller, the content identification information acquisition unit obtains, as the second content identification information, content identification information for identifying the whole content file;

when having received the control information indicative of selection of a focused part of the content file from the second content processor controller, the content identification information acquisition unit obtains, as the second content identification information, content identification information for identifying the content file forming the currently focused area; and the content identification information acquisition unit transfers, the second content identification information thus obtained, to the content processor controller of the handheld device via the third communication processing unit of the cooperating computer device and the second communication processing unit of the handheld device;

the content processor controller stores the second content identification information thus received.

4. A content display system for displaying, multimedia contents delivered from a server of a communication network, by the use of a handheld device and a cooperating computer device cooperated to the handheld device:

said handheld device comprising:

I/O unit for receiving commands from and displaying contents to a user of the handheld device; a first content processor for acquiring a content file for the handheld device from the server on the communication network and processing the content file to display to the user of the handheld device;

a first communication processing unit for accessing to the server;

a first user interface for making selection of a user of the handheld device one of the presented contents which is desired to be processed by the cooperating computer device cooperated to the handheld device;

a content identification information acquisition unit for acquiring, from the content file, identification information specified via the first user interface;

a second user interface for the handheld device user to control the second content processor of the cooperating computer device and to perform selection and designation of desirable content from contents displayed on the cooperating computer device;

a control information generator for generating control information employed to control the second content processor of the cooperating computer device in accordance with commands applied by the handheld device user via the second user interface;

a second communication processing unit for exchanging commands and information with the cooperating computer device;

a content processor controller for controlling the operation of the first content processor by the use of the content identification information applied from the cooperating computer device; and a third user interface for switching between the first user interface and the second user interface;

processing results from the first content processor being presented via said I/O unit to the use of said handheld device;

said cooperating computer device, comprising:

a fourth communication processing unit for accessing to the server;

a second content processor for acquiring the content file for the cooperating computer device from the server and for processing the content file to display to the handheld device user;

a third communication processing unit for exchanging commands and information with the handheld device;

a first content processor controller for controlling, the content processing of the second content processor, by the use of contents of the content identification information transferred from the handheld device;

a second content processor controller for controlling, the content processing of the second content processor, in accordance with contents of the control information transferred from the handheld device;

a content identification information acquisition unit for acquiring, from the content file in the cooperating computer device, content identification information specified via the second content processor controller;

an output unit for displaying the processing results to the user of the handheld device;

the handheld device user performing by the use of the first user interface, content browsing/viewing environments including to display a content on the handheld device, to change the content display on the handheld device, to switch at an arbitrary stage the output destination of the content displayed on the handheld device to the cooperating computer device, or to change the content displayed on the handheld device while the displaying of the content on the cooperating computer device is kept on;

the handheld device user performing by the use of the second user interface, content browsing/viewing environments including to change the displayed content on the cooperating computer device, or to switch at an arbitrary state the output destination of the whole or focused part of the content displayed on the cooperating computer device to the handheld device; and the handheld device user switching, at any time in an arbitrary stage, by instructing switching instruction to the third user interface, between the first user interface and the second user interface.

5. A content display system according to claim 1, in which the handheld device carried by the handheld device user further comprises a cooperating computer device information management unit for managing at least one of identification information of the cooperating computer device and at least one of first address information necessary for performing communication with the cooperating computer device, and a fourth user interface for presenting, to the handheld device user, said at least one identification information of the cooperating computer device and to urge it to select the cooperating computer device cooperated with the handheld device, whereby the second communication processing unit possess function for establishing a communication channel to the third communication processing unit of the cooperating computer device selected by the handheld device user via the fourth user interface.

6. A content display system according to claim 5, in which the cooperating computer device further comprises a computer device information management unit for managing identification necessary for communicating with the cooperating computer device;

whereby the fourth user interface presents the identification information of the cooperating computer device and first address information, which are acquired by the computer device information management unit, to urge the cooperating computer device to cooperate with the handheld device and acquires the selection contents from the handheld device, and whereby the second communication processor unit of the handheld device possess a function for establishing a communication channel to the third communication processor unit of the cooperating computer device selected by the handheld device user via on the fourth user interface.

7. A content display system according to claim 6, in which the computer device information management unit further possess a function for managing, from the second content processor, a list of the classification of the second content processor provided on the cooperating computer device mounting the computer device information management unit;

the fourth user interface on the handheld device urges the handheld device user to specify the desirable class of the second content processor and acquires the selection from the handheld device user;

the cooperating computer device information management unit on the handheld device transfers the class of the second content processor specified on the fourth user interface to the computer device information management unit of the cooperating computer device; and the computer device information management unit on the cooperating computer device judges whether or not the cooperating computer device is has the content processor with the class specified by the handheld device user, so that the cooperating computer device returns the identification information and the first address information of the handheld device managed by the first handheld device management unit in a case where the cooperating device is cooperative to the current handheld device.

8. A content display system according to claim 1, in which the computer device information management unit of the cooperating computer device manages identification information of the cooperating computer device provider for identifying the owner or operator of the cooperating computer device;

the cooperating computer device information management unit on the handheld device manages identification information of the cooperating computer device provider for identifying the owner or operator of the cooperating computer device cooperative of the handheld device;

the cooperating computer device information management unit on the handheld device transfers, identification information of the cooperating computer device provider stored therein, to the computer device information management unit of at least one of the cooperating computer device, when the handheld device requests the cooperating computer device to present the first address information of the cooperating computer device; and the computer device information management unit tests whether or not the identification information of the cooperating computer device provider presented thereto matches with the identification information of the cooperating computer device provider stored therein, so that the handheld device information management unit returns the identification information of the cooperating computer device provider and the first address information each stored therein, when the identification information of the cooperating computer device presented thereto matches with the identification information of the cooperating computer device provider stored therein.

9. A content display system according to claim 6, in which the handheld device establishes a communication channel with the cooperating computer device connectable by the first address information acquired in first when the handheld device acquires the identification information of the cooperating computer device and the first address information from at least one of the corresponding computer device.

10. A content display system according to claim 6, in which the handheld device comprises a handheld device location management unit so that the cooperating computer device information management unit on the handheld device manages range of searching cooperating computer devices;

the cooperating computer device comprises a computer device location management unit for managing the geographical or physical occasion of the cooperating computer device;

the cooperating computer device transfers, to the handheld device, location information of the cooperating computer device acquired from the computer device location management unit on the cooperating computer device when the cooperating computer device transfers the identification information thereof and the first address information thereof;

the cooperating computer device information management unit on the handheld device acquires the current location information of the handheld device from the handheld device location management unit on the handheld device and, further, picks up at least one cooperating computer device cooperative of the handheld device together, which locates within the range of distance from the current location information of the handheld device by the use of location information of the handheld device and the location information transferred from at least one of the cooperating computer device; and the cooperating computer device information management unit on the handheld device generates information representative of the positional relationship between the handheld device and picked-up cooperating computer devices and presents the positional relationship information via the fourth user interface.

11. A content display system according to claim 10, in which the handheld device comprises a handheld device location management unit for the management of current geographical location thereof and a direction sensor unit for automatically detecting and obtaining direction to which a particular portion of the handheld device is directed;

the cooperating computer device information management unit on the handheld device manages the range of searching cooperating computer device;

the cooperating computer device comprises, further, a computer device location management unit for managing current geographical location information thereof the cooperating computer device transfers, to the handheld device, location information of the cooperating computer device acquired from the computer device location management unit on the cooperating computer device when the cooperating computer device transfers the identification information thereof and the first address information;

the cooperating computer device information management unit on the handheld device acquires the current location information of the handheld device from the handheld device location management unit on the handheld device, obtains, from the direction sensor unit, direction to which a particular portion of the handheld device is directed and further, picks up at least one cooperating computer device cooperative together with the handheld device, which locates within the range of distance in the particular direction from the current location information of the handheld device by the use of the current location information of the handheld device, the direction information of the handheld device and the location information of the cooperating computer device transferred from at least one of the current location information of the handheld devices; and the cooperating computer device information management unit on the handheld device generates information representative of the positional relationship between the handheld device and picked-up cooperating computer devices and presents the positional relationship information via the fourth user interface.

12. A content display system according to claim 10, in which the handheld device establishes a communication channel with the cooperating computer device positioned at geographically nearest the handheld device when the handheld device acquires the identification information thereof and the first address information from at least one of the cooperating computer device.

13. A content display system according to claim 5, further comprising a cooperating computer device information management server provided with a second computer device information management unit for managing the identification information and the first address information of the cooperating computer devices in correspondence with the cooperating computer device attributes, each of which is composed of at least the location of the cooperating computer device and the list of the content processors classes supported by the cooperating computer devices;

in which the cooperating computer device information management unit on the handheld device manages second address information for establishing connection to the cooperating computer device of the cooperating computer device information management server provided by the owner or operator of the cooperating computer devices;

in which the handheld device comprises a handheld device location management unit for managing geographical position thereof;

the fourth user interface on the handheld device urges the handheld device user to specify the class of the second content processor desirable to use and acquires the selection from the handheld device user;

the cooperating computer device information management unit on the handheld device acquires, from the handheld device location management unit, the current location information of the handheld device;

the cooperating computer device information management unit on the handheld device transfers, the class of the second content processor specified on the fourth user interface and the current location information of the handheld device, to the second computer device information management unit on the cooperating computer device information management server which can access to the second address information;

the second computer device information management unit on the handheld device information server returns by the use of the class of the second content processor and the current location information of the handheld device, the identification information, the address information and the location information of at least one of the cooperating computer device which locates in the specified range of distance from the handheld device and has the second content processor with the specified class;

the cooperating computer device information management unit on the handheld device generates information representative of the positional relationship between the handheld device and the cooperating computer devices informed by the cooperating computer device information server and presents the positional relationship information via the fourth user interface on the handheld device; and the second communication processing unit establishes a communication channel to the third communication processing unit of the cooperating computer device, which is selected by the handheld device user.

14. A content display system according to claim 13, comprising:

a cooperating computer device information management server provided with a second computer device information management unit for managing the identification information and the first address information of the cooperating computer devices in correspondence with the cooperating computer device attributes, each of which is composed of at least the location of the cooperating computer device and the list of the second content processors' classes supported by the cooperating computer devices;

in which the handheld device further comprises a handheld device location management unit for managing geographical position thereof and a direction sensor unit for automatically detecting and obtaining direction to which a particular portion of the handheld device is directed;

the cooperating computer device information management unit on the handheld device transfers, the class of the second content processor specified on the fourth user interface, the current location information of the handheld device and the direction information acquired from the sensor unit, to the second computer device information management unit on the cooperating computer device information management server; and the second computer device information management unit on the cooperating computer device information management server returns by the use of the class of the second content processor, the current location information of the handheld device and the direction information acquired, the identification information, the address information and the location information of at least one of the cooperating computer device which locates in the specified range of distance along the specified direction from the handheld device;

the cooperating computer device information management unit on the handheld device generates information representative of the positional relationship between the handheld device and the cooperating computer devices informed by the cooperating computer device information server and presents the positional relationship information via the fourth user interface on the handheld device; and the second communication processing unit establishes a communication channel to the third communication processing unit of the cooperating computer device, which is selected by the handheld device user.

15. A content display system according to claim 13, in which the second computer device information management unit of the cooperating computer device information management server, which is being requested from the handheld device to transfer the identification information and the first address information of the cooperating computer device, returns the identification information and the first address information of only one cooperating computer device nearest geographically to the handheld device.

16. A content display system according to claim 4, further comprising:
means for outputting a content by the content processor of the handheld device, via the I/O unit of the handheld device in response to instructions from the handheld device user in the content browsing/viewing operations through the use of the handheld device and the first cooperating computer device;
means for releasing by the second communication processing unit in response to an instruction from the handheld device user, the channel between the second communication processing unit and the third communication processing unit of the first cooperating computer device;
means for outputting continuously, by the content processor of the handheld device, at least one content in response to instruction from the handheld device user;
means for establishing, by the second communication processing unit in response to instructions from the handheld device user, a communication channel between the second communication processing unit of the handheld device and the third communication processing unit of the second cooperating computer device; and
means for performing, by the handheld device user, content browsing/viewing operations through the use of the handheld device and the second cooperating computer device.

17. A content display system according to claim 4, further comprising:
means for holding, by the content processor controller of the handheld device, identification information of a specified content file via the I/O unit of the handheld device in response to instructions from the handheld device user in the content browsing/viewing operations through the use of the handheld device and the first cooperating computer device;
means for releasing, by the second communication processing unit in response to an instruction from the handheld device user, the channel between the second communication processing unit and the third communication processing unit of the first cooperating computer device;
means for establishing, by the second communication processing unit in response to instructions from the handheld device user, a communication channel between the second communication processing unit of the handheld device and the third communication processing unit of the second cooperating computer device;
means for acquiring, by the content identification information acquisition unit of the handheld device in response to instruction of the handheld device user, the content identification information held by the content processor of the handheld device;
means for transferring the content identification information from the content identification information acquisition unit of the handheld device to the first content processor controller of the second cooperating computer device; and
means for acquiring, by the second content processor of the second cooperating computer device, the content file from the server corresponding to the first content identification information presented from the handheld device, and outputting the processed results via the output unit of the second cooperating computer device.

18. A content display system according to claim 1, in which the cooperating computer device comprises, a program file server unit for holding and managing program files flowing through a combination of the first user interface and the content identification information acquisition unit, a combination of the second user interface, the control information generator and the content processor controller, or the third user interface, said program files being downloaded and used by the handheld in order to cooperate with the cooperating computer device;
the handheld device comprises, a program execution manager for acquiring and executing said program files provided by the cooperating computer device;
the owner of the operator of the cooperating computer device registers, said program files, to the server unit of the cooperating computer device;
the handheld device acquires said program files from the server unit of the cooperating computer device when the handheld device establishes a communication channel between the second communication processing unit of the handheld device and the third communication processing unit of the cooperating computer device; and
the program execution manager executes the acquired program files;
whereby the program execution manager of the handheld device establishes a function for cooperating with the cooperating computer device in the handheld device.

19. A content display system according to claim 18, further comprising a settlement server for issuing electronic money with settler's identification information circulative over the network to clear the fee of use of the cooperating computer device and for collecting and managing information concerning the use of the electronic money;

in which the handheld device comprises a first electronic money management unit for managing the acquisition of the electronic money from the settlement server and the information concerning the use of the electronic money;

the cooperating computer device comprises a second electronic money management unit for managing the acquisition of the electronic money from the handheld device and for generating, for an electronic money, receipt data of the electronic money carrying at least identification information of the account-settler from which the electronic money is issued, identification information of the handheld device user which is the user of the electronic money, a program file name acquired, receipt date information of the electronic money, value information of the electronic money received, and identification information of the owner or operator of the cooperating computer device;

the owner or operator of the cooperating computer device registers, in the second electronic money management unit of the cooperating computer device, the name of program file, which can be provided to the handheld device user by the cooperating computer device, and first value information, which is a fee payable by the handheld device user for use of the program file;

the electronic money issuer registers, in the settlement server, electronic moneys corresponding to the second value information, which can be used by the handheld device user;

the first electronic money management unit of the handheld device responds to an instruction of the handheld device user with presenting the identification information of the handheld device user via the first communication processing unit to the settlement server, requesting it to issue the electronic money having third value information;

the settlement server issues the electronic money corresponding to the third value information, stores, the total amount of the third value information of the electronic money obtained by the handheld device user so that the supply of the electronic money is controlled so as to excess the second value information of the electronic money;

the first electronic money management unit stores the electronic money received from the settlement server; the program execution manager of the handheld device transfers the program file name to be used to the first electronic money management unit of the handheld device;

the first electronic money management unit transfers the program file name to the second electronic money management unit of the cooperating computer device;

the second electronic money management unit presents the first value information of the requested program file to the first electronic money management unit of the handheld device;

the first electronic money management unit transfers the electronic money equivalent to the presented first value information to the second electronic money management unit and stores, as new second value information, a value obtained by subtracting the first value information of the electronic money transferred thereto from the second value information of the electronic money held in the first electronic money management unit;

the second electronic money management unit verifies value information of the electronic money transferred from the handheld device and sets in the program file server of the cooperating computer device the availability of the use of the program files to the handheld device from which the electronic money was transferred;

the second electronic money management unit generates the receipt data of the electronic money transferred from the handheld device and transfers the receipt data of the electronic money to the first electronic money management unit of the handheld device which is the payer of the electronic money;

the first electronic money management unit receiving the first receipt data of the electronic money urges the program execution manager of the handheld device to obtain the program file;

the program execution manager acquires the program file from the program file server of the cooperating computer device;

the second electronic money management unit presents to the settlement server the received electronic money and the receipt data so that the settler settles an account with the owner and the operator of the cooperating computer device on the base of the value of the electronic money and the receipt data of the electronic money; and the settler settles an account with the handheld device user in the amount corresponding to his used or spent electronic money on the base of the record of the amount of electronic money obtained by the handheld device user.

20. A content display system according to claim 18, comprising:

an operation state indicator for presenting, to the handheld device user, selection results and processed results of content browsing/viewing operations performed on the cooperating computer device, and managing definition of operating state, which defines transition state of operations presentable to the handheld device user, by input event transferred from the control information generator;

in which the handheld device user performs input processing via the I/O unit on the handheld device;

the input events acquired in the I/O unit are transferred to the cooperating computer device;

when the input events from the handheld device transferred thereto are to change the selection of operation, the operating state indicator refers to the current operating state presented by the operating state indicator, then analyzes the correspondence or relationship between the contents of the input event transferred thereto and current operating state thereon, and updates the operating state, presented by the operating state indicator, based on the relationship;

when the contents of the input event are to change the state of execution of operation, the operating state indicator decides the next operation should be performed on the cooperating computer device, and transfers the information about the decided operation to the control information generator on the handheld device; and the control information generator of the handheld device generates a control information corresponding to the transferred information about the next operation and the control information sent to the cooperating computer device and the operation indicated in the control information is performed.

21. A content display method for displaying, multimedia contents delivered from a server of a communication network, by the use of a handheld device and a cooperating computer device cooperated to the handheld device:

comprising the step of:

generating, by the handheld device, first control information which instructs acquisition of a content file corresponding to a content identification information presented by the handheld device user of the handheld device and process of the content file on the cooperating computer device, so that the control information is transferred to the cooperating computer device;

acquiring, by the cooperating computer device, the content file from the server corresponding to the specified content identification information from the handheld device so that processed result thereof is presented to the handheld device user;

presenting, a control menu for selecting the contents to be processed on the handheld device, by the cooperating computer device receiving the information concerning the initiation of displaying the content file on the handheld device, in relation to contents presented on the cooperating computer device to the handheld device user;

generating, from the handheld device, second control information by the use of the selected results processed on the control menu so that the second control information is transferred to the cooperation computer device;

altering, the focused portion of the contents displayed on the cooperating computer device, by the cooperating computer device, by the use of second control information so that processed result for altering the focused portion is displayed to the handheld device user;

instructing, by the handheld device user, to display the whole or partial area of contents displayed on the cooperating computer device;

generating, from specified instruction by the handheld device user, third control information, which is transferred to the cooperating computer device;

transferring the third control information from the handheld device to the cooperating computer device;

acquiring, to the cooperating computer device, content identification information the whole contents, as second content identification information, when having received the third control information indicative of acquiring the whole of content file;

acquiring, to the cooperating computer device, content identification information for identifying a content file which forms the currently focused area, as the second content identification information, when having received the content identification information indicative of acquiring a partial area of the contents;

transferring, from the cooperating computer device to the handheld device, the second content identification information; and presenting, from the handheld device to the handheld device user, the content file specified in the second content identification information.

22. A content display method for displaying, multimedia contents delivered from a server of a communication network, by the use of a handheld device and a cooperating computer device cooperated to the handheld device according to claim 21, further comprising:

comprising the steps of:

proposing, from the handheld device user to the handheld device, acquisition of first content identification information representative of the whole or partial focused area of the contents displayed on the cooperating computer device;

generating, from the handheld device, control information in correspondence to the acquisition of the contents so that the control information is transferred to the cooperating computer device;

acquiring, when having received the control information indicative of selection of the whole contents, the cooperating computer device, as the second content identification information, content identification information for identifying the whole content file of the contents displayed on the cooperating computer device;

acquiring, when having received the control information indicative of selection of a focused partial part of the content file, the content identification information acquisition unit, as the second content identification information, content identification information for identifying the content file forming the currently focused area of the contents displayed on the cooperating computer device; and transferring, from the cooperating computer device to the handheld device, the second content identification information thus obtained, which is stored in the handheld device.

23. A content display system according to claim 16, comprising:

means for content browsing/viewing operations, by the handheld device user, through the use of the handheld device and the first cooperating computer device;

means for acquiring, by the content identification information acquisition unit of the first cooperating computer device, identification information of the specified content in response to the handheld device user, returning the identified information specified content to the content processor controller of the handheld device after adding thereon display control information, and holding by the content processor controller of the handheld device the identification information of the specified content file and the display control information returned;

means for continuously, by the content processor controller, the presentation of the content identification information to the content processor of the handheld device in consideration of the display control information;

means for releasing, by the second communication processing unit in response to an instruction from the handheld device user, the channel between the second communication processing unit and the third communication processing unit of the first cooperating computer device;

means for establishing, by the second communication processing unit in response to instructions from the handheld device user, a communication channel between the second communication processing unit of the second cooperating computer device;

means for acquiring, by the content identification information unit of the handheld device in response to instruction of the handheld device user, the content identification information held by the content processor of the handheld device;

means for transferring the content identification information from the content identification information acquisition unit of the handheld device to the first content processor controller of the second cooperating computer device; and means for acquiring, by the second content of the second cooperating computer device, the content file from the server corresponding to the first content identification information presented from the handheld device, and outputting the processed results via the output unit of the second cooperating computer device.

24. A content display system according to claim 17, comprising:

means for content browsing/viewing operations, by the handheld device user, through the use of the handheld device and the first cooperating computer device;

means for acquiring, by the content identification information acquisition unit of the first cooperating computer device, identification information of the specified content in response to the handheld device user, returning the identified information specified content to the content processor controller of the handheld device after adding thereon display control information, and holding by the content processor controller of the handheld device the identification information of the specified content file and the display control information returned;

means for continuously, by the content processor controller, the presentation of the content identification information to the content processor of the handheld device in consideration of the display control information;

means for releasing, by the second communication processing unit in response to an instrnction from the handheld device user, the channel between the second communication processing unit and the third communication processing unit of the first cooperating computer device;

means for establishing, by the second communication processing unit in response to instructions from the handheld device user, a communication channel between the second communication processing unit of the second cooperating computer device;

means for acquiring, by the content identification information unit of the handheld device in response to instruction of the handheld device user, the content identification information held by the content processor of the handheld device;

means for transferring the content identification information from the content identification information acquisition unit of the handheld device to the first content processor controller of the second cooperating computer device; and means for acquiring, by the second content of the second cooperating computer device, the content file from the server corresponding to the first content identification information presented from the handheld device, and outputting the processed results via the output unit of the second cooperating computer device.

25. A content display system according to claim 2, further comprising:

a settlement server for issuing electronic money with settler's identification information to circulate the network for clearing the fee of the cooperating computer device and for collecting and managing information concerning the use of electronic money;

in which the handheld device comprises a first electronic money management unit for managing the acquisition of the electronic money from the settlement server and the information concerning the user of the electronic money;

the cooperating computer device information management server connected through communication channels to the handheld device and the cooperating computer device comprises, a third electric money management unit for managing acquisition results of the electronic money from the handheld device, the used results of the electronic money acquired and the acquired results of program files in correspondence to the identification information of respective handheld device users, and for generating, for an electronic money, receiptdata of the electronic money, which includes at least identification information of the account-settler from which the electronic money is issued, identification information of the handheld device user which is the user of the electronic money, a program file name acquired, receipt date information of the electronic money, value information of the electronic money receiving, and identification information of the owner or operator of the cooperating computer device;

the second computer device's information management unit manages use-admission control information indicative of admission or non-admission in acquisition of program files in correspondence to the identification information of respective handheld device user;

the owner or operator of the cooperating computer device registers, in the third electronic money management unit of the cooperating computer device information management server, classification of content processor, which can be provided, by the cooperating computer device, to the handheld device users and value information requested by the use of the content processor;

the first electronic money management unit of the handheld device acquires the electronic money from the settlement server;

the cooperating computer device information management unit obtains, from the cooperating computer device information management server, a list of program file name, and urges the handheld device user via the fourth user interface to select the program file so that the selection results are returns to the cooperating computer device information management unit;

the cooperating computer device information management unit transfers a program file name to the first electronic money management unit of the handheld device, and transfers the program file name to the third electronic money management unit of the cooperating computer device information management server;

the third electronic money management unit presents value information, which is necessary to acquire and use the program file, to the first electronic money management unit of the handheld device;

the first electronic money management unit transfers the electronic money equivalent to the present value information to the third electronic money management unit and stores, as new value information, a value obtained by subtracting the first value information of the electronic money transferred thereto from the second value information of the electronic money held in the first electronic money management unit;

the third electronic money management unit verifies the electronic money transferred from the handheld device and sets in the second computer devices' information management unit of the cooperating computer device information management server the availability of the use of the program files to the handheld device from which the electronic money was transferred;

the program execution manager of the handheld device responds to an instruction from the handheld device user with presenting at least the identification information of the handheld device user to the program file server of the cooperating computer device, requesting it to transfer a program file the program filer server of the cooperating computer device sends the handheld device user identification information from the handheld device to the second computer devices' information management unit of the cooperating computer device information management server, requesting it to decide whether or not the handheld device be allowed to obtain its desired program file;

the second computer devices' information management unit of the cooperating computer device information management server decides the program files available to the handheld device, then generates a list of program file names and, by presenting the receiving handheld device user identification information to the third electronic money management unit of the cooperating computer device information management server, acquires the electronic receipt data of electronic money for the handheld device which acquires the program files;

the second computer devices' information management unit transfers the program file name list and the receipt data of electronic money to the program file server of the cooperating computer device;

the program file server of the cooperating computer device transfers the program files specified by the list of program file name and the receipt data of electronic money to the program execution manager of the handheld device;

the third electronic money management unit of the cooperating computer device s information management server transfers the receipt data of electronic money to the settlement server; and the settler settles an account with the owner or operator of the cooperating computer device based on the receipt data of electronic money thus collected.

26. A content display system according to claim 4, further comprising:

a settlement server for issuing electronic money with settler's identification information to circulate the network for clearing the fee of the cooperating computer device and for collecting and managing information concerning the use of electronic money;

in which the handheld device comprises a first electronic money management unit for managing the acquisition of the electronic money from the settlement server and the information concerning the user of the electronic money;

the cooperating computer device information management server connected through communication channels to the handheld device and the cooperating computer device comprises, a third electric money management unit for managing acquisition results of the electronic money from the handheld device, the used results of the electronic money acquired and the acquired results of program files in correspondence to the identification information of respective handheld device users, and for generating, for an electronic money, receipt data of the electronic money, which includes at least identification information of the account-settler from which the electronic money is issued, identification information of the handheld device user which is the user of the electronic money, a program file name acquired, receipt date information of the electronic money, value information of the electronic money receiving, and identification information of the owner or operator of the cooperating computer device;

the second computer device's information management unit manages use-admission control information indicative of admission or non-admission in acquisition of program files in correspondence to the identification information of respective handheld device user;

the owner or operator of the cooperating computer device registers, in the third electronic money management unit of the cooperating computer device information management server, classification of content processor, which can be provided, by the cooperating computer device, to the handheld device users and value information requested by the use of the content processor;

the first electronic money management unit of the handheld device acquires the electronic money from the settlement server;

the cooperating computer device information management unit obtains, from the cooperating computer device information management server, a list of program file name, and urges the handheld device user via the fourth user interface to select the program file so that the selection results are returns to the cooperating computer device information management unit;

the cooperating computer device information management unit transfers a program file name to the first electronic money management unit of the handheld device, and transfers the program file name to the third electronic money management unit of the cooperating computer device information management server;

the third electronic money management unit presents value information, which is necessary to acquire and use the program file, to the first electronic money management unit of the handheld device;

the first electronic money management unit transfers the electronic money equivalent to the present value information to the third electronic money management unit and stores, as new value information, a value obtained by subtracting the first value information of the electronic money transferred thereto from the second value information of the electronic money held in the first electronic money management unit;

the third electronic money management unit verifies the electronic money transferred from the handheld device and sets in the second computer devices' information management unit of the cooperating computer device information management server the availability of the use of the program files to the handheld device from which the electronic money was transferred;

the program execution manager of the handheld device responds to an instruction from the handheld device user with presenting at least the identification information of the handheld device user to the program file server of the cooperating computer device, requesting it to transfer a program file the program filer server of the cooperating computer device sends the handheld device user identification information from the handheld device to the second computer devices' information management unit of the cooperating computer device information management server, requesting it to decide whether or not the handheld device be allowed to obtain its desired program file;

the second computer devices' information management unit of the cooperating computer device information management server decides the program files available to the handheld device, then generates a list of program file names and, by presenting the receiving handheld device user identification information to the third electronic money management unit of the cooperating computer device information management server, acquires the electronic receipt data of electronic money for the handheld device which acquires the program files;

the second computer devices' information management unit transfers the program file name list and the receipt data of electronic money to the program file server of the cooperating computer device;

the program file server of the cooperating computer device transfers the program files specified by the list of program file name and the receipt data of electronic money to the program execution manager of the handheld device;

the third electronic money management unit of the cooperating computer device's information management server transfers the receipt data of electronic money to the settlement server; and the settler settles an account with the owner or operator of the cooperating computer device based on the receipt data of electronic money thus collected.

* * * * *